US010637223B2

(12) United States Patent
Newill

(10) Patent No.: US 10,637,223 B2
(45) Date of Patent: Apr. 28, 2020

(54) WIRING APPARATUS

(71) Applicant: Roger Fulton Newill, Virginia Beach, VA (US)

(72) Inventor: Roger Fulton Newill, Virginia Beach, VA (US)

(*) Notice: Subject to any disclaimer, the term of this patent is extended or adjusted under 35 U.S.C. 154(b) by 206 days.

(21) Appl. No.: 16/000,175

(22) Filed: Jun. 5, 2018

(65) Prior Publication Data

US 2018/0351338 A1 Dec. 6, 2018

Related U.S. Application Data

(60) Provisional application No. 62/515,687, filed on Jun. 6, 2017.

(51) Int. Cl.
| | |
|---|---|
| *H02G 3/08* | (2006.01) |
| *H02G 3/16* | (2006.01) |
| *H02G 3/12* | (2006.01) |
| *H01H 1/58* | (2006.01) |
| *H01H 1/20* | (2006.01) |
| *H01H 9/02* | (2006.01) |
| *H01R 25/00* | (2006.01) |
| *H01R 13/74* | (2006.01) |
| *H02G 3/14* | (2006.01) |
| *H01R 103/00* | (2006.01) |

(52) U.S. Cl.
CPC ............ *H02G 3/16* (2013.01); *H01H 1/2025* (2013.01); *H01H 1/2066* (2013.01); *H01H 1/58* (2013.01); *H01H 9/0207* (2013.01); *H01R 25/006* (2013.01); *H02G 3/085* (2013.01); *H02G 3/121* (2013.01); *H02G 3/125* (2013.01); *H01R 13/748* (2013.01); *H01R 2103/00* (2013.01); *H02G 3/14* (2013.01)

(58) Field of Classification Search
CPC ........ H02G 3/18; H02G 3/083; H02G 15/117; H02G 3/16; H02G 3/123; H02G 3/085; H02G 3/121; H02G 3/125; H02G 3/14; H01R 31/08; H01R 24/78; H01R 2103/00; H01R 25/006; H01R 13/748; H01H 1/2025; H01H 1/2066; H01H 1/58; H01H 9/0207; H01H 9/02
USPC ............... 174/53, 50, 480, 481, 57, 59, 541; 439/535, 650, 724, 106, 107
See application file for complete search history.

(56) References Cited

U.S. PATENT DOCUMENTS

| | | |
|---|---|---|
| 2,291,107 A | 7/1942 | Rybolt |
| 3,489,985 A | 1/1970 | Martin |
| (Continued) | | |

*Primary Examiner* — Angel R Estrada
(74) *Attorney, Agent, or Firm* — Nixon & Vanderhye PC

(57) ABSTRACT

An electrical wiring apparatus includes a container, a positive link, a neutral link and a ground link. The container has cable entries constructed to removably retain ends of a first cable and a second cable, each of the first and second cables having a positive wire, a neutral wire and a ground wire. An inner surface of the base allows the positive wire, neutral wire and ground wire of each of the first and second cables be exposed when the cable is positioned in the cable entry. Legs of the positive, neutral and ground links are electrically connect with exposed positive, neutral and ground wires of the first and second cables respectively. A circuiting, switch or receptacle device is engaged with the container and positive, the neutral and the ground links to create electrical connections to the positive, neutral and ground wires of the inserted cables.

30 Claims, 54 Drawing Sheets

(56) References Cited

U.S. PATENT DOCUMENTS

| | | | |
|---|---|---|---|
| 3,609,647 A * | 9/1971 | Castellano | H02G 3/16 439/535 |
| 3,716,651 A | 2/1973 | Werner | |
| 3,860,739 A | 1/1975 | Kloth | |
| 3,935,637 A | 2/1976 | Bunnell | |
| 4,012,580 A | 3/1977 | Arnold | |
| 4,165,443 A * | 8/1979 | Figart | H02G 3/16 174/53 |
| 4,256,360 A | 3/1981 | Debaigt | |
| 4,274,696 A | 6/1981 | Long | |
| 4,500,746 A | 2/1985 | Meehan | |
| 4,616,285 A | 10/1986 | Sackett | |
| 4,669,804 A | 6/1987 | Munroe | |
| 4,958,048 A * | 9/1990 | Bell | H02G 3/125 174/53 |
| 5,399,806 A | 3/1995 | Olson | |
| 5,471,012 A * | 11/1995 | Opel | H02G 3/16 174/53 |
| 6,259,023 B1 | 7/2001 | Reiker | |
| 6,884,111 B2 | 4/2005 | Gorman | |
| 6,939,179 B1 * | 9/2005 | Kieffer, Jr. | H01R 13/514 439/650 |
| 7,160,147 B1 * | 1/2007 | Stephan | H01R 9/24 174/60 |
| 7,497,273 B2 | 3/2009 | Schoettle | |
| 7,767,905 B2 * | 8/2010 | Meyer | H02G 3/123 174/60 |
| 8,353,716 B2 | 1/2013 | Keswani | |
| 9,246,321 B2 | 1/2016 | Newill | |
| 9,653,860 B2 * | 5/2017 | Hestrin | H01R 13/73 |
| 9,887,506 B1 * | 2/2018 | Liang | H01R 33/971 |
| 2010/0288526 A1 | 11/2010 | Meyer | |
| 2015/0280414 A1 | 10/2015 | Newill | |

* cited by examiner

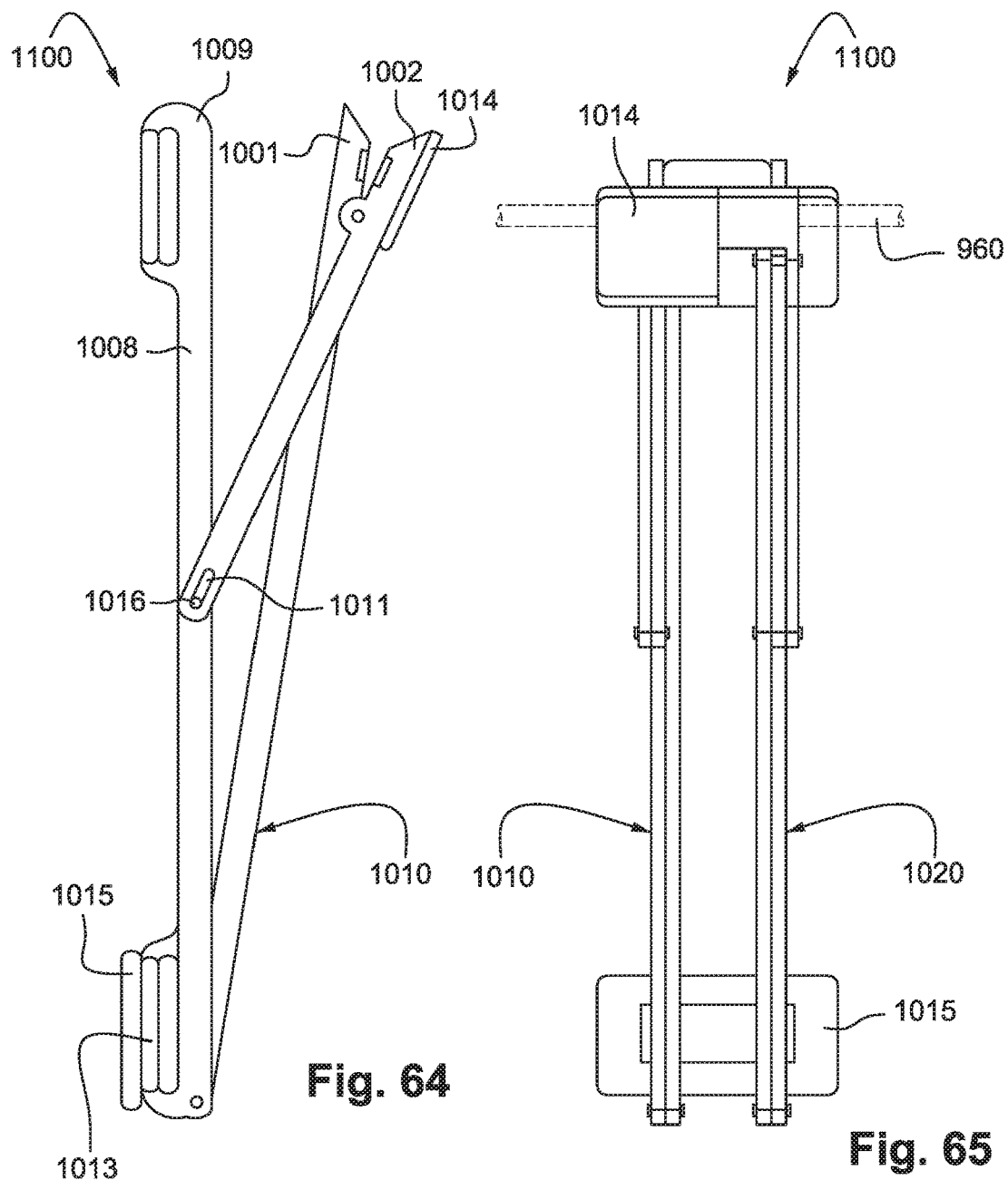
Fig. 64
Fig. 65
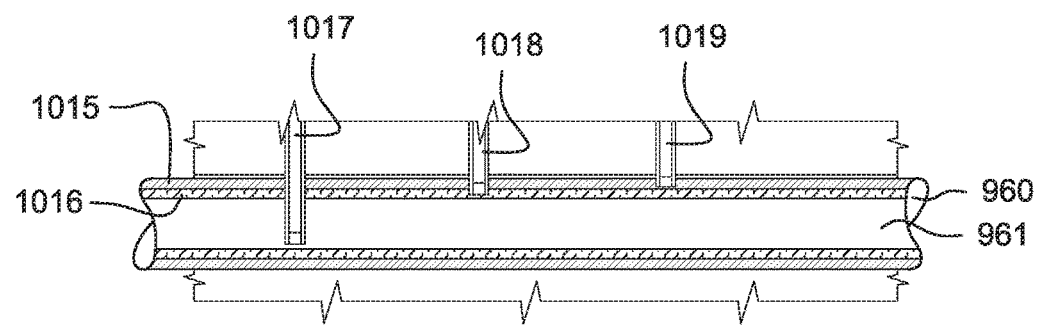
Fig. 66

WIRING APPARATUS

CROSS-REFERENCE TO RELATED APPLICATIONS

This application claims the priority of Provisional Application No. 62/515,687 filed on Jun. 6, 2017, the entire content of which is hereby incorporated by reference in this application. This application also incorporates by reference the entire content of application Ser. No. 14/576,731 filed Dec. 19, 2014 now U.S. Pat. No. 9,246,321 issued on Jan. 26, 2016.

FIELD OF THE DISCLOSURE

This disclosure relates generally to electrical wiring apparatuses and, more particularly, to electrical wiring apparatuses including a container and a positive link, a ground link and a neutral link constructed to electrically connect with positive, neutral and ground wires of the cables retained in the container.

BACKGROUND AND SUMMARY

Electrical devices like receptacles, switches, light fixtures or the like have been used for years in homes, offices and other environments. Over many decades, the circuit installation mechanics of these devices have been standardized and very few attempts have been made to significantly change these mechanics. In many cases, the wiring, installation and repair of these electrical devices are difficult and time-consuming, even for technicians. Especially when multiple cables are retained in an electrical junction box and need to connect with an electrical device mounted on the box, it could be very complicated to safely, expeditiously, and properly connect the positive, neutral and ground link of each of the cables with the corresponding positive, neutral and ground conductors extending from the electrical device.

Example wiring apparatuses of the present invention are not subject to these disadvantages and possesses many advantages over conventional electrical devices.

According to one aspect of the present technology, there is provided an electrical wiring apparatus, comprising a container having a base and an opening. The container has cable entries constructed to removably retain ends of cables therein. Each of the cables has a positive wire, a neutral wire and a ground wire, an inner surface of the base is constructed to allow the positive wire, neutral wire and ground wire of each of the cables be exposed when the cable is positioned in one of the cable entries. The electrical wiring apparatus further comprises a positive link, a neutral link and a ground link of electrically conductive material. Each of the links has at least two legs constructed to electrically connect with the corresponding wires of the cables.

In an example embodiment, the electrical wiring apparatus further comprises one of a cover plate and an electrical device engaged with the positive link, the neutral link and the ground link to retain these links in a position that is electrically connectable with the positive, neutral and ground wires of the cables.

When cables are positioned properly in one of the cable entries with their positive wire, neutral wire and ground wire exposed on the inner surface of the base of the container in a predetermined sequence, the positive, ground and neutral links are constructed to electrically connect with corresponding positive, ground and neutral wires of cables and corresponding positive, ground and/or neutral conductors from an electrical device mounted on the container. In this way, a technician places the cables and links at designated locations in an electrical container, so that the wires of the cables and conductor(s) of the electrical device mounted in the container will be electrically connected properly. That is, the technician does not need to locate, manually shape, and connect corresponding wires and conductors together. As a result, the wiring, installation and repair of the wiring apparatus can be simplified and/or accelerated.

The ground link, the positive link, and/or the neutral link may each include a central piece and four legs extending from the central piece. The links may be configured to be spaced apart from the wires of other polarities of the first and second cables when the first and second cables are retained in the container, and the central pieces of the links are configured to be spaced apart from the positive wire, the neutral wire and the ground wire of the first and second cables when the first and second cables are retained in the container. The positive legs of the positive link, the neutral legs of the neutral link, and the ground legs of the ground link may be spaced apart along one direction, and a central piece of the positive link, a central piece of the neutral link and a central piece of the ground link may be spaced apart along another direction. A plurality of spaced recesses may be formed on the inner surface of the base of the container. The spaced recesses may be constructed to dispose wires of the first cable and receive the links such that the legs are electrically connected with the wires of the first cable according to their polarities. The spaced recesses may be elongated and in parallel relation, and each of the plurality of spaced recesses may dispose one wire of the first cable and receive one leg of a respective link. The electrical wiring apparatus may include a separator on the inner surface of the base to separate the first cable from the second cable while each of the positive link, the neutral link, and the ground link connect respective wires of the first and second cables across the separator. The electrical device may be movably mounted on the container over the opening of the container. The electrical device may include electrical conductors in engagement with the positive link, the neutral link, and the ground link. The electrical device may be an electrical receptacle or an electrical switch. The positive link may be two separate central pieces constructed to electrically connect or disconnect the positive wires of the first and second cables based on a position of an operating element of an electrical switch. The ground link may be located below the ground wires of the first and second cables and on the inner surface of the base. The electrical wiring apparatus may include a mounting post secured to the base and extending outwardly toward the outer opening, with the positive link mounted on the mounting post in a first position, and the neutral link mounted on the mounting post in a second position offset from the first position. The positive, neutral and/or ground link may have an H-shaped profile when viewed in a first direction, a U-shaped profile viewed in a second direction, and/or a T-shaped profile viewed in a third direction, where the first, second and third directions may be orthogonal. The positive link, the ground link and the neutral link may be fastened together by a non-conductive material.

The example embodiments, aspects, and advantages disclosed herein may be provided in any suitable combination or sub-combination to achieve yet further example embodiments.

BRIEF DESCRIPTION OF THE DRAWINGS

The accompanying drawings facilitate an understanding of example embodiments of this invention. In the drawings:

FIG. 64 illustrates a side view of a cable cutting and wire stripping tool.

FIG. 65 illustrates a front view of a cable cutting and wire stripping tool.

FIG. 66 illustrates blades for cutting or stripping different parts of a cable.

DETAILED DESCRIPTION OF EXAMPLE EMBODIMENTS

In accordance with certain example embodiments, certain systems, devices, processes and methods are disclosed for wiring apparatuses. More particularly, certain example embodiments relate to an electrical wiring apparatus including a container and a positive link, a ground link and a neutral link constructed to electrically connect with exposed positive, neutral and ground wires of the cables retained in the container. In the following description, for purposes of explanation, numerous specific details are set forth to provide a thorough understanding of the example embodiments. It will be evident, however, to a person skilled in the art, that the example embodiments may be practiced without these specific details.

As will be appreciated by the following description of various embodiments, a system may be provided where electrical connections can be made with reduced installer effort (compared to conventional electrical connections). The system may also be assembled without tools. The connections may be made safely and assuredly for multiple electrical cables (e.g., up to four) and an electrical device (e.g., a receptacle or switch) while leaving no live conductors exposed. The system may also maintain necessary separation distances or insulation between polarities.

Figure 1:
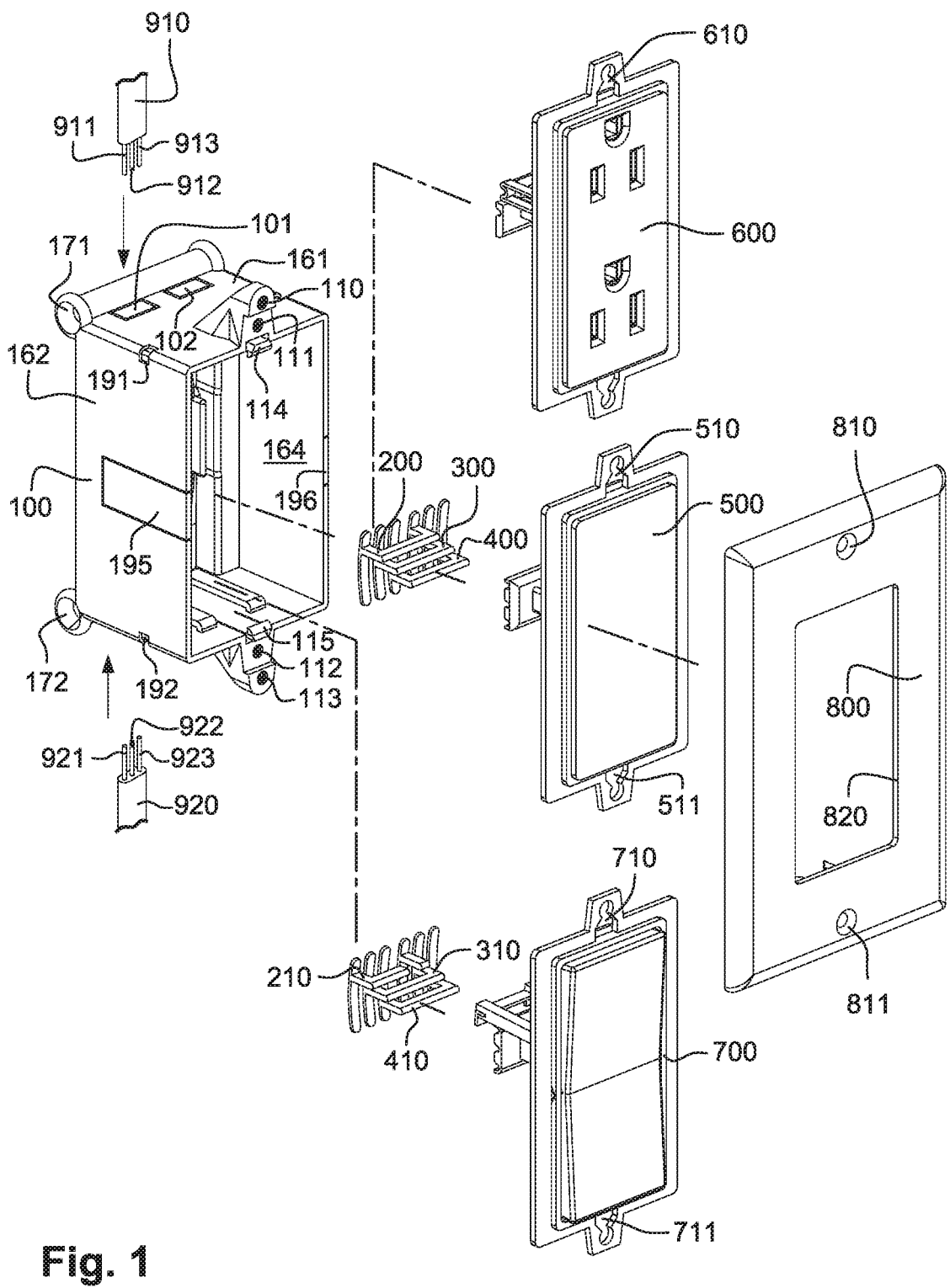
FIG. 1 illustrates an exploded, top-left view of a circuiting device, electrical receptacle and electrical switch, each of which is constructed to be mounted on an example container.

FIG. 1 is an exploded, top-left view of an example: circuiting device, receptacle and switch, each of which is constructed to be mounted on a container. In some example embodiments, a container 100 is constructed to be associated with a circuiting device 500 or another device, such as an electrical switch 700, an electrical receptacle 600 or any other kind of electrical device. In an example embodiment, the container 100 comprises non-conductive material(s), like plastic materials.

In an example embodiment, the circuiting device 500 or other electrical device may be removably mounted on the container 100 over an outer opening of the container 100 in any manner, including using screws, rivets, glue, or any other means. For example, the circuiting device 500 may be mounted on the container 100 by having screws or bolts each with a threaded shank pass through cavities 510 and 511 on the circuiting device 500 and then enter threaded holes or nuts 111 and 112 in the container 100. An electrical device, like the electrical receptacle 600 or the switch 700, may be attached to the container 100 in a similar manner. That is, in an example embodiment, the electrical receptacle 600 may be attached to the container 100 by having screws or bolts pass through cavities 610 and 611 on the electrical receptacle 600 and then enter the holes or nuts 111 and 112 of the container 100, and the switch 700 may be attached to the container 100 by having screws or bolts pass through cavities 710 and 711 on the switch 700 and then enter the holes or nuts 111 and 112 of the container 100. The holes or nuts 111 and 112 of the container 100 are optional, and hence alternative embodiments may not require screw holes to mount the circuiting device 500 or the electrical device into the container 100.

Further, in an example embodiment, the container 100 comprises two clips 114 and 115, each of which is constructed to secure the circuiting device 500 or an electrical device (e.g., the receptacle 600 or the switch 700) into the container 100, for example, by clipping corresponding parts of the circuiting device 500 or the electrical device. The two clips 114 and 115 may comprise plastic materials. In other embodiments, these two clips may comprise any other kind of materials, and may have any other kind of shape. Moreover, these two clips 114 and 115 may not be required in some example embodiments.

In addition, an outer cover plate 800 may be removably attached to an outer edge of one of the circuiting device 500, electrical switch 700 and receptacle 600 to further secure it to the container 100. The outer cover plate 800 may secure the circuiting device 500 to the container 100 using screws, rivets, gluing, or any other means. In an example embodiment, the outer cover plate 800 secures the circuiting device 500 to the container 100 by having screws or bolts each with a threaded shank pass through not only cavities 810 and 811 of the outer cover plate 800 but also the cavities 510 and 511 of the circuiting device 500, and then enter into threaded holes or nuts 110 and 113 of the container 100. Similarly, in another example embodiment, the outer cover plate 800 may also attach the electrical receptacle 600 to the container 100 by having screws or bolts pass through the cavities 810 and 811 of the outer cover plate 800 and the cavities 610 and 611 of the electrical receptacle 600 and then enter into the holes or nuts 110 and 113 of the container 100. In yet another example embodiment, the outer cover plate 800 may also attach the electrical switch 700 to the container 100 by having screws or bolts pass through the cavities 810 and 811 of the outer cover plate 800 and the cavities 710 and 711 of the electrical switch 700 and then enter into the holes or nuts 110 and 113 of the container 100. The holes or nuts 110 and 113 of the container 100 are optional, and hence alternative embodiments may not require any holes or nuts to mount the cover plate 800 into the container 100.

In an example embodiment, the container 100 comprises a base 120, a front side 161, a left side 162, a back side 163, and a right side 164. In some example embodiments, the container 100 may further comprise two tear-out pieces 195 and 196 on the left and right sides 162 and 164 respectively. Each of the tear-out pieces 195 and 196 may be removed from the left and right sides 162 or 164, thereby forming one or two opening(s) on the left side 162 and/or the right side 164 of the container. These openings may be used to allow two or more containers to be connected with each other, and an electrical conductor (which may be in the form of one or more links 200, 300, 400 with extensions that extend laterally between containers 100) may pass from one container to the next container to provide an electrical connection between the containers.

Figure 10:
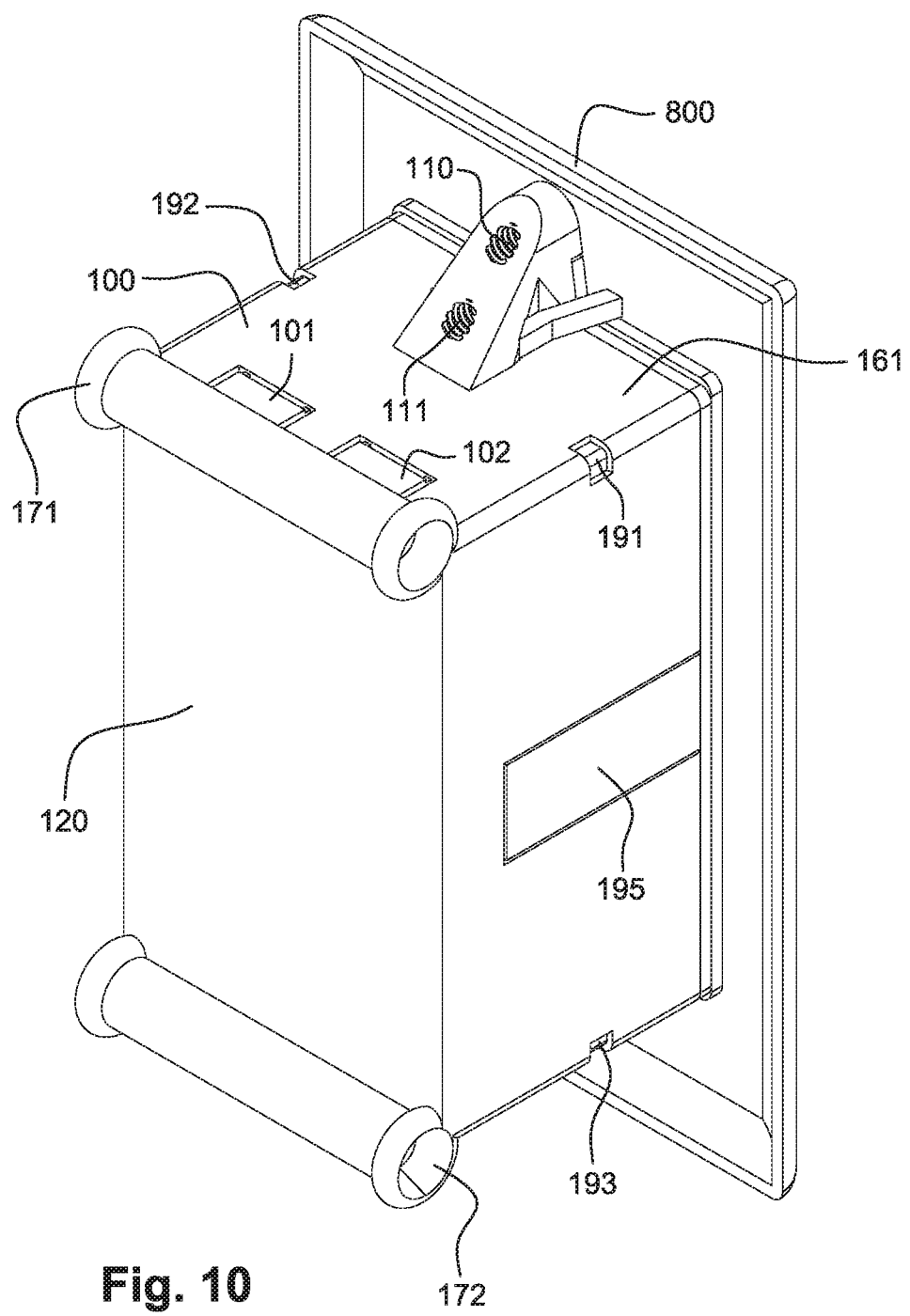
FIG. 10 illustrates a bottom-left view of a circuiting device.

In an example embodiment, the container 100 further comprises one or more mounting indicators, such as recesses or protrusions, formed on the outer surface of the sides 161-164. These mounting indicators are constructed to indicate mounting positions to an installer. As shown in FIGS. 1 and 10, four stoppers 191, 192, 193 and 194 are provided on four corners between the front side 161, the left side 162, the back side 163 and the right side 165. The locations of one or more of these stoppers may be customized depending on the dimensions of the electrical device to be mounted on the container 100.

In another example embodiment, two mounting screw tubes 171 and 172 attached to the front and back ends of the base 120 are configured to mount the container 100 within a wall or any other location. In another example embodiment, the mounting screw tubes 171 and 172 can have any other shape. The mounting screw tubes 171 and 172 may not be required in other example embodiments, and the container 100 may be mounted in any other manner.

Figure 3:
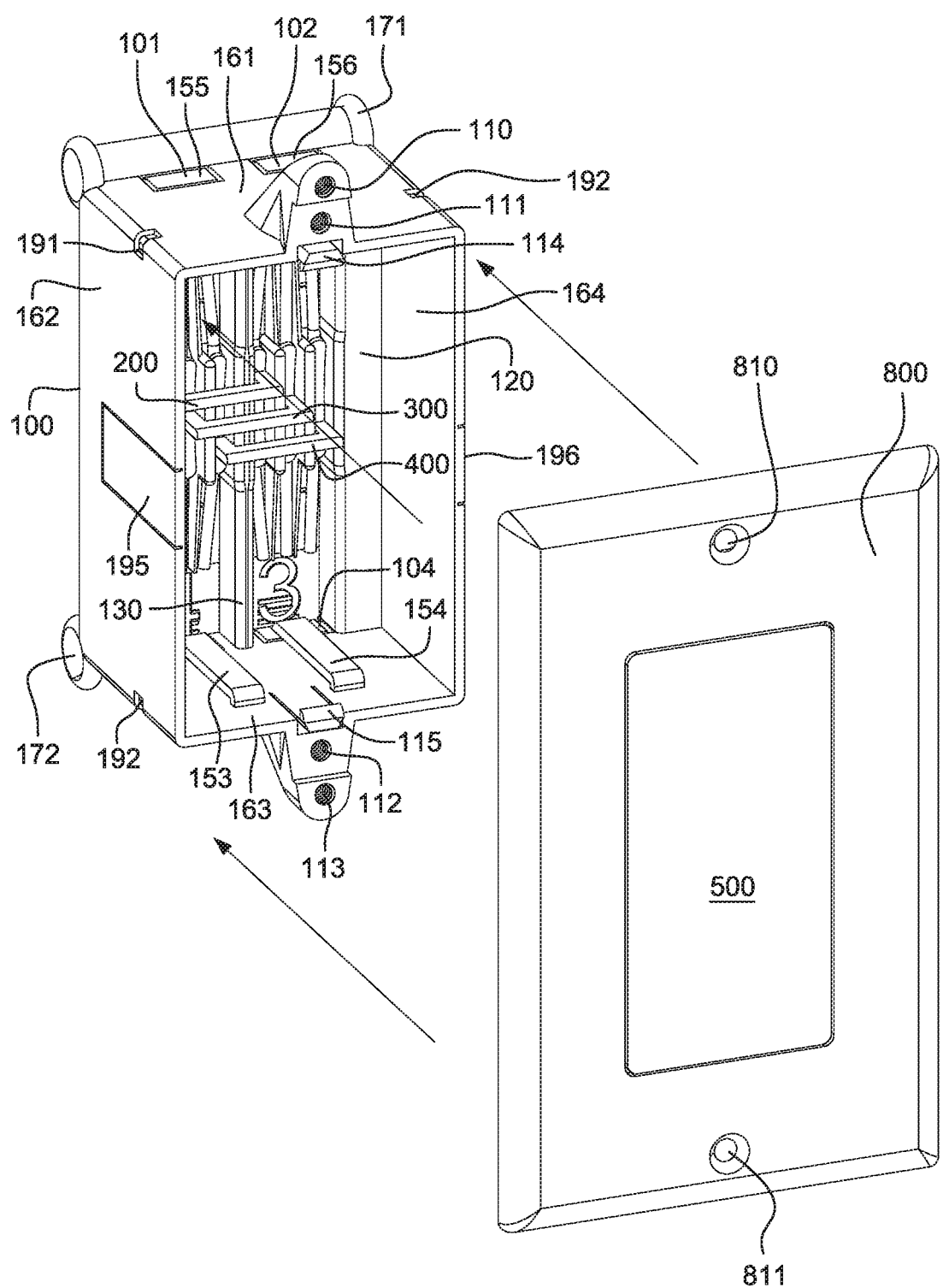
FIG. 3 illustrates an exploded, top-left view of a circuiting device with electrical links inserted in the container.
Figure 19:
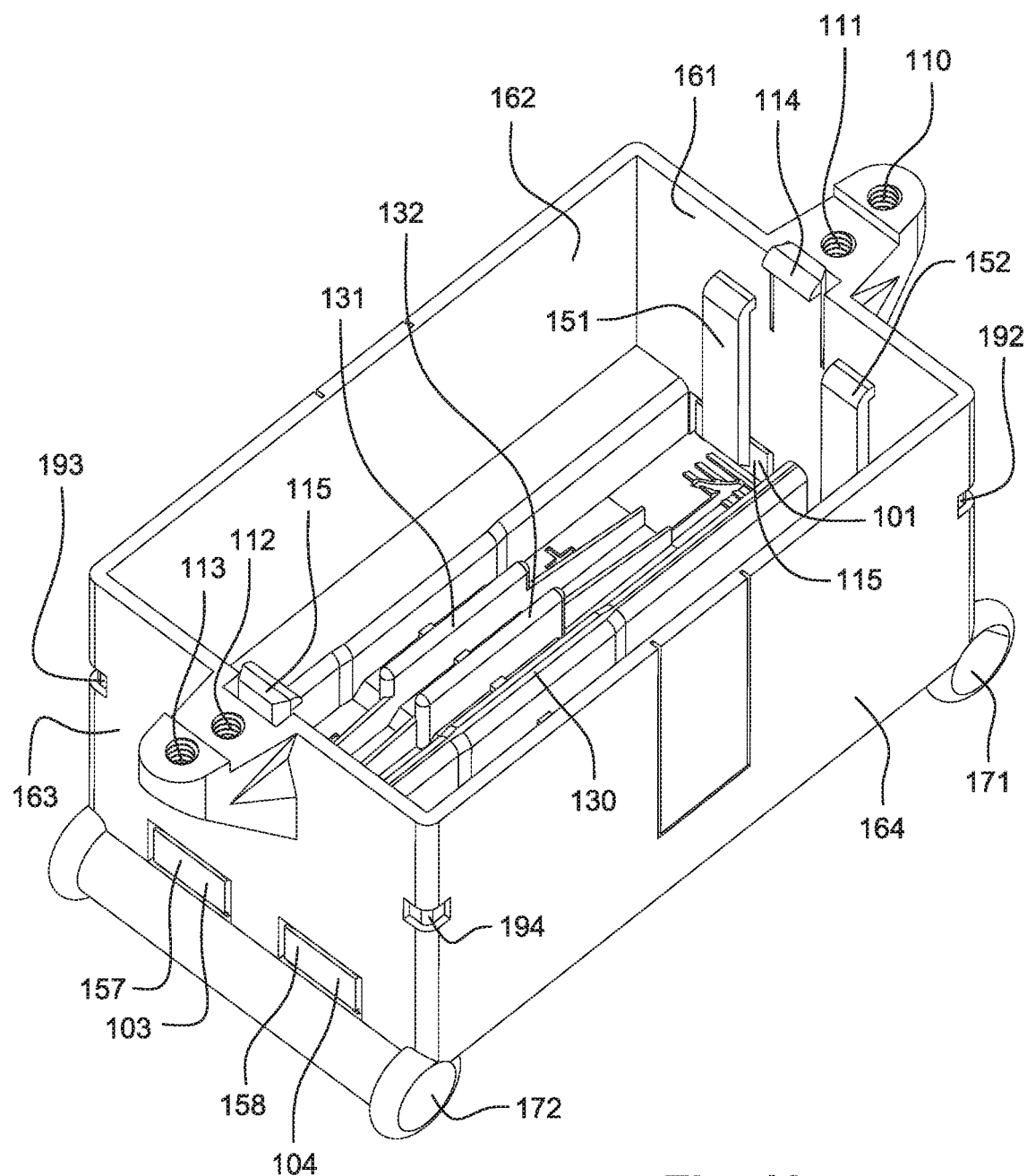
FIG. 19 illustrates a back-right view of a container.

In certain example embodiments, the container 100 may have end-stripped cables (e.g., one to four cables) inserted into it through cable entries on any side and/or the bottom of the container 100. In an example embodiment, as shown in FIGS. 3 and 19, the container 100 comprises a first cable entry 101 and a second cable entry 102 on its front side 161, and a third cable entry 103 and a fourth cable entry 104 on its back side 163. Each of the cable entries 101, 102, 103 and 104 may have a cable latch and/or release, which may be operable after installation is completed and the circuiting device 500 or any associated electrical device is lifted off from the container 100. The cable latch and/or release may be automatic or manual.

Each cable entry may be constructed to removably retain the end of a cable. For example, as shown in FIG. 1, a first cable 910 and a second cable 920 are inserted into the container 100 through the first and third cable entries 101 and 103 on front and back sides of the container 100 respectively. In another example embodiment illustrated in FIG. 15A, four cables—the first cable 910, the second cable 920, a third cable 930 and a fourth cable 940—are inserted into the container 100 through the first cable entry 101, the third cable entry 103, the second cable entry 102 and the fourth cable entry 104 respectively.

In another example embodiment, one or more cable entries may be on the rear base of a container. That is, cables may be inserted into the container from its rear base. In yet another example embodiment, one cable entry may be provided in the middle of the front and/or back side of a container to enable two cables to enter the container together through the same cable entry.

Figures 15A, 15B:
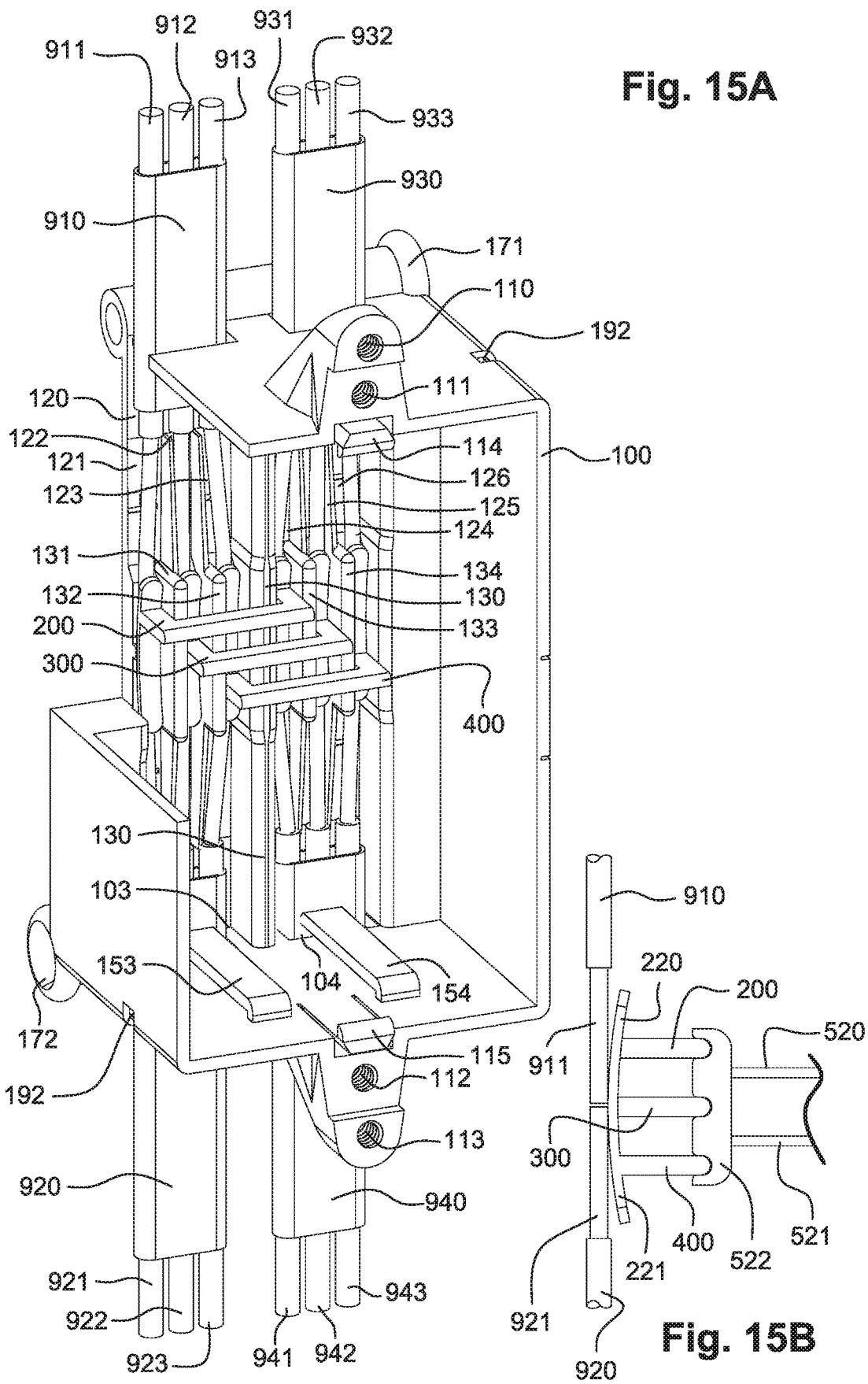
FIG. 15A illustrates a cut-away, left-top view of a container with cables retained in the container and with positive, neutral and ground links disposed therein.
FIG. 15B illustrates positive, ground and neutral links electrically connected with cables.

Each of the cables 910, 920, 930 and 940 includes a positive wire, a neutral wire, and a ground wire. As illustrated in FIG. 15A, the cable 910 includes a positive wire 911, a ground wire 912 and a neutral wire 913; the cable 920 includes a positive wire 921, a ground wire 922 and a neutral wire 923; the cable 930 includes a positive wire 931, a ground wire 932 and a neutral wire 933; and the cable 940 includes a positive wire 941, a ground wire 942 and a neutral wire 943. At least one end of each of these cables may be stripped to expose the positive, neutral and ground wires of the cable when the cable is positioned in a respective cable entry of the container 100. In other example embodiments, a cable may only have one or two wires.

In some example embodiments, one or more links of electrically conductive material are provided within the container 100 to electrically connect positive wires, neutral wires, and/or ground wires of two or more cables retained in the container 100 respectively. Moreover, in an example embodiment, one or more of the link(s) may be further constructed to electrically connect the positive wire(s), neutral wire(s) and/or ground wire(s) of one or more of the cables with corresponding conductor(s), terminal(s) or wire(s) of the electrical device associated with the container 100. The links may be separate (e.g., unconnected) pieces, held together with another piece (e.g., a molded plastic component that retains the links in position relative to one another), or fastened to another component such as the circuiting device 500. In most figures, the links are illustrated as separate pieces to better visualize their shapes and positions relative to other components.

Example links may comprise brass or any other electrically conductive material, and may have various shapes and structures. In an example embodiment, as illustrated in FIGS. 1 and 3-9, a positive link 200, a ground link 300 and a neutral link 400 are provided within the container 100, while the container 100 is associated with the circuiting device 500 or the electrical receptacle 600. In another example embodiment, as illustrated in FIG. 1 and FIGS. 43-46, a modified positive link 210 is provided when the container 100 is associated with the electrical switch 700. In some example embodiments, a non-conductive collar may connect a set of positive, neutral and ground links to be an integral unit, for ease of assembly and installation.

An inner surface of the base 120 may be constructed to allow the positive wire, neutral wire and ground wire of any one of the cables 910, 920, 930 and/or 940 be exposed when the cable is positioned in respective cable entry. In an example embodiment, illustrated in FIG. 1 legs of the positive link 200 or 210, the neutral link 400 or 410 and the ground link 300 or 310 are disposed on top of the positive wire(s), neutral wire(s) and ground wire(s) of cables exposed on the base 120. In this way, these positive, ground and neutral links may be electrically connected with the exposed positive wire(s), ground wire(s) and neutral wire(s) of the cable 910, cable 920, cable 930 and/or cable 940 respectively.

Further, in these embodiments, one of the circuiting device 500, the electrical receptacle 600, the switch 700 and any of other kinds of electrical devices is engaged with the positive link 200 or 210, the neutral link 400 or 410 and the ground link 300 or 310 to retain these links in a position that is electrically connectable with the positive, neutral and ground wires of the cables retained in the container 100 respectively.

In the following paragraphs, various example ng apparatuses are disclosed in detail.

Example circuiting devices are disclosed herein in connection with FIGS. 2-25.

Figure 2:
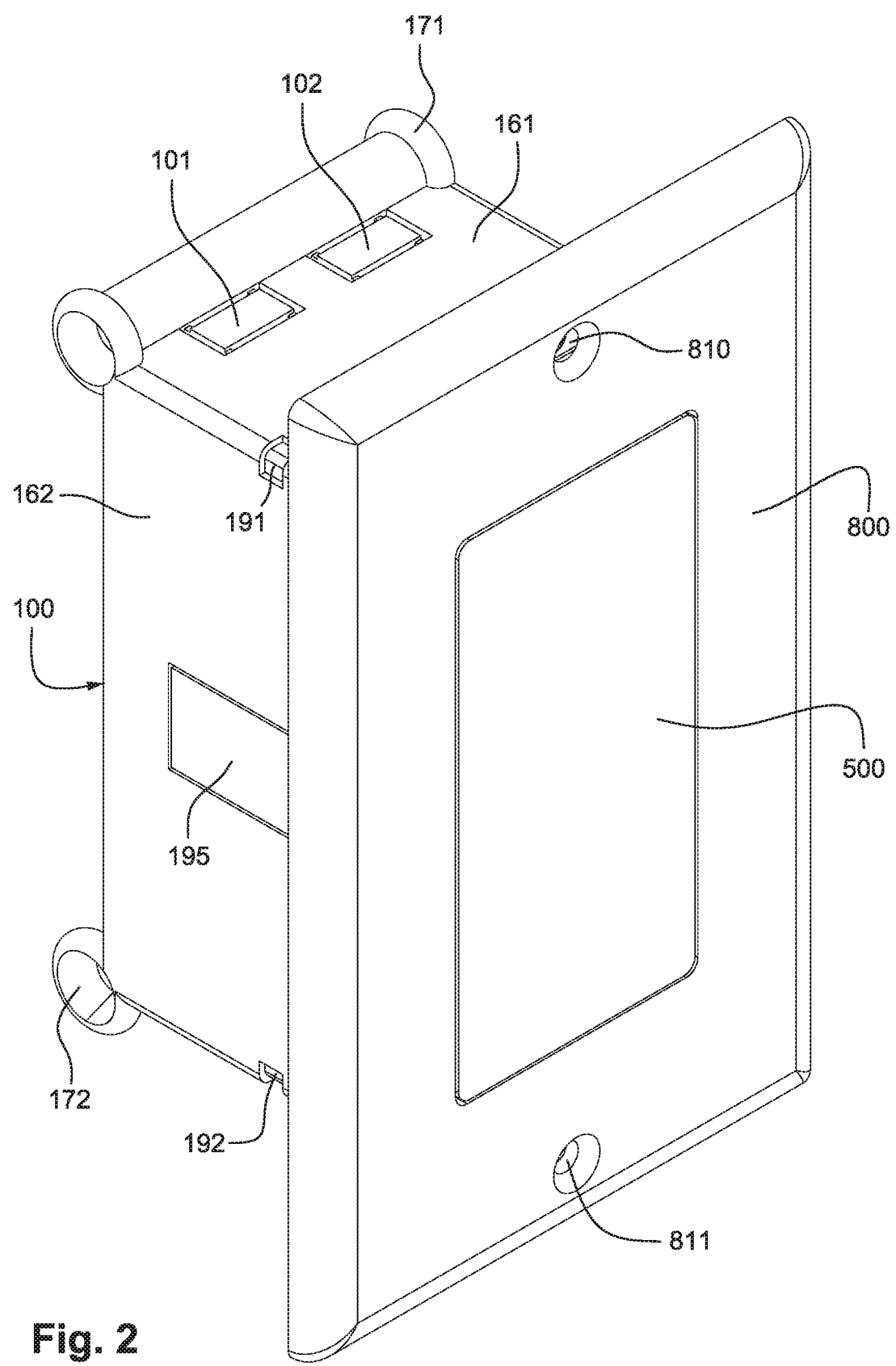
FIG. 2 illustrates a top-left view of a circuiting device.
Figure 4:
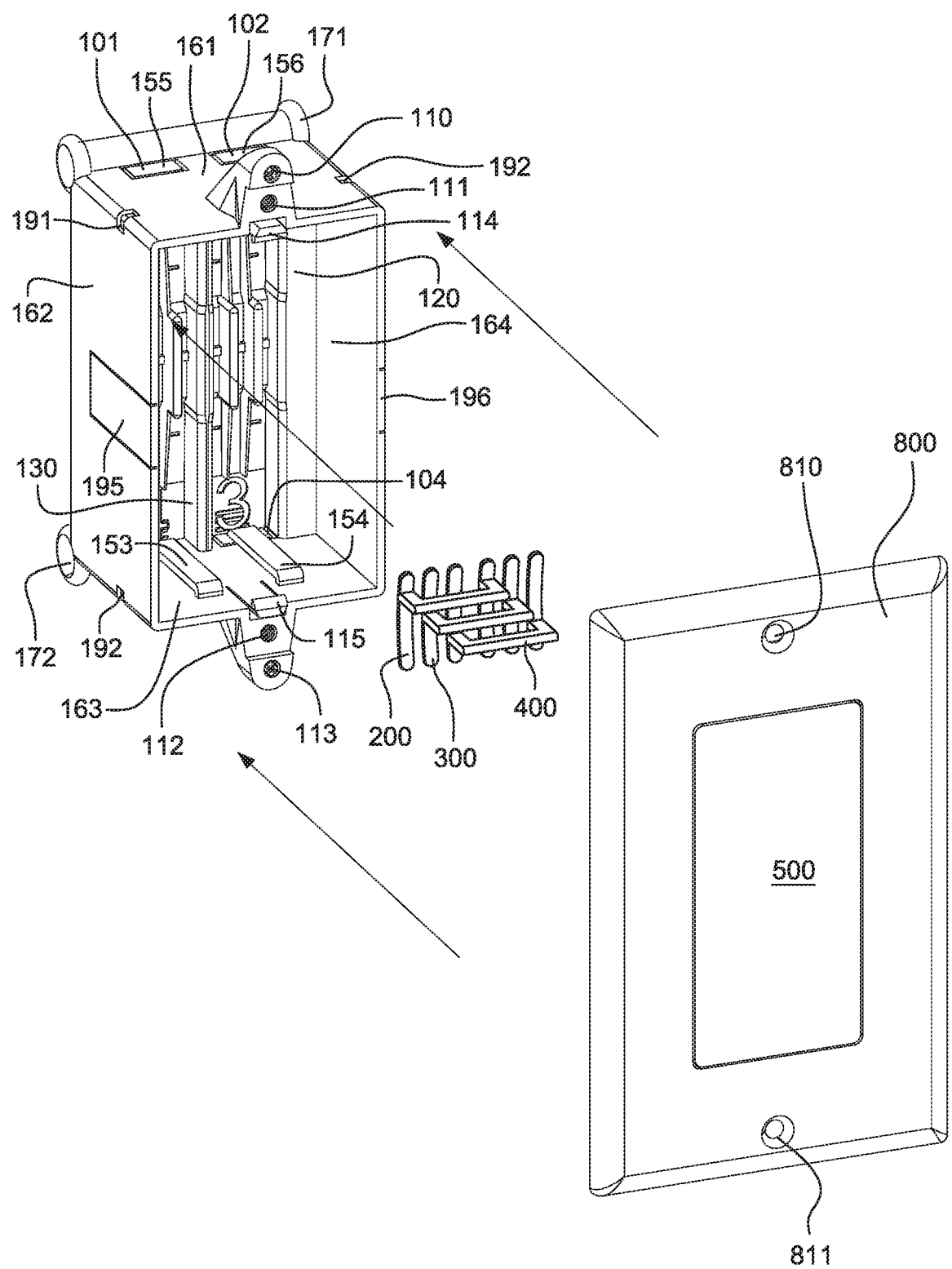
FIG. 4 illustrates an exploded, top-left view of a circuiting device with electrical links inserted in the container.

FIGS. 2-4 illustrate top-left views of an example circuiting assembly comprising the container 100, the circuiting device 500 and the outer cover plate 800 discussed above. In the example circuiting assembly, the container 100, the circuiting device 500 and the outer cover plate 800 may be attached to each other in any manner, for example, by having screws or bolts pass through not only the cavities 810 and 811 of the cover plate 800, then the cavities 510 and 511 of the circuiting device 500, and then enter into the threaded holes or nuts 110 and 113 of the container 100.

Figure 14:
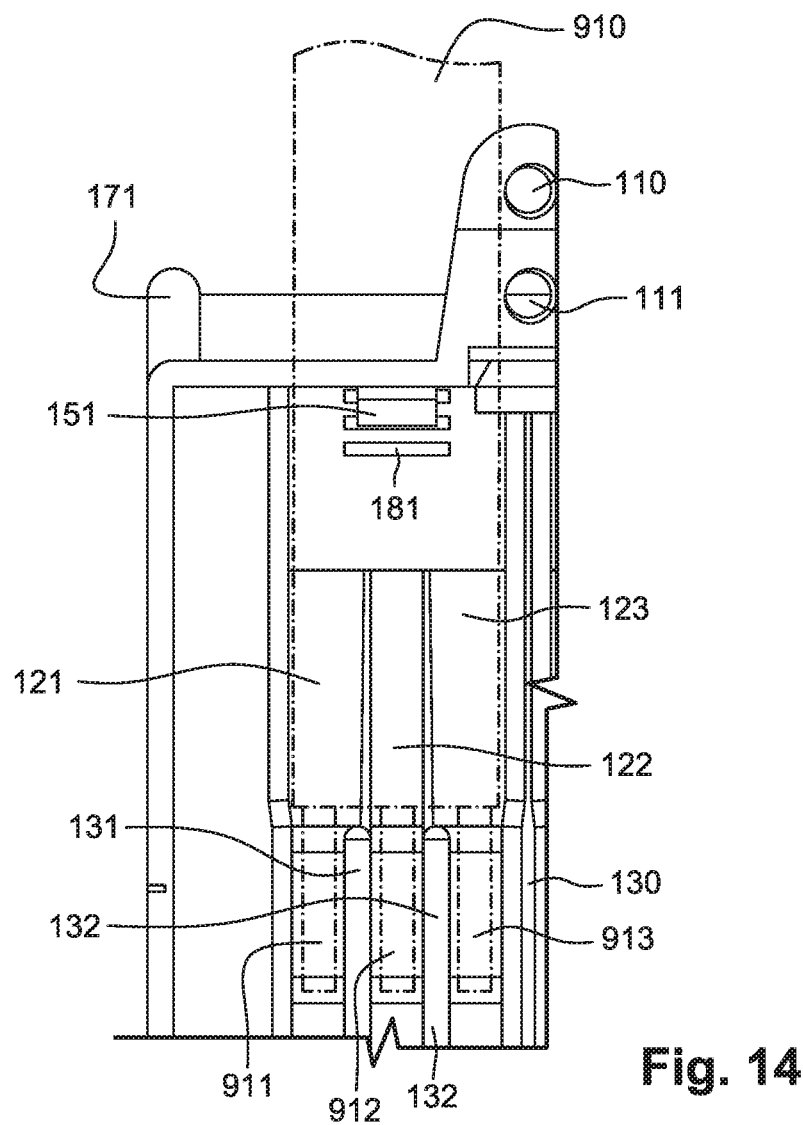
FIG. 14 illustrates a top view of a portion of a container.
Figure 59:
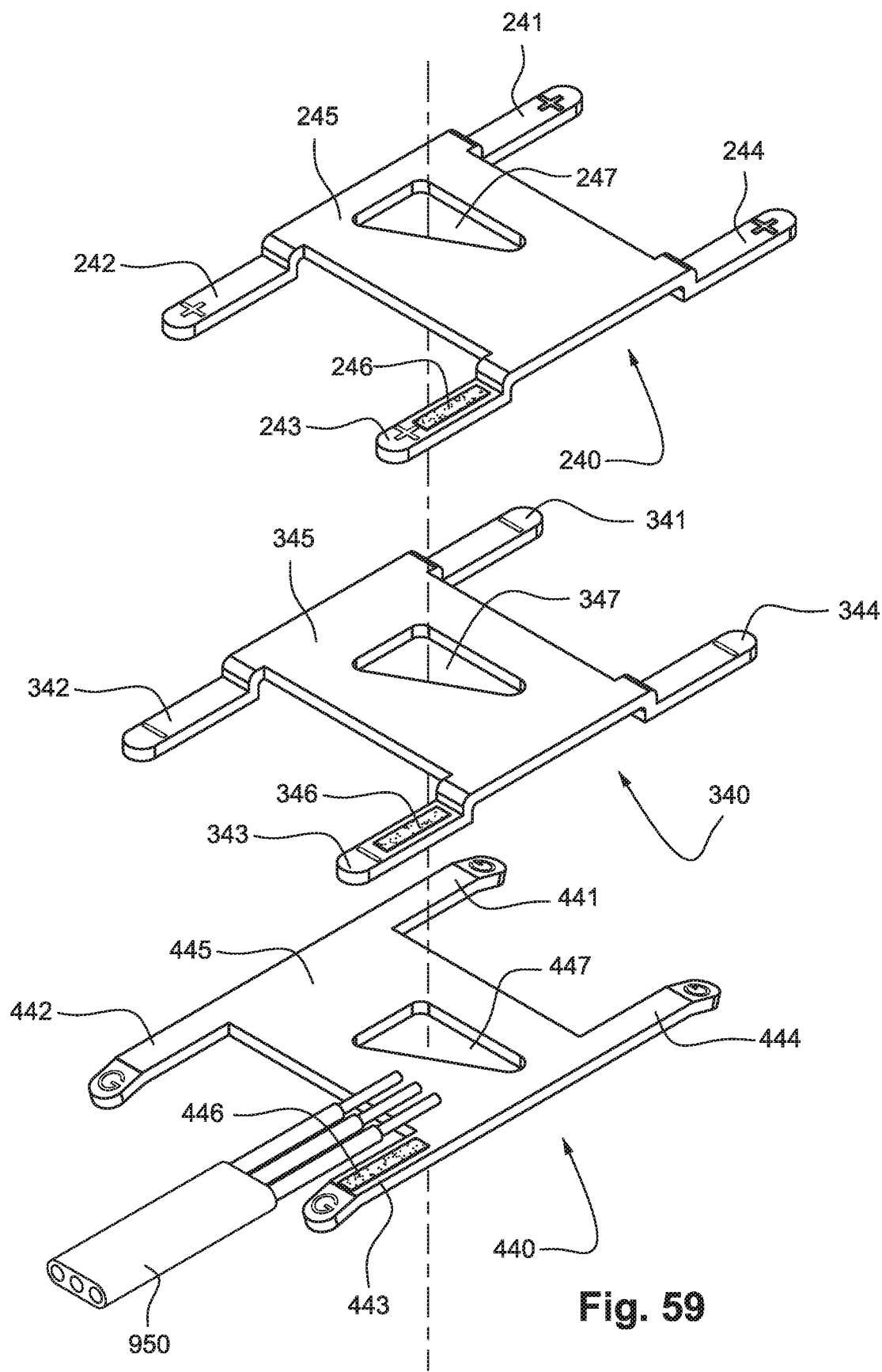
FIG. 59 illustrates a positive link, ground link and neutral link.
Figure 60:
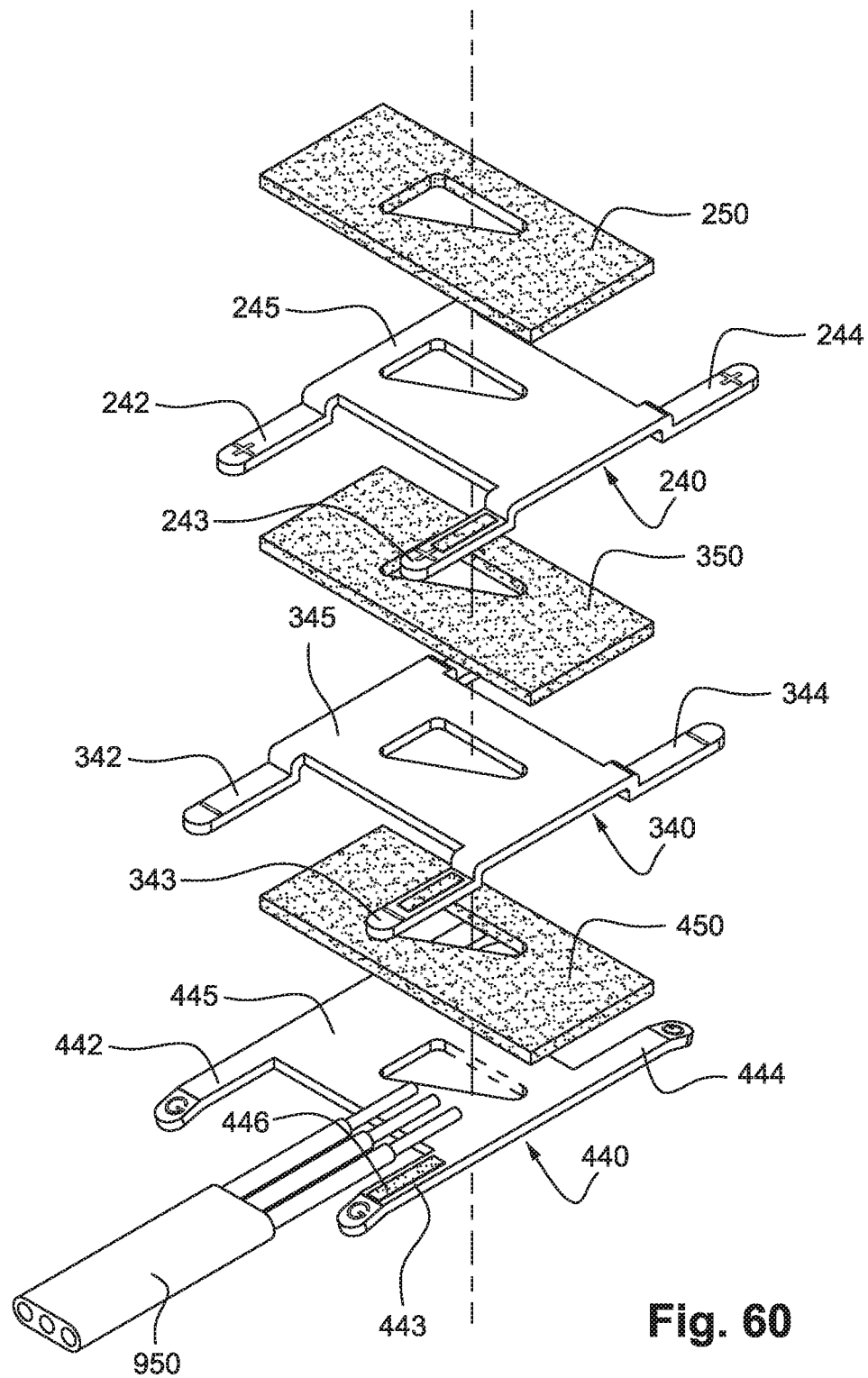
FIG. 60 illustrates a positive link, ground link and neutral link with insulating layers.

In some example embodiments, as shown in FIGS. 3-4, the positive link 200, the neutral link 400 and the ground link 300 are disposed within the container 100 and above the inner surface of the base 120 of the container 100. In an example embodiment, the positive link 200, the ground link 300 and the neutral link 400 may be disposed on top of one or more cable(s) retained in the container 100, as illustrated in FIGS. 14, 15A and 15B. The circuiting device 500 is engaged with the positive link 200, the neutral link 400 and the ground link 300 to retain these links in a position that is electrically connectable with exposed positive, neutral and ground wires of one or more cables retained in the container 100 respectively. In other example embodiments, at least one of the positive link 200, the neutral link 400 and the ground link 300 may be disposed on the surface of the base 120 but underneath the cables retained in the container 100. In order to meet certain electrical code requirements, it may be necessary for only the ground link 300 to be disposed on the surface of the base 120 as described. For example, as illustrated in FIGS. 59 and 60, a ground link may be disposed underneath the cables retained in the container 100, for example, for better insulation from the positive and neutral wires and links.

Figure 5:
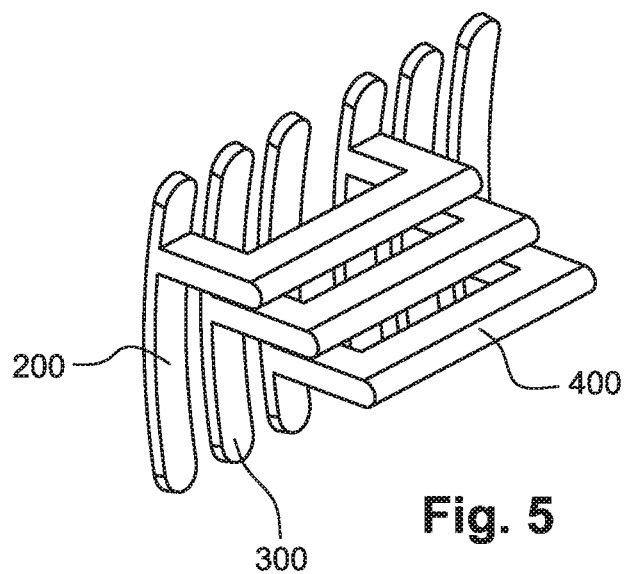
FIG. 5 illustrates a top-left, view of positive, ground and neutral links.

FIG. 5 illustrates a top-left view of an example positive link 200, neutral link 300 and ground link 400. In certain example embodiments, these links comprise electrically conductive material(s). In an example embodiment, each of these links may have a central piece and up to four legs extending from the central piece. The central piece of a link may be of any shape, and may or may not be a substantially flat plate. The central piece may comprise multiple separate or integrated portions. In an example embodiment, the central pieces of the positive link 200, the neutral link 400 and the ground link 300 are covered with insulating material(s). If sufficient distance is maintained between the positive link 200, the neutral link 400 and the ground link 300, it may be safe to leave the links bare (i.e., uninsulated). For example, ⅛ of an inch may be sufficient clearance to meet certain safety requirements. With the shapes illustrated, it is possible to maintain ⅛ of an inch of clearance between the positive link 200, the neutral link 400 and the ground link 300 when installed.

Figure 6:
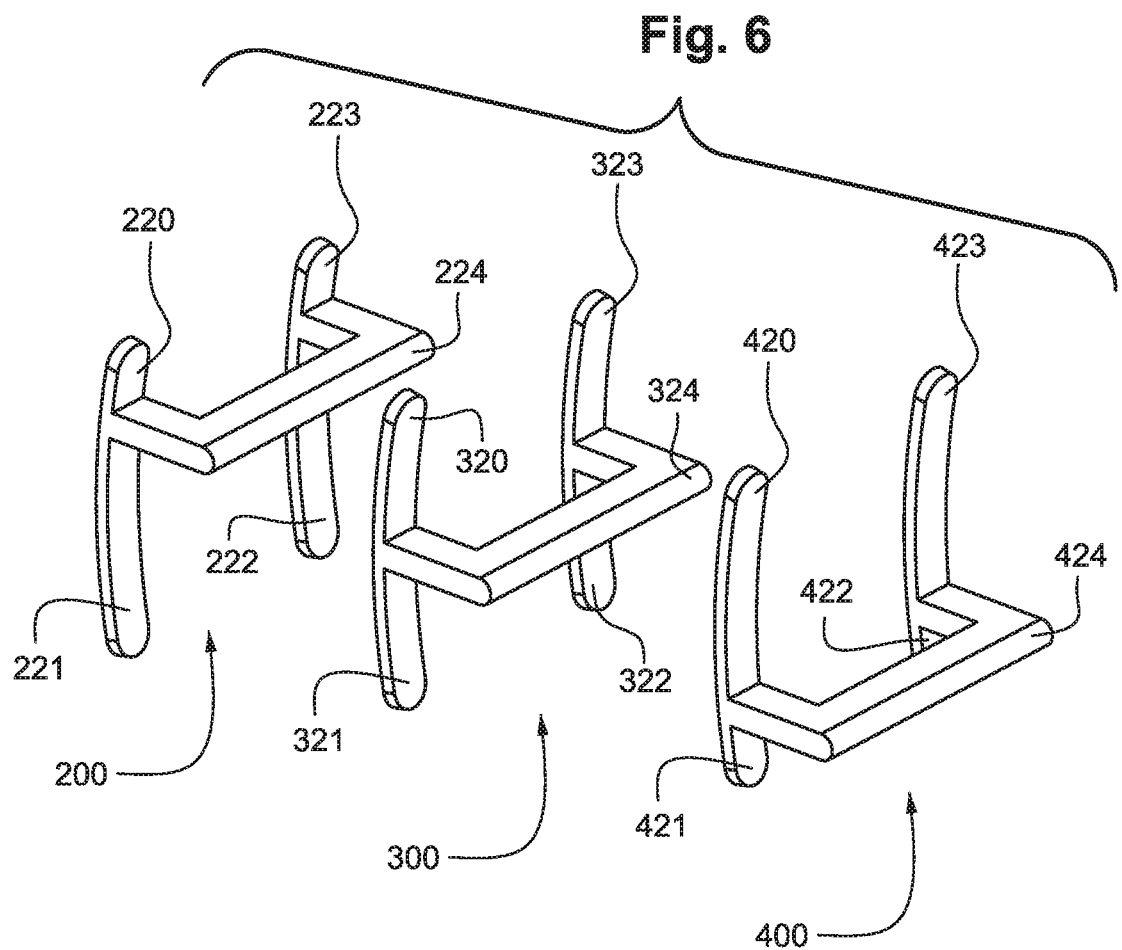
FIG. 6 illustrates an exploded, top-left view of positive, ground and neutral links.

As detailed in FIG. 6, in an example embodiment, the positive link 200 has positive legs 220, 221, 222 and 223 constructed to electrically connect with exposed positive wires of one or more cables. In a similar manner, the neutral link 400 has neutral legs 420, 421, 423 and 424 constructed to electrically connect with exposed neutral wires of one or more cables, and the ground link 300 has ground legs 320, 321, 322 and 323, which are constructed to electrically connect with exposed ground wires of one or more cables.

Figure 7:
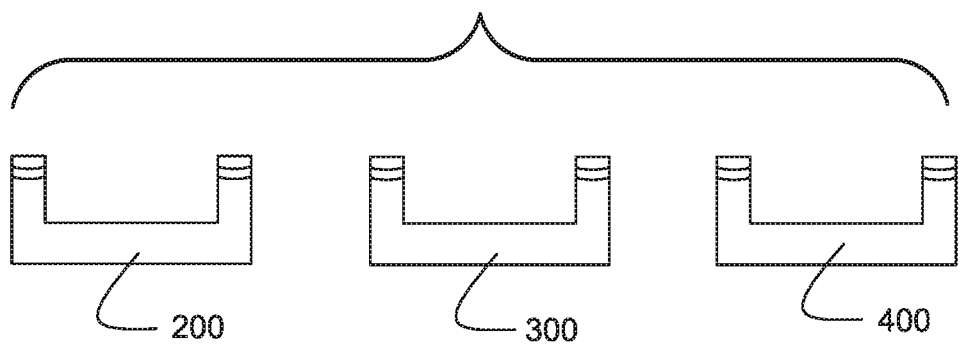
FIG. 7 illustrates a front elevation view of positive, ground and neutral links.
Figure 8:
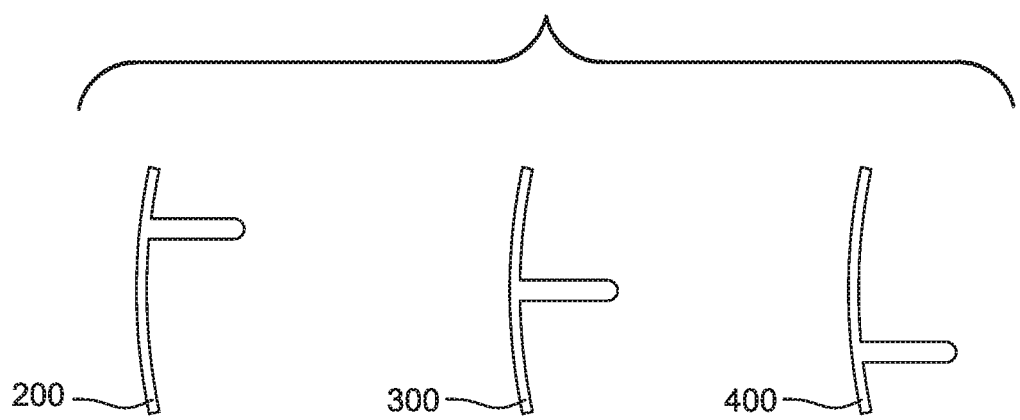
FIG. 8 illustrates a left side elevation view of positive, ground and neutral links.
Figure 9:
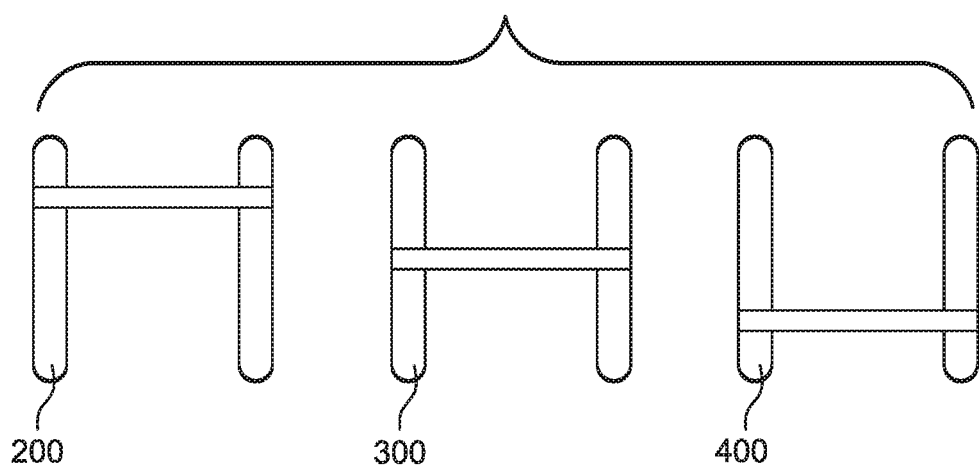
FIG. 9 illustrates a top elevation view of positive, ground and neutral links.

FIGS. 7-9 illustrate the links 200, 300 and 400 viewed from different directions. In certain example embodiments, each of the positive link 200, neutral link 400, and ground link 300 has a U-shaped profile when viewed in a first direction, for example, a direction vertical to the front side 161 or the back side 163 of the container 100, as shown in FIG. 7. Each of the positive link 200, neutral link 400, and ground link 300 has a T-shaped profile viewed from a second direction, for example, a direction vertical to the left side 162 or the right side 164 of the container 100, as shown in FIG. 8. As illustrated, the top or cross of the T-shape (the left side in FIG. 8) is curved but could also be straight or other geometries. The curve may help a wire slide under the link, but other geometries may provide alternative benefits such as ability to compress more than one wire diameter. Each of the positive link 200, neutral link 400, and ground link 300 has an H-shaped profile viewed from a third direction, for example, a direction vertical to the base 120 of the container 100, as shown in FIG. 9. In this embodiment, the first, second and third directions are orthogonal to each other.

In other example embodiments, the number of legs of any of the positive, ground and neutral links may be customized depending on the specific configuration of a wiring apparatus. In certain example embodiments, a positive link, a ground link and a neutral link may each have only two or three legs, as there may be only two or three cables retained within the container. That is, in an example embodiment, each of the positive, ground and neutral links may only have two legs, as wires of only two cables would need to be connected by these links. Moreover, the two legs of each link may be on the same side or on two opposite sides of the link, depending on which side(s) these two cables will come from. Other types of links instead of those illustrated may be provided. Links may be flat, tubular, formed wire, 3D printed, flexible, graphene, and/or integral to the container (e.g., molded into the container, printed on the container, sprayed onto the container, etc). As will be appreciated by those of ordinary skill, the links described herein are examples which convey the overall concept and should not be considered limiting.

Figure 12:
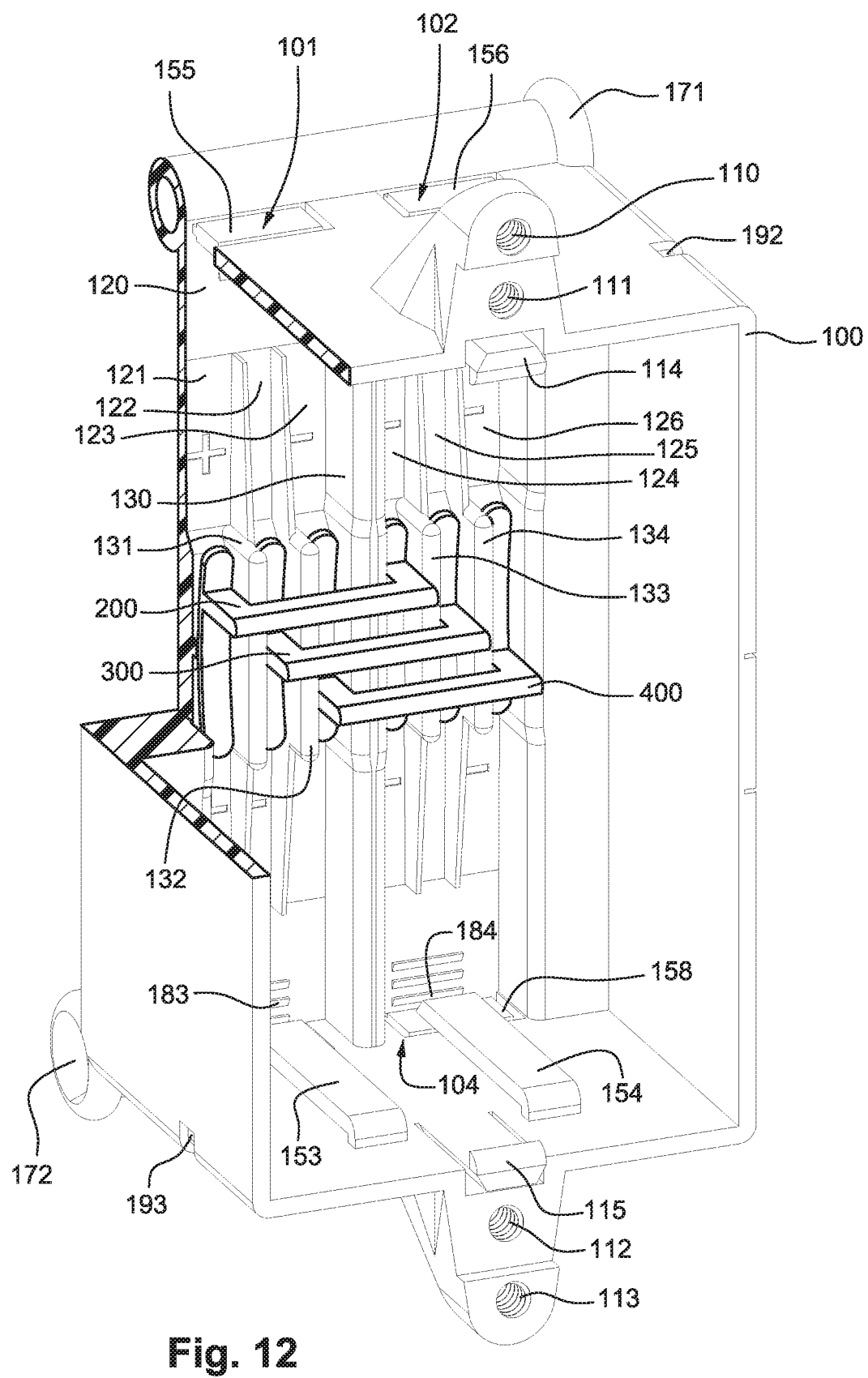
FIG. 12 illustrates a cut-away, left-top view of a container with example positive, neutral and ground links disposed therein.

As shown in FIGS. 8 and 9, the central pieces of the positive link 200, the ground link 300 and the neutral link 400 are positioned such that these central pieces are spaced apart along a direction, e.g., along a longitudinal axis. Moreover, FIGS. 5 and 12 show that legs of the positive link 200, the ground link 300 and the neutral link 400 may also be spaced apart from each other along another direction, e.g., along a horizontal axis. In this way, these links will sufficiently separate from each other to prevent a short-circuit.

In some example embodiments, insulating material(s) may be between the central pieces of different links, between legs of different links, and/or on top of the central pieces of different links to further make sure that different links would not be electrically connected with each other to cause short-circuiting.

In an example embodiment, two or more positive links may be linked together to be a long positive multi-link, two or more neutral links may be linked together to form a long neutral multi-link, and two or more ground links may be linked together to form a long ground multi-link. These long positive, neutral and ground multi-links may be used to link together two or more containers when the tear-out pieces (e.g., the tear-out pieces 195, 196 of the container 100) between these containers are removed.

In the example embodiments illustrated in FIGS. 7-9, the positive, neutral, and ground links 200, 300 and 400 have similar profiles viewed from different directions. In other example embodiments, the positive, neutral, and ground links 200, 300 and 400 may have different profiles viewed from at least one direction.

FIG. 10 illustrates a top-right view of a circuiting device.

In an example embodiment, the container 100 further comprises mounting screw tubes 171 and 172 attached to the base 120 and constructed to mount the container 100 into a wall or any other location.

Figure 11:
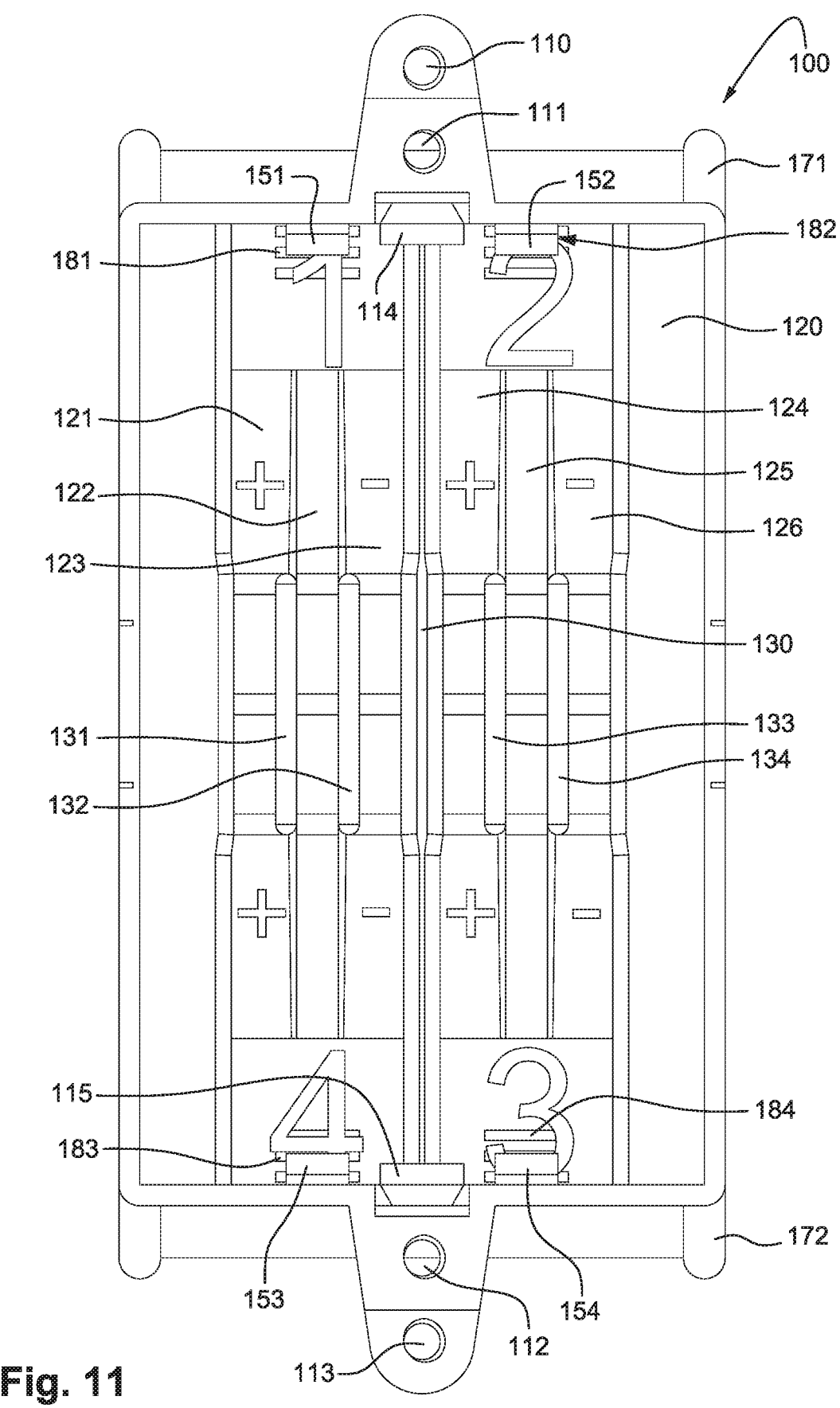
FIG. 11 illustrates an elevation view of a container.

FIG. 11 illustrates a front view of a container. A cable separator 130 comprising non-conductive material(s) is extended from the inner surface of the base 120 of the container 100 to separate one cable from another, e.g., to separate the cable 910 from the cable 930 and to separate the cable 920 from the cable 940. A cable separator may have a symmetrical or asymmetrical structure. In certain example embodiments, as shown in FIGS. 4, 12 and 15B, the cable separator 130 may have multiple portions of various heights, e.g., a central portion of the cable separator 130 may be higher the other portions of the cable separator 130. In an example embodiment, the height of the cable separator 130 may gradually decrease from a central portion towards the front side 161 or the back side 163 of the container 100. In alternative example embodiments, different portions of the cable separators 130 may have the same height. In an example embodiment, a container may have a cable separator only at its central part to separate at least the exposed portions of wires of different cables. In an alternative example embodiment, a container may have a cable separator extending from its front side to its back side.

As shown in FIG. 12, the positive link 200 or 210, the neutral link 400 or 410, and the ground link 300 or 310 each connect respective wires of cables across the cable separator 130.

Moreover, FIG. 12 shows that a plurality of wire separators 131, 132, 133 and 134 comprising non-conductive material(s) are extended from the inner surface of the base 120 of the container 100 to separate one wire of a cable from another wire of the same cable. In this way, the exposed positive, neutral and ground wires of one or more cables are less likely to electrically connect with each other, for example, to cause a short circuit.

In an example embodiment, one of the wire separators 131, 132, 133 and 134 may have multiple portions with different heights, and a central portion of these wire separators may be higher than the other portions of the cable separator 130. For example, the height of one of the wire separators 131, 132, 133 and 134 may gradually decrease from its central portion towards the front side 161 or the back side 163 of the container 100. In alternative example embodiments different portions of the wire separators 131, 132, 133 and 134 may have the same height. In an example embodiment, a container may have wire separators only at its central part to separate at least the exposed portions of wires. In an alternative example embodiment, a container may have wire separators extending from its front side to its back side.

In an example embodiment, the overall height of the cable separator 130 is larger than the average height of each of the wire separators 131, 132, 133 and 134. In alternative example embodiment, the overall height of the cable separator 130 may be the same or smaller than the average height of each of the wire separators 131, 132, 133 and 134.

Figure 13:
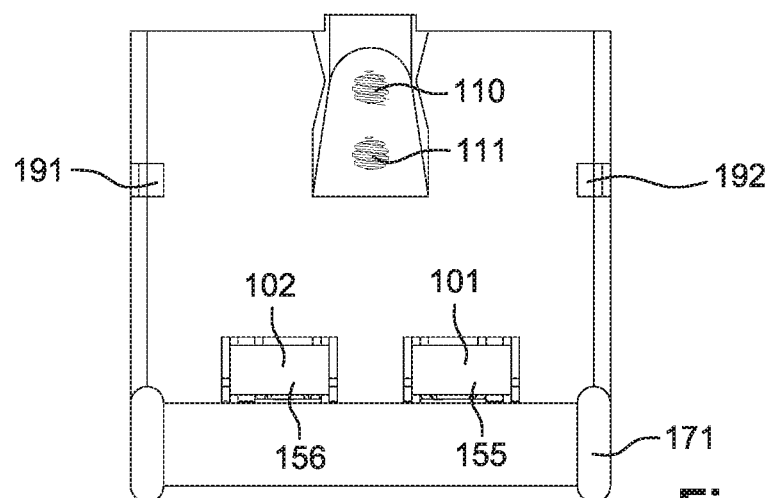
FIG. 13 illustrates a front view of a container.

By virtue of the wire separators 131, 132, 133 and 134 and the cable separator 130, a plurality of spaced recesses 121, 122, 123, 124, 125 and 126 are formed on the inner surface of the base 120 of the container 100, and each is constructed to receive one or more positive wire(s), ground wire(s) or neutral wire(s) of one or more cables. FIG. 13 shows that, in an example embodiment, the first cable entry 101 and the second cable entry 102 are each constructed to position a cable in the container 100 from the front side 161 of the container 100. As shown in FIG. 14, when the cable 910 is positioned in the container 100, the spaced recess 121 is constructed to dispose the positive wire 911 of the first cable 910, the spaced recess 122 is constructed to dispose the ground wire 912 of the cable 910, and the spaced recess 123 is constructed to dispose the neutral wire 913 of the cable 910. As a result, the positive wire 911, ground wire 912 and neutral wire 913 of the cable 910 is separated from each other by the wire separator 131 and 132. In an example embodiment, the exposed portions of the positive, ground and neutral wires of a cable are disposed on the central portion of the base 120, so that the central portions of the wire separators 131, 132, 133 and 134 and the cable separator 130 are higher than the other portions to make these exposed wires more securely separated from each other.

In certain example embodiments, a spaced recess may be constructed to dispose the wires and cables when the cables are inserted into the container 100 from opposite sides. As shown in FIG. 15A, the spaced recess 121 is constructed to dispose the positive wire 911 of the cable 910 inserted from the front side 161 of the container 100, and to dispose the positive wire 921 of the cable 920 inserted from the back side 163 of the container 100. The spaced recess 121 may have a sloped bottom surface.

In the embodiment, as shown in FIG. 15B, the positive link 200, the ground link 300 and the neutral link 400 are disposed on top of the exposed wires of the cable 910, 920, 930 and 940 to make their legs electrically connected with their corresponding wires. In other example embodiments, one or more of the positive link 200, the ground link 300 and the neutral link 400 may be next to or beneath one or more of the exposed wires of the cables 910, 920, 930 and 940 to electrically connect with their corresponding wires.

As shown in FIG. 15A, in an example embodiment, while these links 200, 300 and 400 are disposed within the container 100, the positive legs 220, 221, 222 and 223 of the positive link 200, the neutral legs 420, 412, 422 and 423 of the neutral link 400, and the ground legs 320, 321, 322 and 323 of the ground link 300 are spaced apart along one direction, e.g., a horizontal direction. Moreover, a central piece of the positive link 200, a central piece 415 of the neutral link 400 and a central piece of the ground link 300 are spaced apart along another direction, e.g., a longitudinal direction. In the embodiment, the first direction is orthogonal to the second direction.

In some example embodiments, one or more pads comprising insulating material(s) may be inserted between central pieces of the links 200, 300 and/or 400, between legs of one or more of these links, and/or on top of the links to make sure these links will not be electrically connected with one another to cause a short circuit. In an example embodiment, these insulating pads may be constructed to surround and/or cross the central pieces of the links 200, 300 and/or 400.

In certain example embodiments, in a first direction, the positive link 200 is configured to be spaced apart from a neutral wire and a ground wire of any of the cables retained in the container 100, such as any of the neutral wires 913, 923, 933, and 943 of the cables 910, 920, 930 and 940, and any of the ground wires 912, 922, 932, and 942 of the cables 910, 920, 930 and 940. Moreover, in a second direction, the central piece 224 of the positive link 200 comprises a portion configured to be spaced apart from any of the cables 910, 920, 930 and 940 retained in the container 100. The first and second directions may be orthogonal to each other. For example, the first direction may be a direction perpendicular to the left side 162 or right side 164 of the container 100, while the second direction may be a direction perpendicular to the rear base 120 of the container 100.

Similarly, in an example embodiment, in a first direction, the neutral link 400 is configured to be spaced apart from a positive wire and a ground wire of any of the cables retained in the container 100, such as any of the positive wires 911, 921, 931, and 941 of the cables 910, 920, 930 and 940, and any of the ground wires 912, 922, 932, and 942 of the cables 910, 920, 930 and 940. Moreover, in a second direction, the central piece 415 of the neutral link 400 comprises a portion configured to be spaced apart from any of the cables retained in the container 100. The first and second directions may be vertical to each other.

In another example embodiment, in a first direction, the ground link 300 is configured to be spaced apart from a positive wire and a neutral wire of any of the cables retained in the container 100, such as any of the positive wires 911, 921, 931, and 941 of the cables 910, 920, 930 and 940, and any of the neutral wires 913, 923, 933, and 943 of the cables 910, 920, 930 and 940. Moreover, in a second direction, the central piece 324 of the ground link 300 comprises a portion configured to be spaced apart from any of the cables retained in the container 100. The first and second directions may be vertical to each other.

Figure 16:
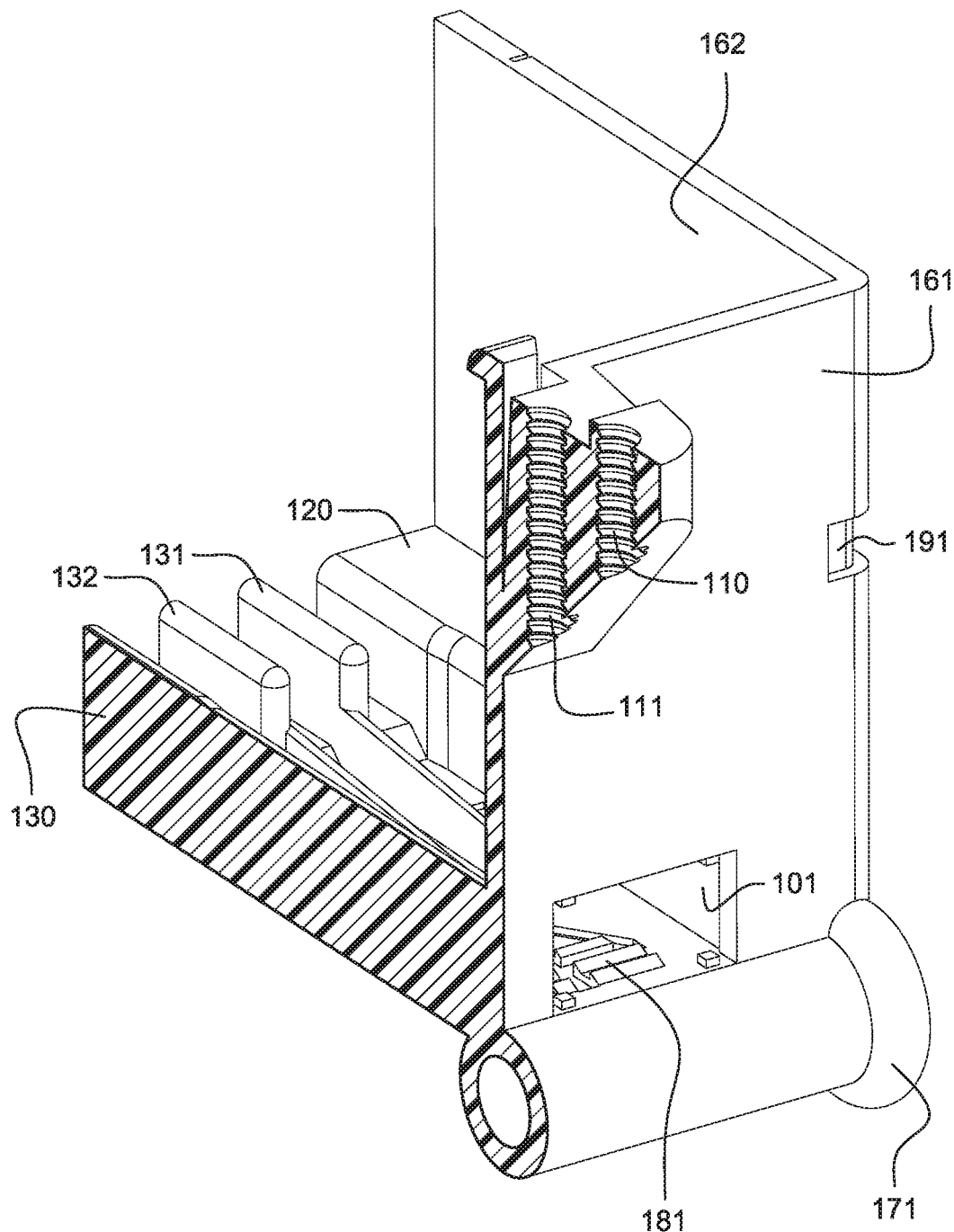
FIG. 16 illustrates a cut-away, front-right section view of a container.
Figure 17:
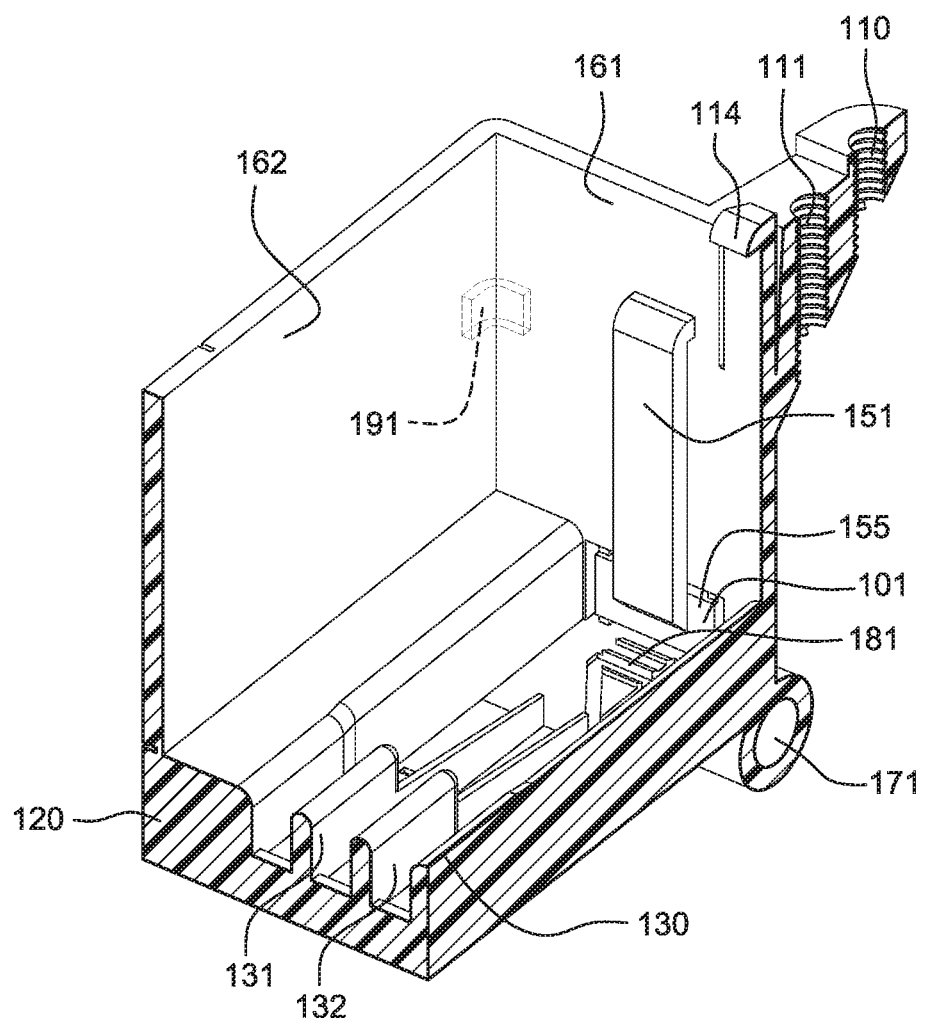
FIG. 17 illustrates a cut-away, back-right section view of a container.

FIGS. 16-17 illustrate further details of the structure of a non-limiting, example cable entry constructed to removably retain the end of a cable in the container 100. In an example embodiment, the cable entry 101 on the front side 161 comprises an entry cover 155, a cable clip 151, and a plurality of spaced protrusions 181 (e.g., triangular ridges) formed on the inner surface of the base 120 of the container 100. In an example embodiment, the entry cover 155 will be knocked out when a cable needs to be inserted into the container 100 via the cable entry 101. Once the cable is inserted into the container 100 through an opening formed by removing the entry cover 155, the cable clip 151 will generate a compressive force to retain the cable in position. Moreover, the plurality of spaced protrusions 181 on the inner surface of the base 120 are constructed to avoid slipping of the cable and work with the clip 151 to further lock the cable in position.

Figure 18:
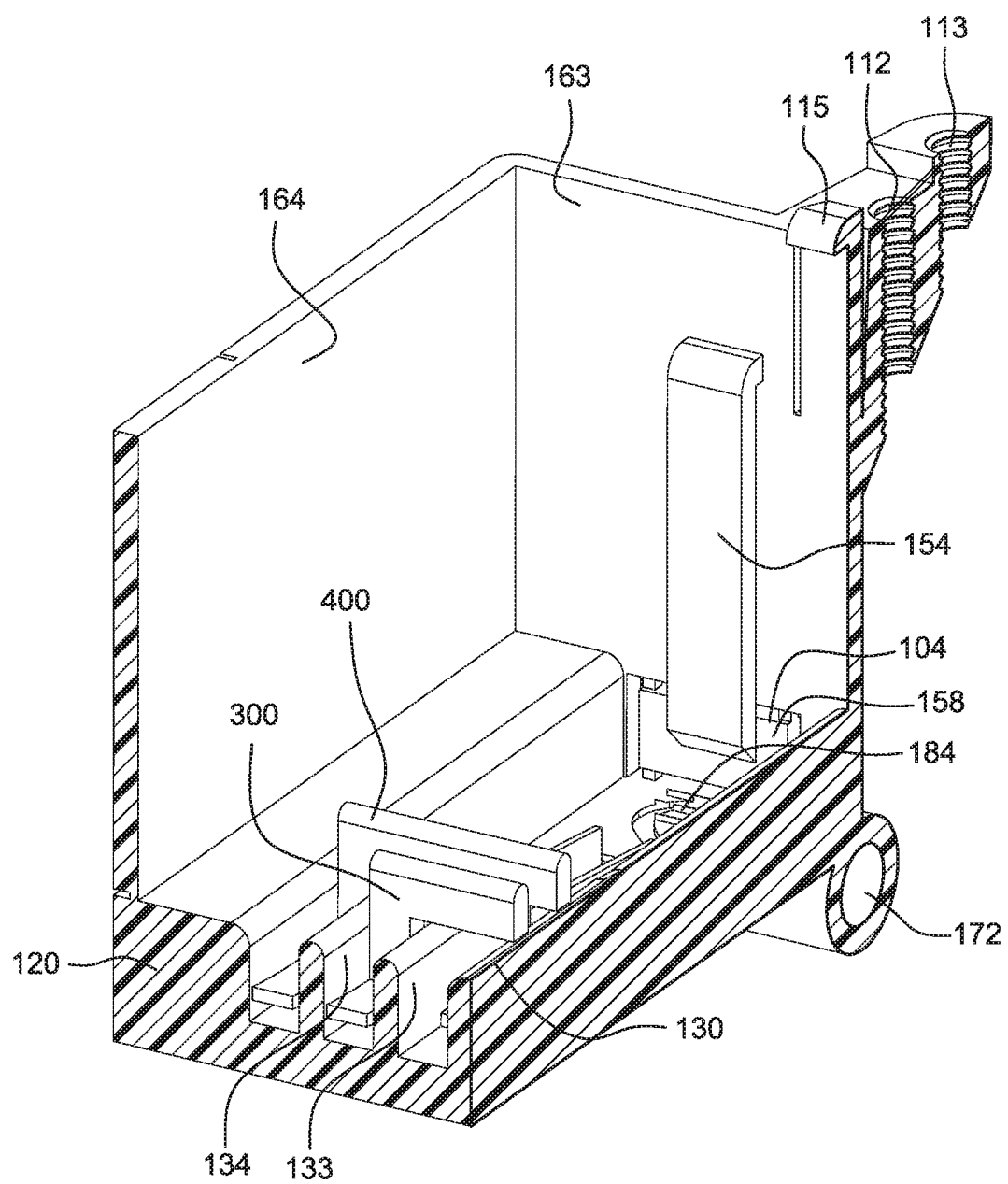
FIG. 18 illustrates a cut-away, front-left view of a container.

FIG. 18 shows the structure of another cable entry 104 on the back side 163. The cable entry 104 comprises an entry cover 158, a cable clip 154 generating a compressive force to retain a cable in position, and a plurality of spaced protrusions 184 formed on the inner surface of the base 120 to avoid slipping of the cable. Similarly, in certain example embodiments, the cable entry 102 may comprise an entry cover 156, a cable clip 152, and a plurality of spaced protrusions 182 formed on the inner surface of the base 120; and the cable entry 103 may comprise an entry cover 157, a cable clip 153 and a plurality of spaced protrusions 183 on the inner surface of the base 120. As shown in FIGS. 11 and 19, the four clips 151, 152, 153 and 154 are attached to the front side 161 or the back side 163 of the container 100, and the plurality of spaced protrusions 181, 182, 183 and 184 are formed on the floor of the container 100 close to respective cable entries, such that cables may be positioned in the container 100 through the cable entries 101, 102, 103 and 104 respectively. In an example embodiment, the cable clips 151, 152, 153 and 154 and the plurality of spaced protrusions 181, 182, 183 and 183 may comprise plastic material or any other non-conductive material.

In alternative example embodiments, a cable entry may comprise any other kind of automatic or manual mechanisms to retain a cable in position within the container 100 and to avoid slipping of the cable.

Figure 20:
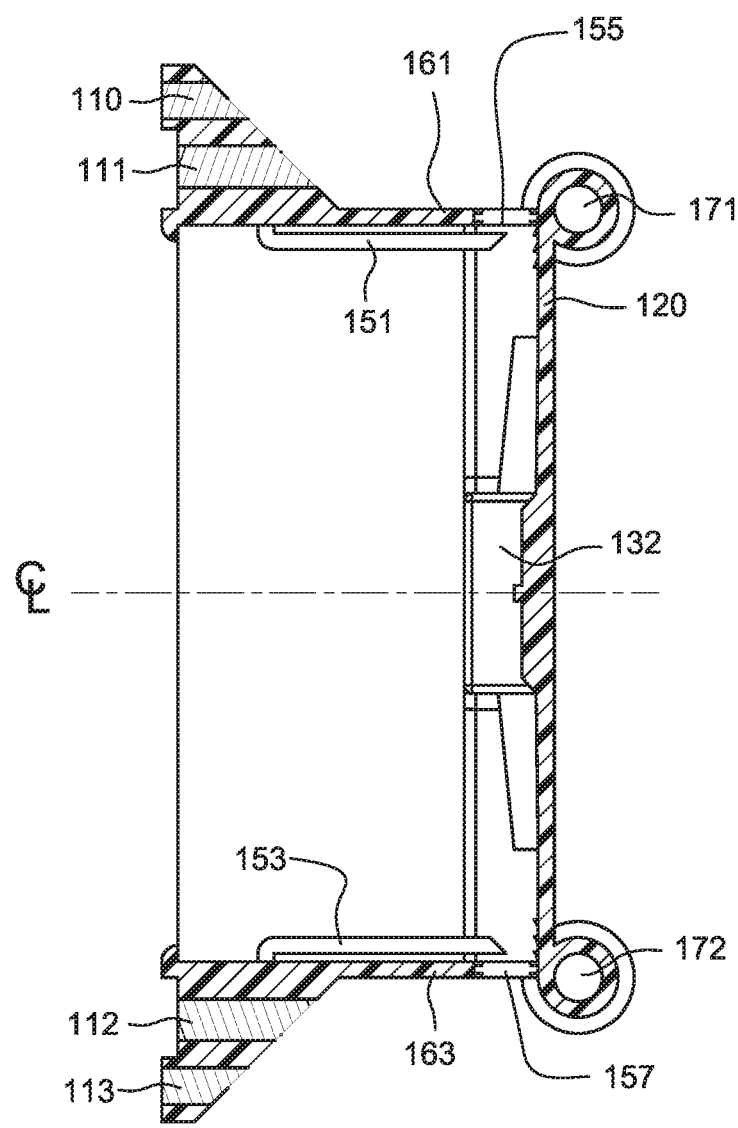
FIG. 20 illustrates a section view of a container along a long axis.

FIG. 20 illustrates a section view of a container along a long axis. The figure shows the mounting screw tubes 171 and 172 are formed on the front and back ends of the base 120 respectively and are constructed to mount the container 100 into a wall or other locations. The threaded holes or nuts 110, 111, 112 and 113 formed on the front or back end of the container 100 are constructed to receive screws or bolts such that an outer cover frame and an electrical device may be attached to the container 100. In FIG. 20, ends of the cable clips 151 and 153 are attached to the front side 161 and the back side 163 of the container 100 respectively, and the remaining portions of the cable clips 151 and 153 are spaced apart from the front side 161 and the back side 163 of the container 100 respectively. With this configuration, the cable clips 151 and 153 are fixed on one end but free to flex on another—e.g., the clips are cantilevered. When a cable is positioned in the container 100 via an opening of a cable entry, the cable clip of the cable entry will be pushed into a position that is further apart from its attached side of the container 100, such that a compressive force is generated to clip the cable in position and the force should increase if the cables are pulled out. FIG. 20 also shows a profile of the recesses formed on the inner surface of the base 120, which are described elsewhere.

Figure 21:
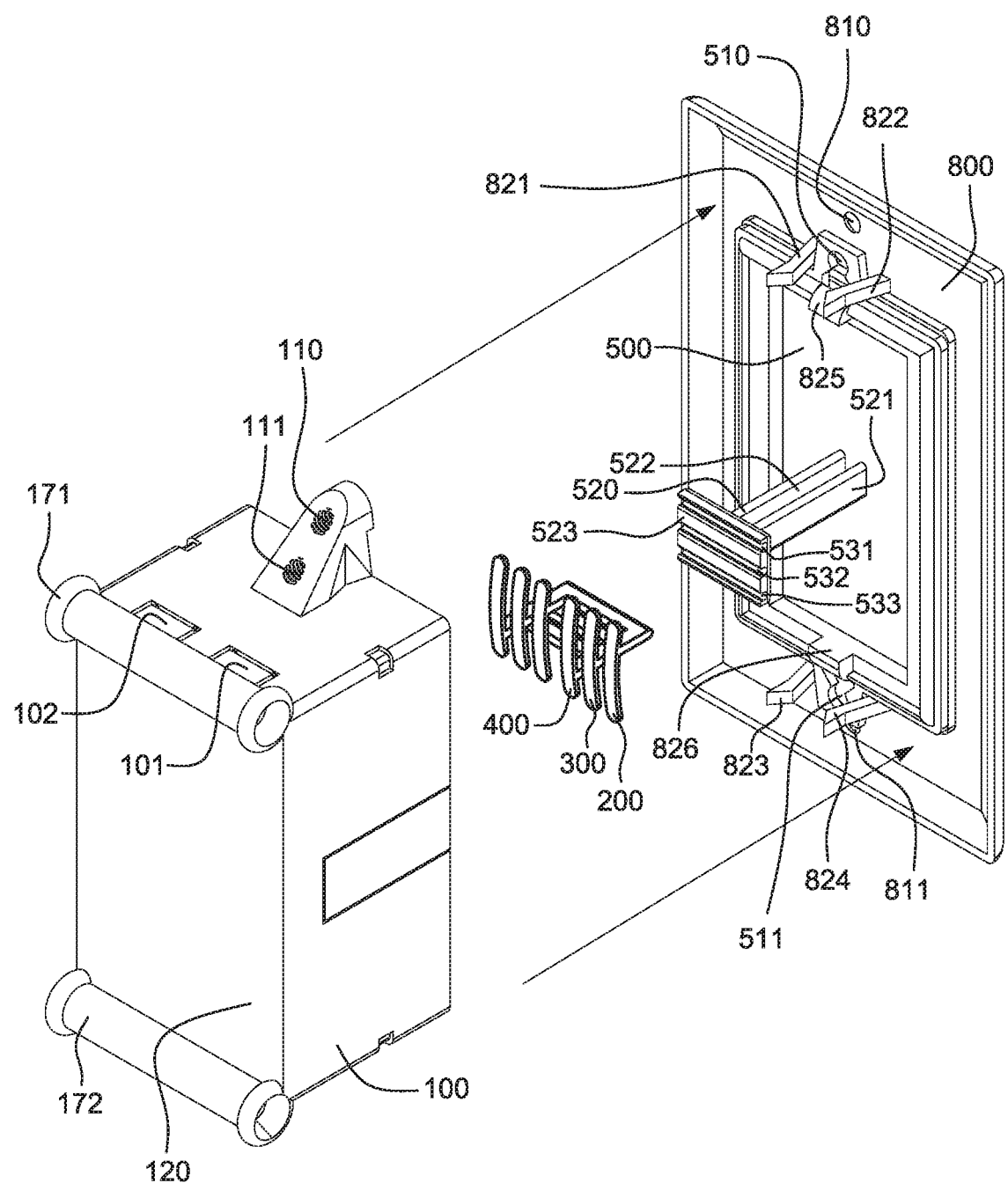
FIG. 21 illustrates an exploded, top-left view of a circuiting device with cover plate.
Figure 22A:
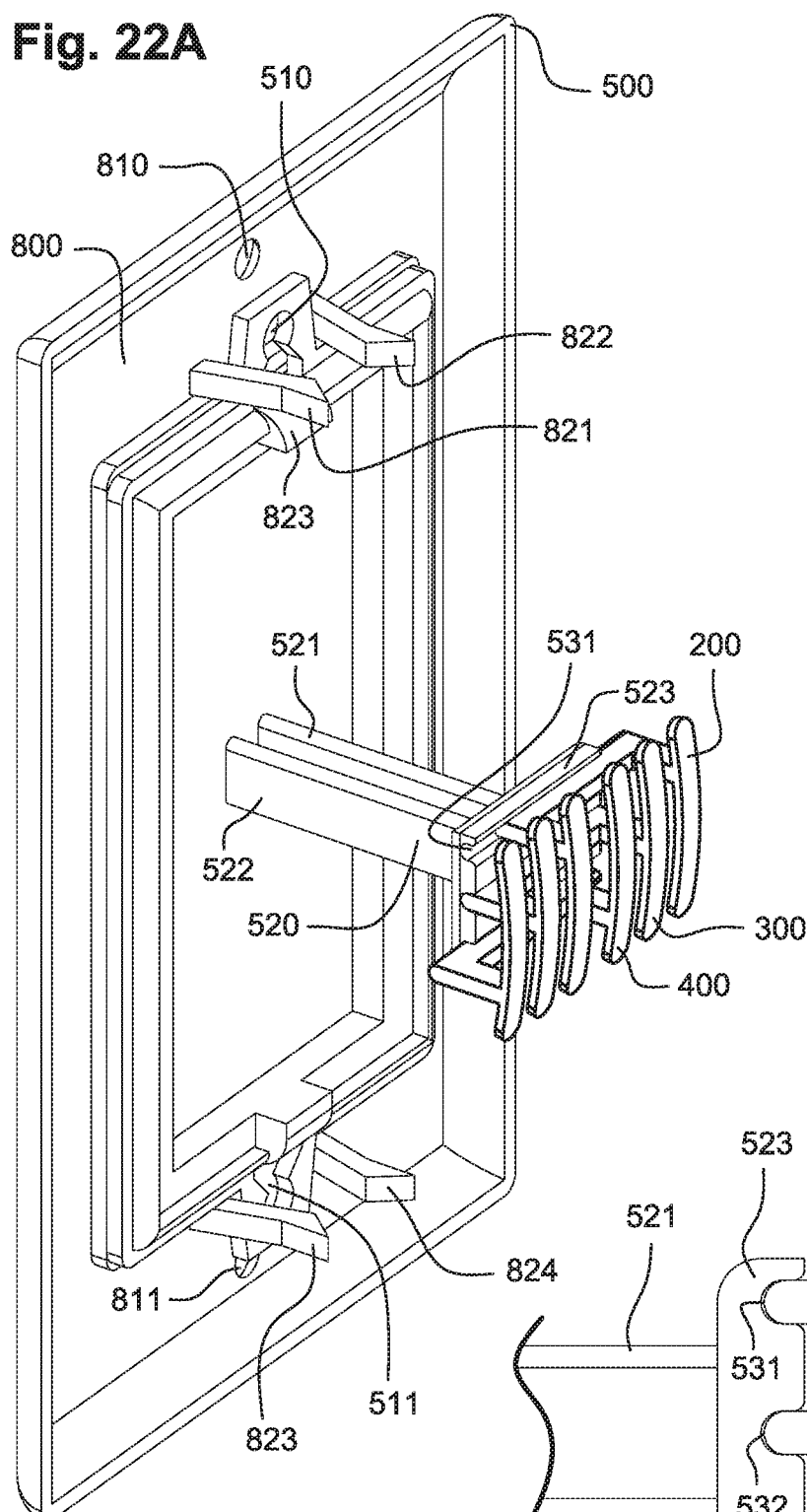
FIG. 22A illustrates a top-right view of a cover plate attached with a cover plate and engaged with positive, ground and neutral links.

FIG. 21 illustrates an exploded, top-left view of a circuiting device, and FIG. 22A illustrates a top-right view of a circuiting device 500 attached with the outer cover plate 800 and engaged with the positive, ground and neutral links 200, 300 and 400. In the embodiment shown in FIGS. 21 and 22A, the circuiting device 500 is attached with the outer cover plate 800. The outer cover plate 800 comprises clips 821 and 822 to clip on the top protruded portion of the circuiting device 500, and clips 823 and 824 to clip on the bottom protruded portion of the circuiting device 500.

In the embodiment, the circuiting device 500 comprises a supporting column 520 including a left supporting leg 521 and a right supporting leg 522, and an engaging portion 523. Moreover, the engaging portion 523 includes three grooves 531, 532 and 533 constructed to engage with the positive link 200, the ground link 300 and the neutral link 400 respectively. When the circuiting device 500 is mounted on the container 100, the engaging portion 523 of the supporting column 520 is engaged with the positive link 200, the ground link 300 and the neutral link 400, as detailed in FIG. 22B, in order to retain these links each in a position that they are electrically connectable with corresponding wires of cables retained in the container 100.

Figure 22B:
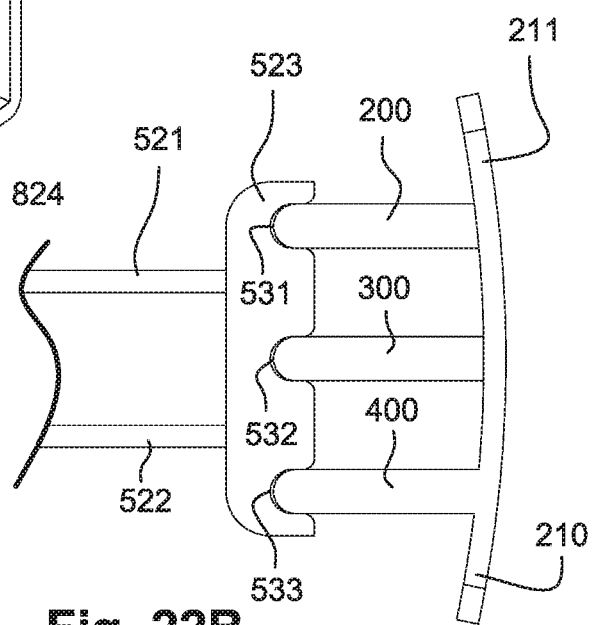
FIG. 22B illustrates positive, ground and neutral links engaged with the lower portion of a cover plate.
Figure 23A:
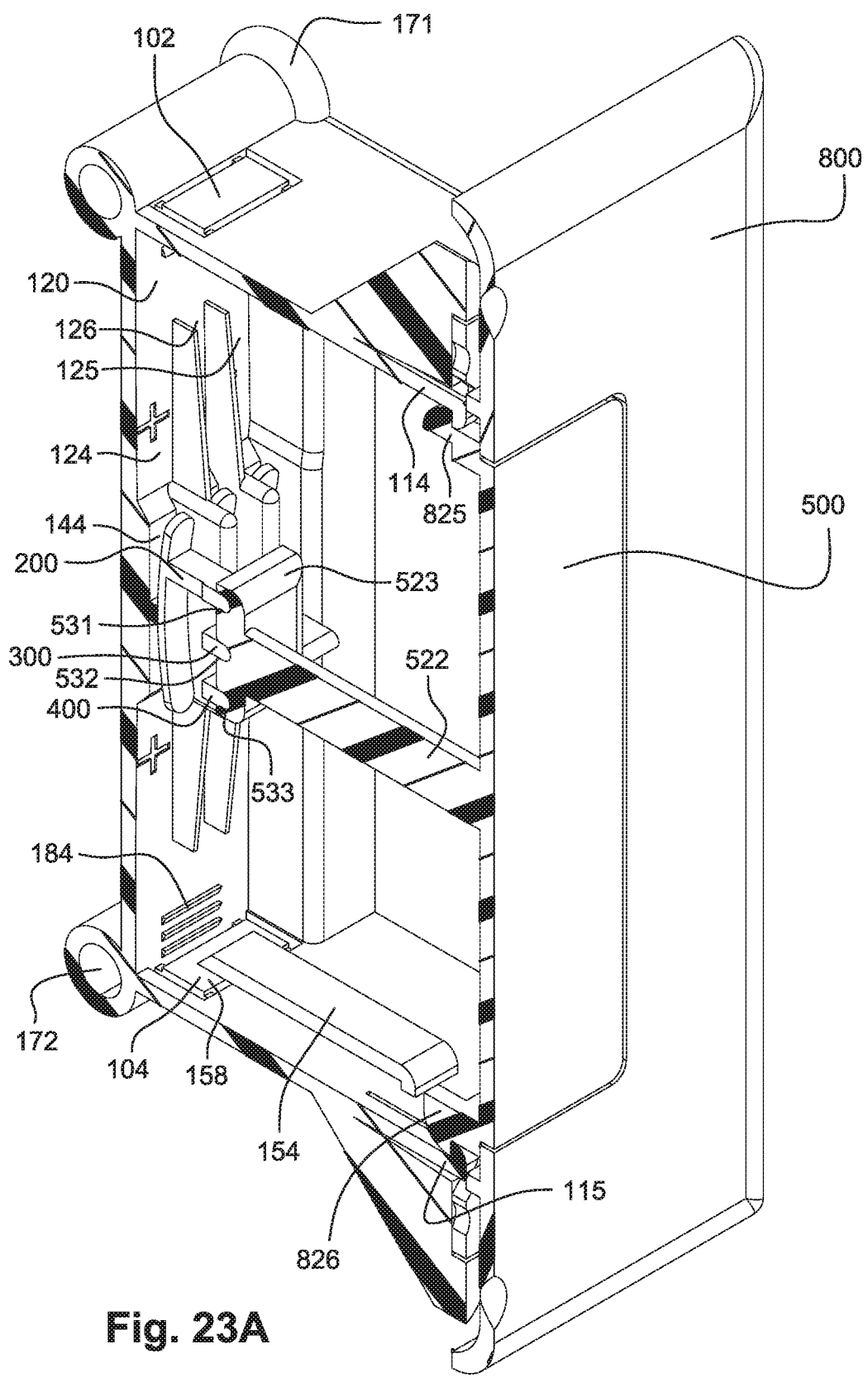
FIG. 23A illustrates a cut-away, top-left view of a circuiting device and container.
Figure 23B:
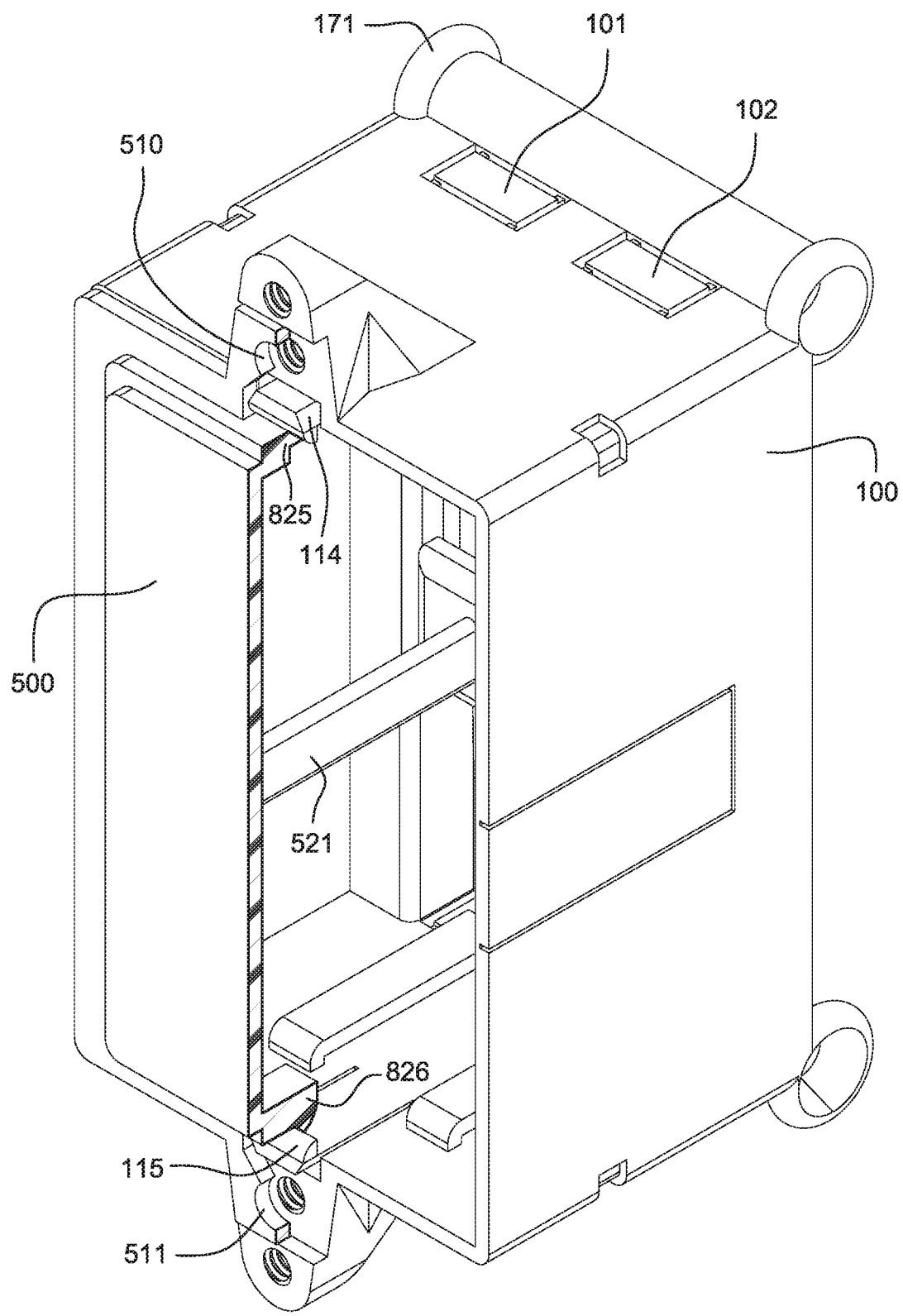
FIG. 23B illustrates a cut-away, top-right view of a circuiting device and container.

Moreover, as shown in FIGS. 21 and 22A-22B, the circuiting device 500 comprises a clip 825 and a clip 826 on the top and bottom ends of the circuiting device 500. The clips 825 and 826 are constructed to engage with the clips 114 and 115 of the container 100. The clips 825 and 826 may comprise plastic material and/or other materials. For example, FIGS. 23A and 23B show how the clips 114 and 115 of the container 100 go through the cavities 510 and 511 of the circuiting device 500 to engage with the clips 825 and 826 of the circuiting device 500. FIG. 23A also shows how the grooves 531, 532 and 533 of the engaging portion 523 are engaged with the central pieces of the positive link 200, the ground link 300 and the neutral link 400.

Figure 24:
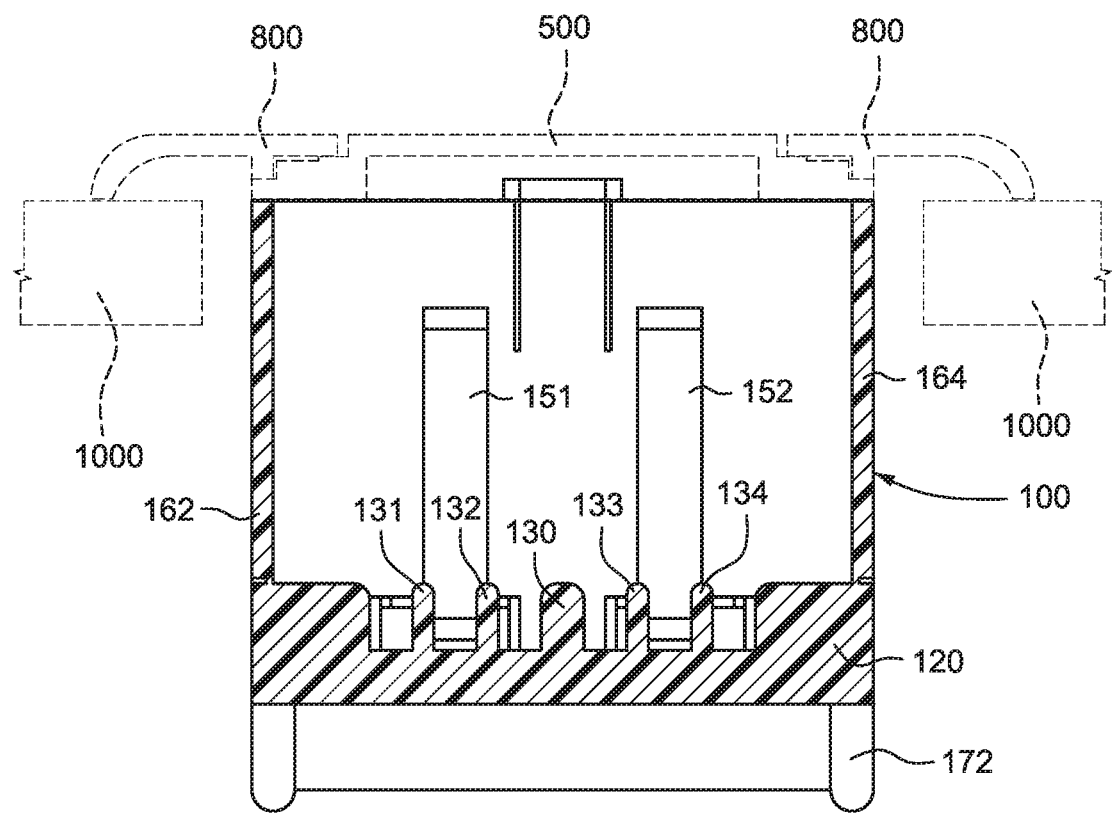
FIG. 24 illustrates a section view of a container with a device face and a cover plate.

FIG. 24 illustrates a section view of a container attached with a circuiting device and a cover plate. In this figure, the container 100 is attached to the circuiting device 500 and the outer cover plate 800 and is mounted into a wall 1000, for example, by having screws pass through the mounting screw tubes 171 and/or 172. The cable separator 130 shown in the middle of the base 120 of the container 100 may separate cables retained within the container 100, and the wire separators 131 and 132 are constructed to separate the positive wire, ground wire and neutral wire of a cable, while the wire separators 133 and 134 are constructed to separate the positive wire, ground wire and neutral wire of another cable. FIG. 24 also shows the clips 151 and 152 attached to the front side 161 of the container 100 to secure cables retained in the container 100 through the cable entries 101 and 102.

Figure 25:
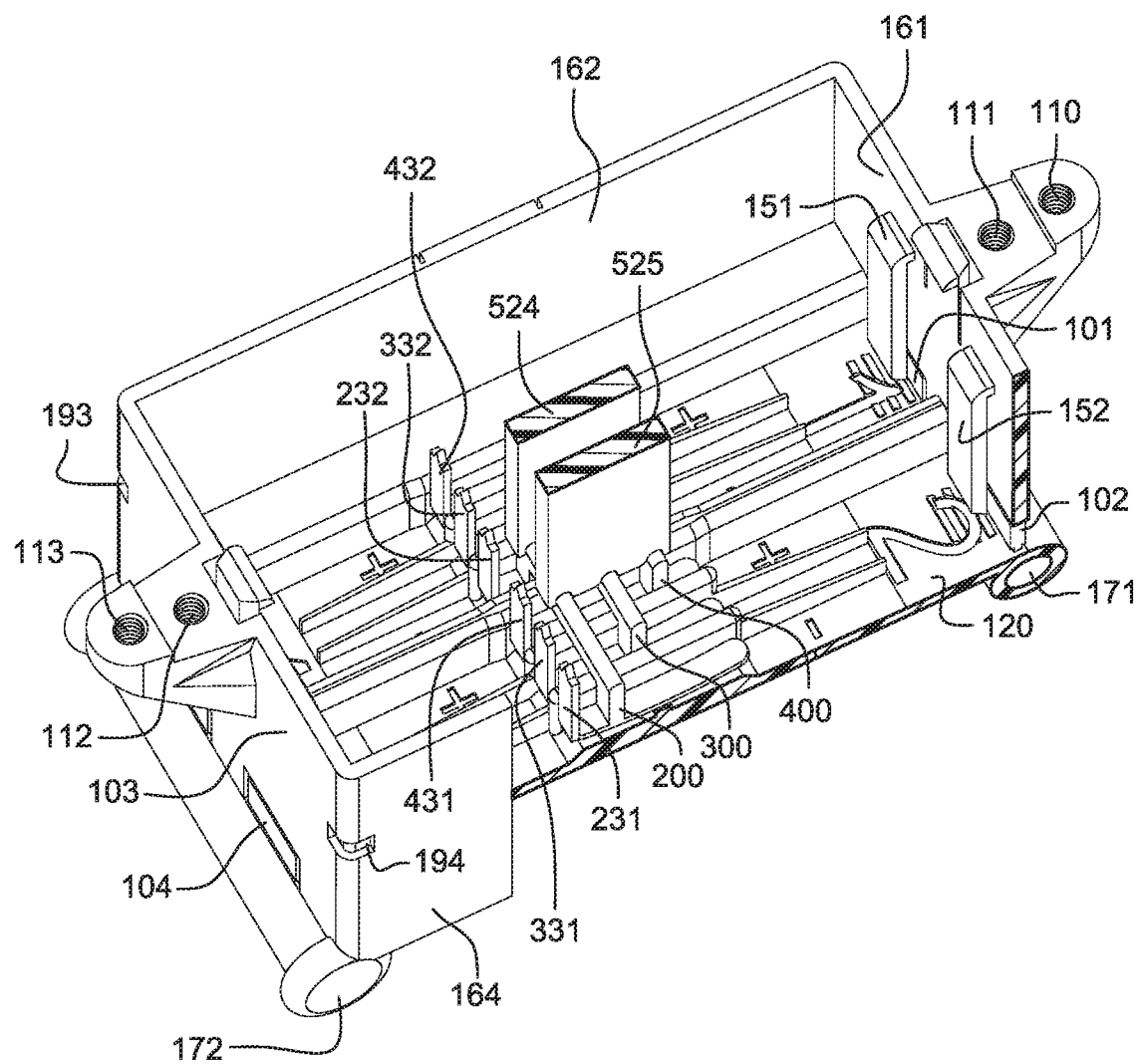
FIG. 25 illustrates a cut-away, front-right view of a circuiting device or other electrical device.

FIG. 25 illustrates a cut-away, back-right view of an alternative exemplary receptacle assembly. In the alternative embodiment, the supporting column 520 may comprise a left supporting leg 524 and a right supporting leg 525, each of which has three grooves to directly engage with the positive link 200, the ground link 300 and the neutral link 400 respectively. In addition, conductive pads 231, 331, 431, 232, 332, and 432 may be extended from the legs of the positive link 200, the ground link 300 and the neutral link 400, and may be constructed to make the positive link 200, the ground link 300 and the neutral link 400 electrically connectable with the receptacle device mounted on the container 100. In some example embodiments, the conductive pads 231, 331, 431, 232, 332, and 432 may be substantially vertical to the legs of the positive link 200, the ground link 300 and the neutral link 400.

Any of the example containers discussed above with respect to the circuiting device 500 may also be associated with an electrical receptacle wired in a building's electrical circuits to deliver electricity to various equipment and appliances.

Figure 26:
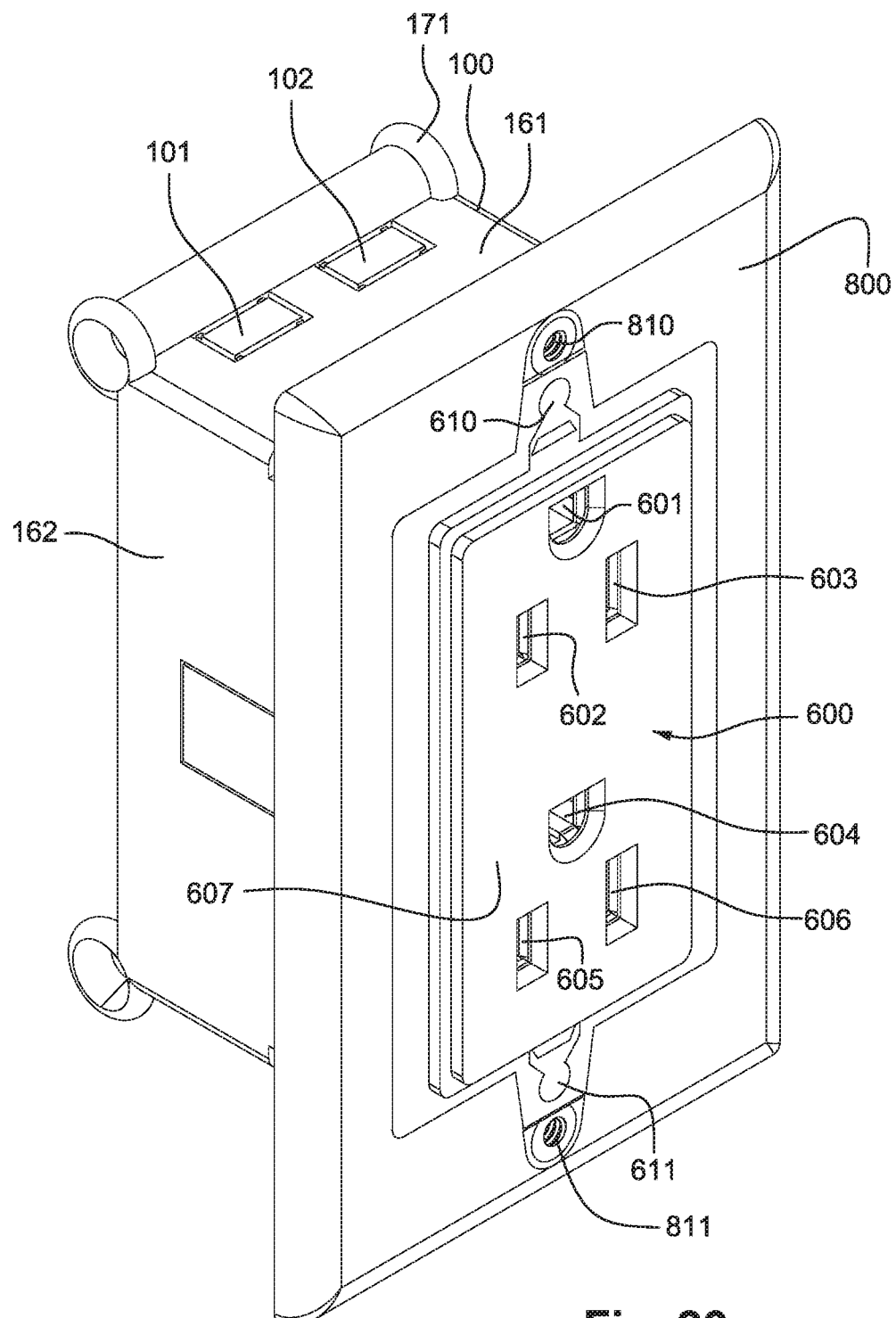
FIG. 26 illustrates a top-left view of a receptacle attached with a container and a cover plate.

FIG. 26 illustrates a top-left view of a non-limiting exemplary electrical receptacle attached with a container and a cover plate. In an example embodiment, the electrical receptacle 600 may include a housing having a front plate 607 with a first electrical outlet and a second electrical outlet, e.g., forming a duplex receptacle. The first electrical outlet comprises a ground slot 601, a positive slot 602 and a neutral slot 603, and the second electrical outlet comprises a ground slot 604, a positive slot 605 and a neutral slot 606. As shown in FIG. 26, the ground slot of each of the outlets is above its associated positive slot and neutral slot. In the embodiment, each of the electrical outlets of the receptacle 600 has the same orientation. That is, the relationship of the ground slot 601, the positive slot 602 and the neutral slot 603 with respect to the front plate 607 of the housing is the same. In another example embodiment, two electrical outlets of the receptacle 600 may have different orientations. In other alternative example embodiments, a receptacle may only have one electrical outlet.

Figure 27:
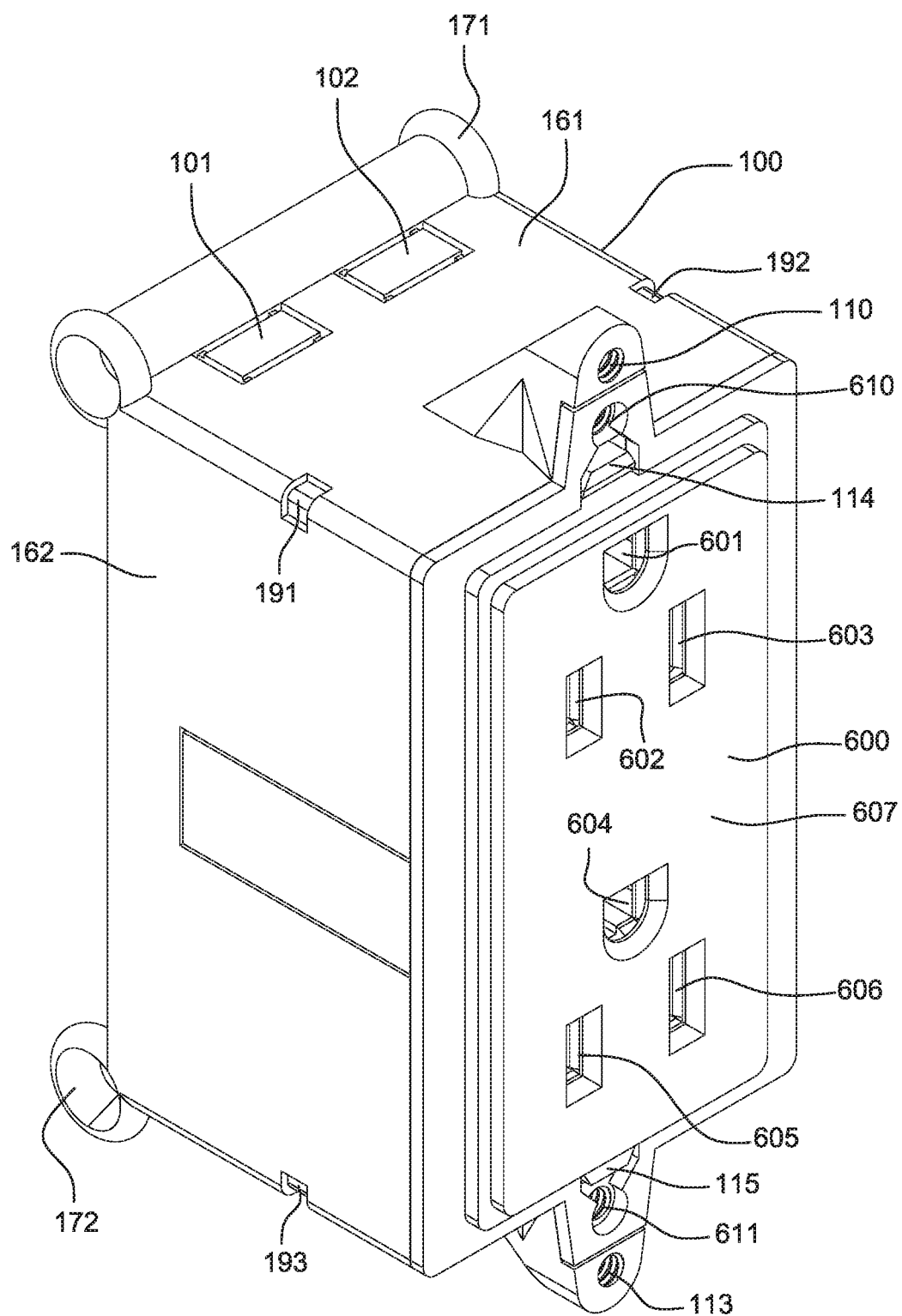
FIG. 27 illustrates a top-left view of a receptacle attached to a container.

FIG. 27 illustrates a top-left view of the receptacle 600 attached to the container 100. In an example embodiment, the receptacle 600 is mounted on the container 100 by having screws pass through the cavities 610 and 611 of the receptacle 600 and enter the holes or nuts 111 and 112 of the container 100. Moreover, the clips 114 and 115 on the front side 161 and the back side 163 of the container 100 may pass through the cavities 610 and 611 of the receptacle 600 respectively and engage with clips 613 and 614 of the receptacle 600 (e.g., as shown in FIGS. 28-31) respectively to dip onto the receptacle 600. The clips 613 and 614 of the receptacle 600 may comprise plastic or other material(s).

Figure 28:
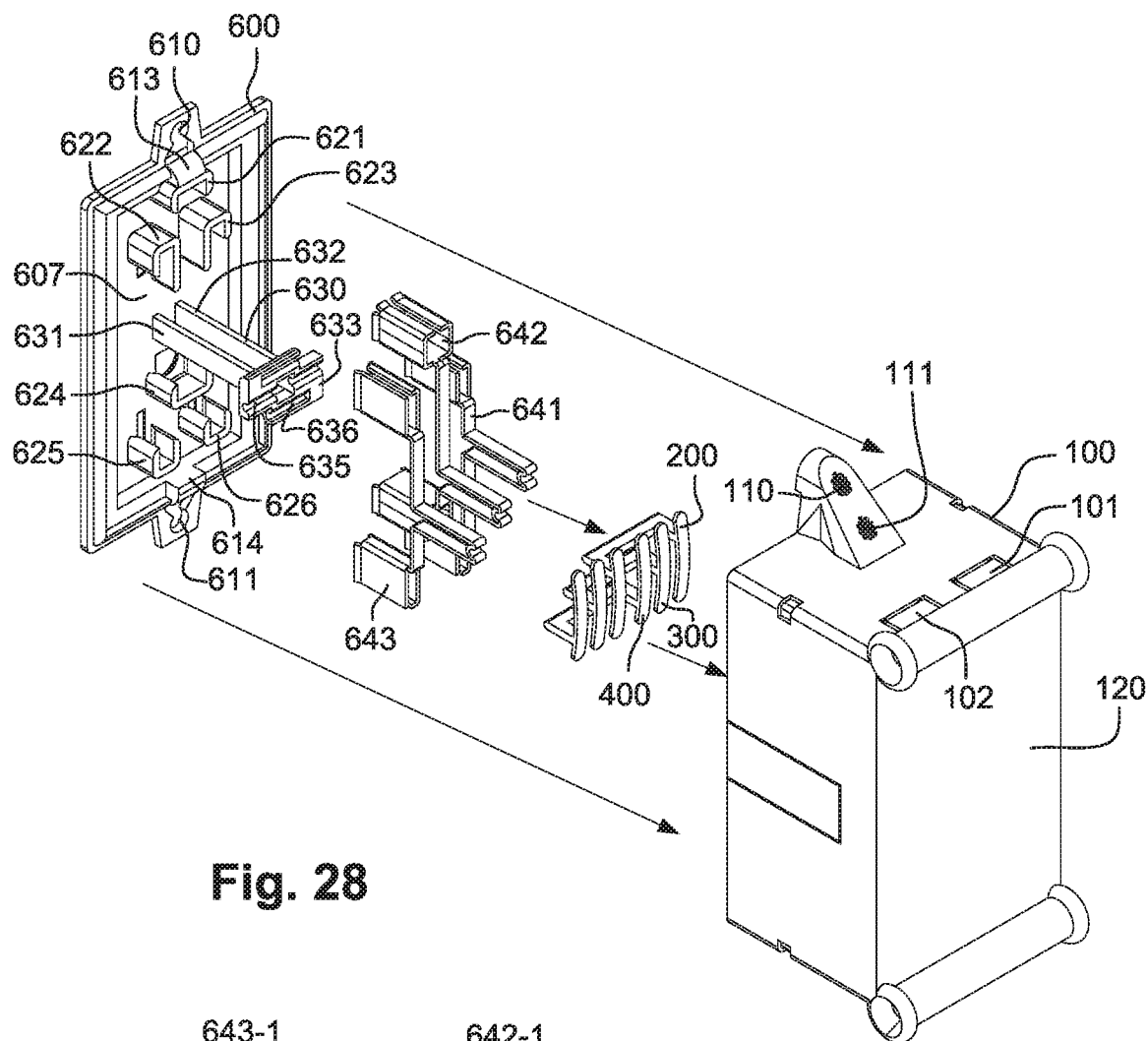
FIG. 28 illustrates an exploded, top-right-back view of a receptacle mounted on a container.

FIG. 28 illustrates an exploded, top-right view of the receptacle 600 mounted on the container 100. In certain example embodiments, the receptacle 600 comprises a positive conductor 641, a ground conductor 642 and a neutral conductor 643 constructed to electrically connect with the positive link 200, the ground link 300 and the neutral link 400. which are electrically connected with their corresponding wires of cables retained within the container 100, in order to deliver electricity from these cables to various equipment or appliances. The conductors 641, 642 and 643 may comprise brass or other conductive material(s).

Figure 29:
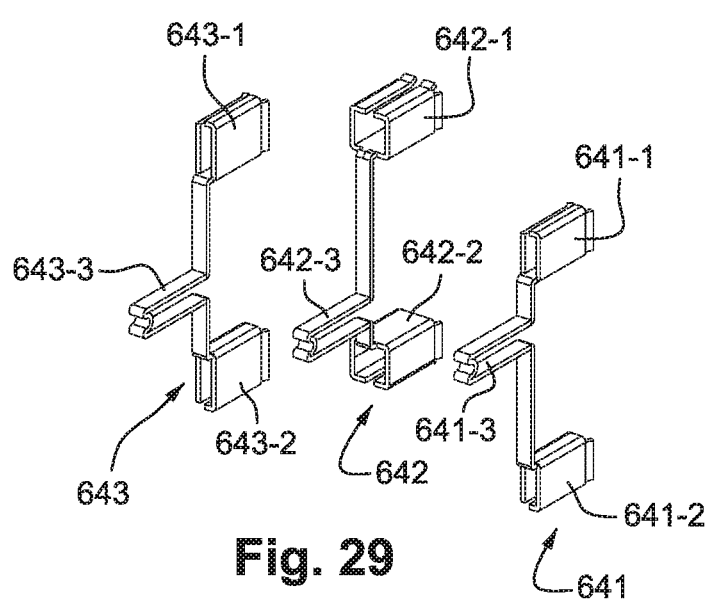
FIG. 29 illustrates a view of positive, ground and neutral conductors of a receptacle.

FIG. 29 illustrates an exploded, top-left view of the positive, ground and neutral receptacle conductors 641, 642 and 643 in isolation. In an example embodiment, each conductor comprises two pocket sections constructed to electrically connect with a plug inserted into one of the first and second electrical outlets and a connecting portion constructed to connect with a corresponding link. As detailed in FIG. 29, the positive conductor 641 comprises two pocket sections 641-1 and 641-2 and a connecting portion 641-3 connecting the pocketing sections 641-1 and 641-2. The pocket section 641-1 is constructed to wrap around and electrically connect with a positive plug inserted into the slot 602 of the first electrical outlet, and the pocket section 641-2 is constructed to wrap around and electrically connect with another positive plug inserted into the slot 605 of the second electrical outlet. The connecting portion 641-3 is constructed to be electrically connectable with the positive link 200, such that the pocket sections 641-1 and 641-2 are electrically connectable with the positive link 200.

Similarly, in an example embodiment, the receptacle ground conductor 642 comprises two pocket sections 642-1 and 642-2 and a connecting portion 642-3 connecting the pocketing sections 642-1 and 642-2. The pocket section 642-1 is constructed to wrap around and electrically connect with a ground plug inserted into the slot 601 of the first electrical outlet, and the pocket section 642-2 is constructed to wrap around and electrically connect with another ground plug inserted into the slot 604 of the second electrical outlet. The connecting portion 642-3 is constructed to be electrically connectable with the ground link 300, such that the pocket sections 642-1 and 642-2 are electrically connectable with the ground link 300. In another example embodiment, the neutral conductor 643 comprises two pocket sections 643-1 and 643-2 and a connecting portion 643-3 connecting the pocketing sections 643-1 and 643-2. The pocket section 643-1 is constructed to wrap around and electrically connect with a neutral plug inserted into the slot 603 of the first electrical outlet, and the pocket section 643-2 is constructed to wrap around and electrically connect with another neutral plug inserted into the slot 606 of the second electrical outlet. The connecting portion 643-3 is constructed to be electrically connectable with the neutral link 400, such that the pocket sections 643-1 and 643-2 are electrically connectable with the neutral link 400.

Figure 37:
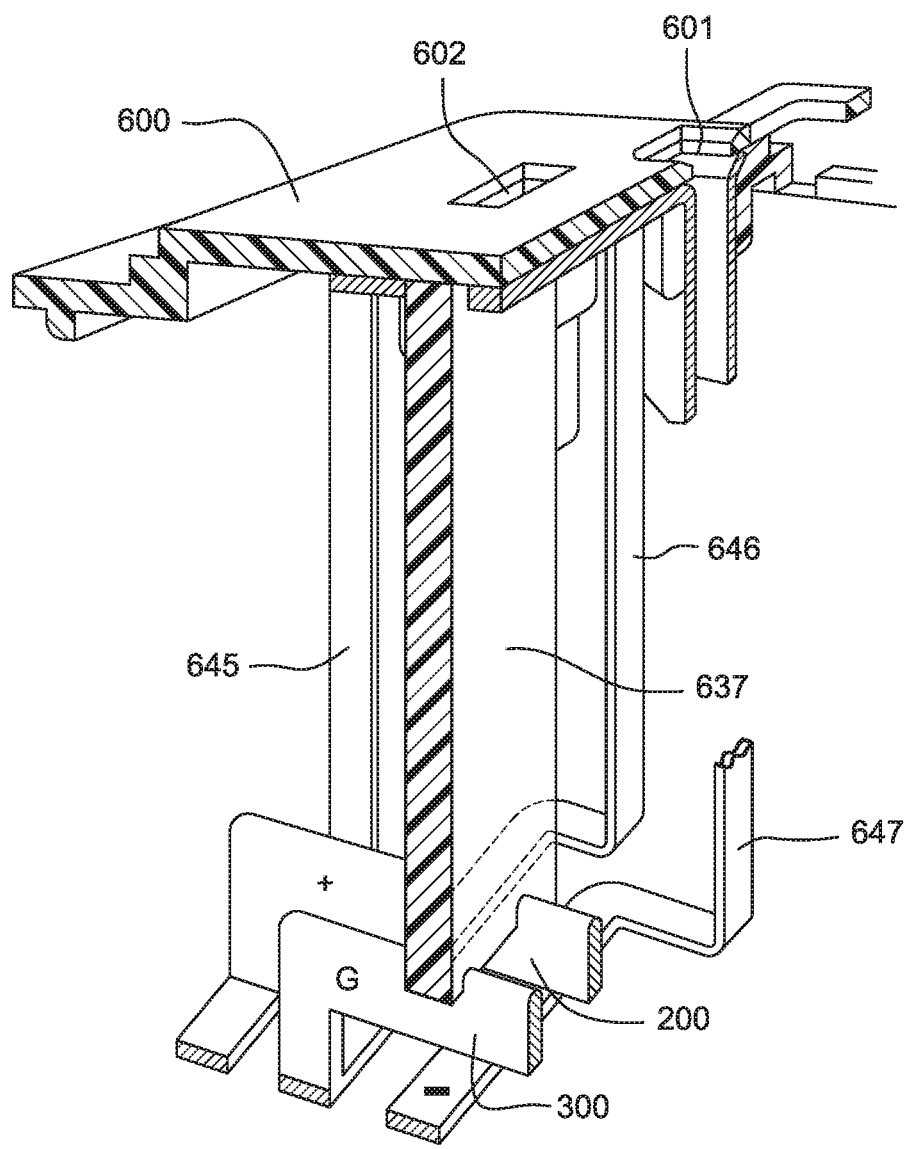
FIG. 37 illustrates a cut-away, (front) top-left view of a receptacle engaged with positive and ground links.

In some example embodiments, these three receptacle conductors 641, 642 and 643 may be simplified to be any other structure to allow mounting a receptacle on the container 100. In an example embodiment, as shown in FIG. 37, a positive conductor 645, a ground conductor 646 and a neutral conductor 647 may each have one end be directly connected with a leg of a positive link 200, a ground link 300, or a neutral link (not shown in FIG. 37), and have another end be connected with a brass pocket for a positive plug, a ground plug or a neutral plug. In other example embodiments, the front plate 607 of the receptacle 600 and the three conductors 641 642. and 643 may be assembled at factories before shipping.

Figure 33:
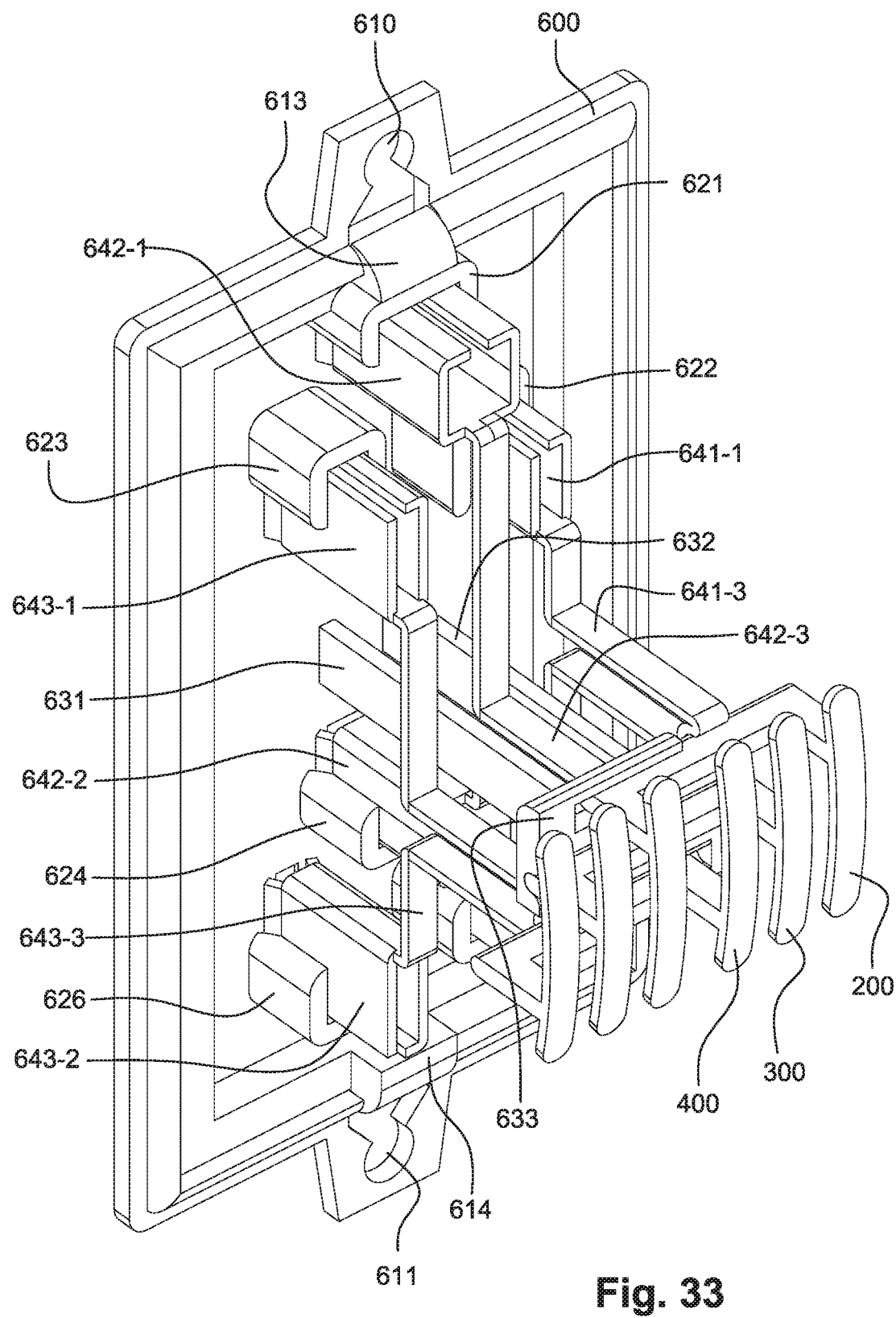
FIG. 33 illustrates a top-right view of a receptacle device.
Figure 34:
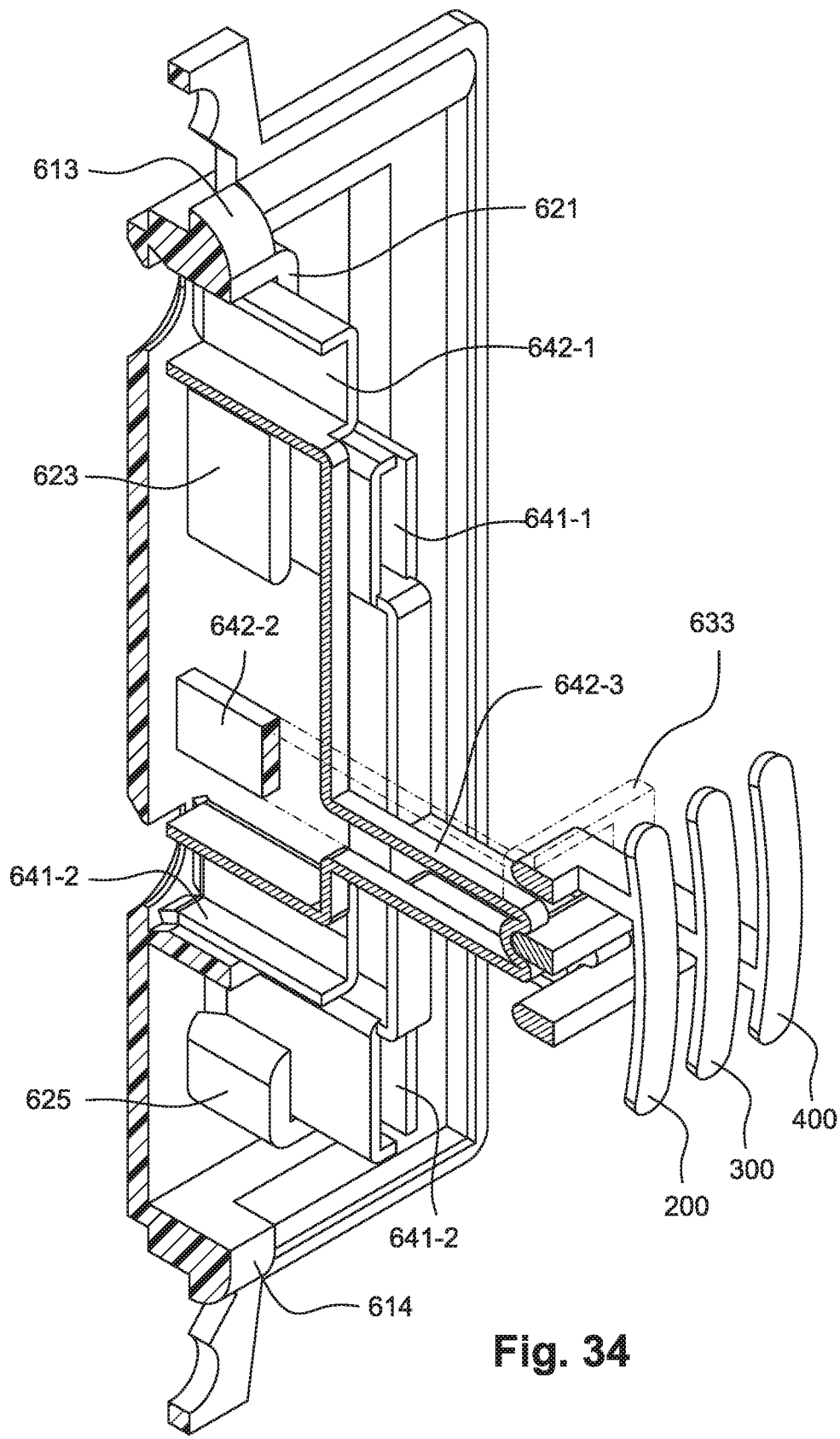
FIG. 34 illustrates a cut-away, top-right view of a receptacle device.

In addition, FIG. 33 illustrates a top-right view of the receptacle 600 engaged with links, and FIG. 34 illustrates a cut-away, top-right view of the receptacle 600 engaged with links. As detailed in FIGS. 28, 30 and 33-34, the receptacle 600 further comprises a supporting column 630 including a left supporting leg 631, a right supporting leg 632 and an engaging portion 633. The engaging portion 633 comprises grooves 634, 635 and 636 constructed to engage with the positive link 200, the ground link 300 and the neutral link 400 respectively. In alternative example embodiments, as shown in FIG. 37, the engaging portion 633 is not required by the supporting column 630, and left and right supporting legs (e.g., a supporting leg 637 in FIG. 37) may comprise three grooves on their respective bottoms to directly engage with the positive, ground and neutral links 200, 300 and 400 respectively.

Figure 35:
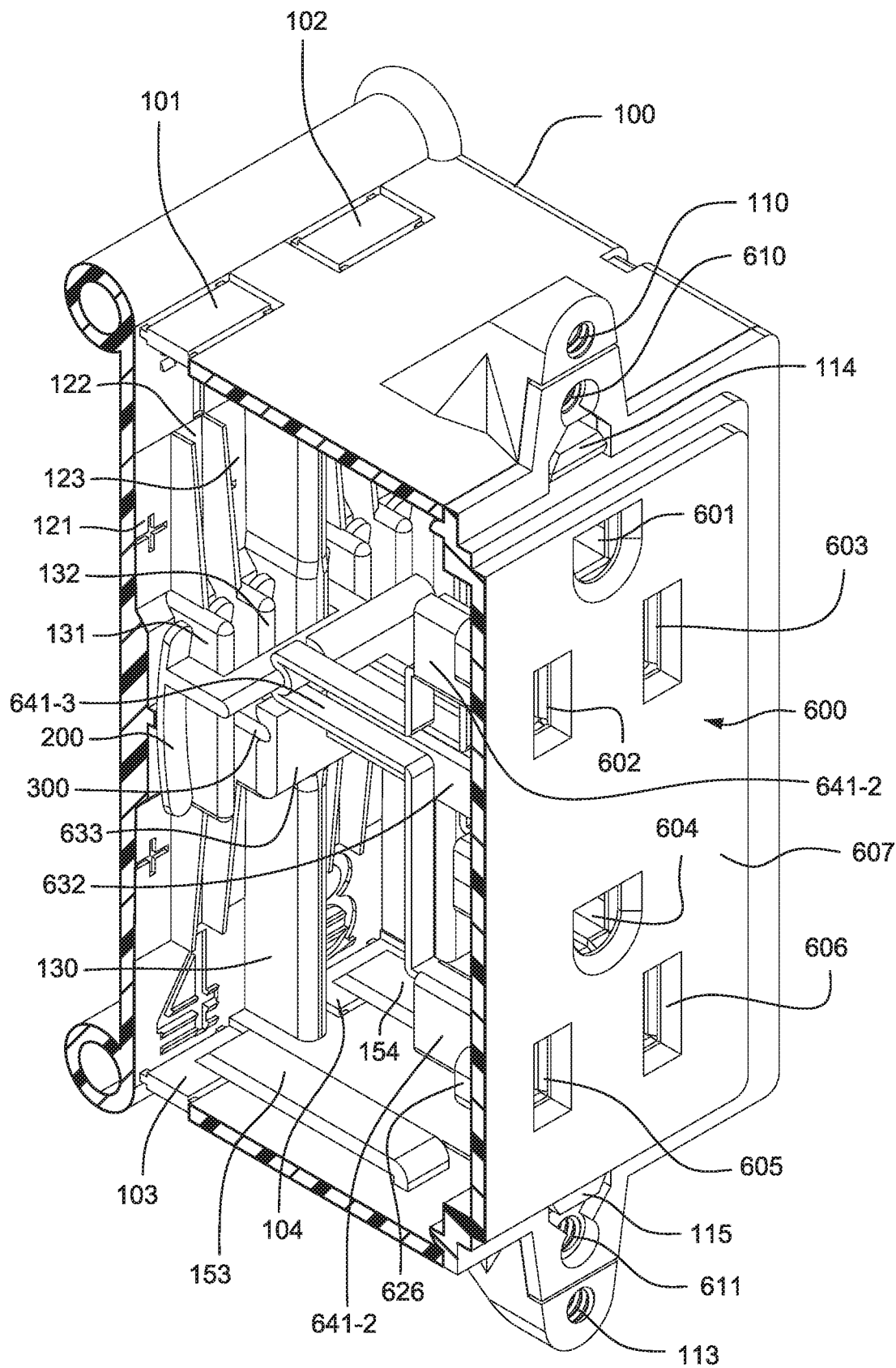
FIG. 35 illustrates a cut-away, top-left view of a receptacle mounted on a container.

FIG. 35 illustrates a cut-away, top-left view of the receptacle 600 mounted on the container 100. In FIG. 35, when the receptacle 600 is mounted on the container 100, the engaging portion 633 of the supporting column 630 is engaged with the positive link 200, the ground link 300 and the neutral link 400, in order to retain these links each in a position that is electrically connectable with corresponding wires of one or more cables. In an example embodiment, the supporting column 630 comprises plastic or other nonconductive material(s).

Figure 31:
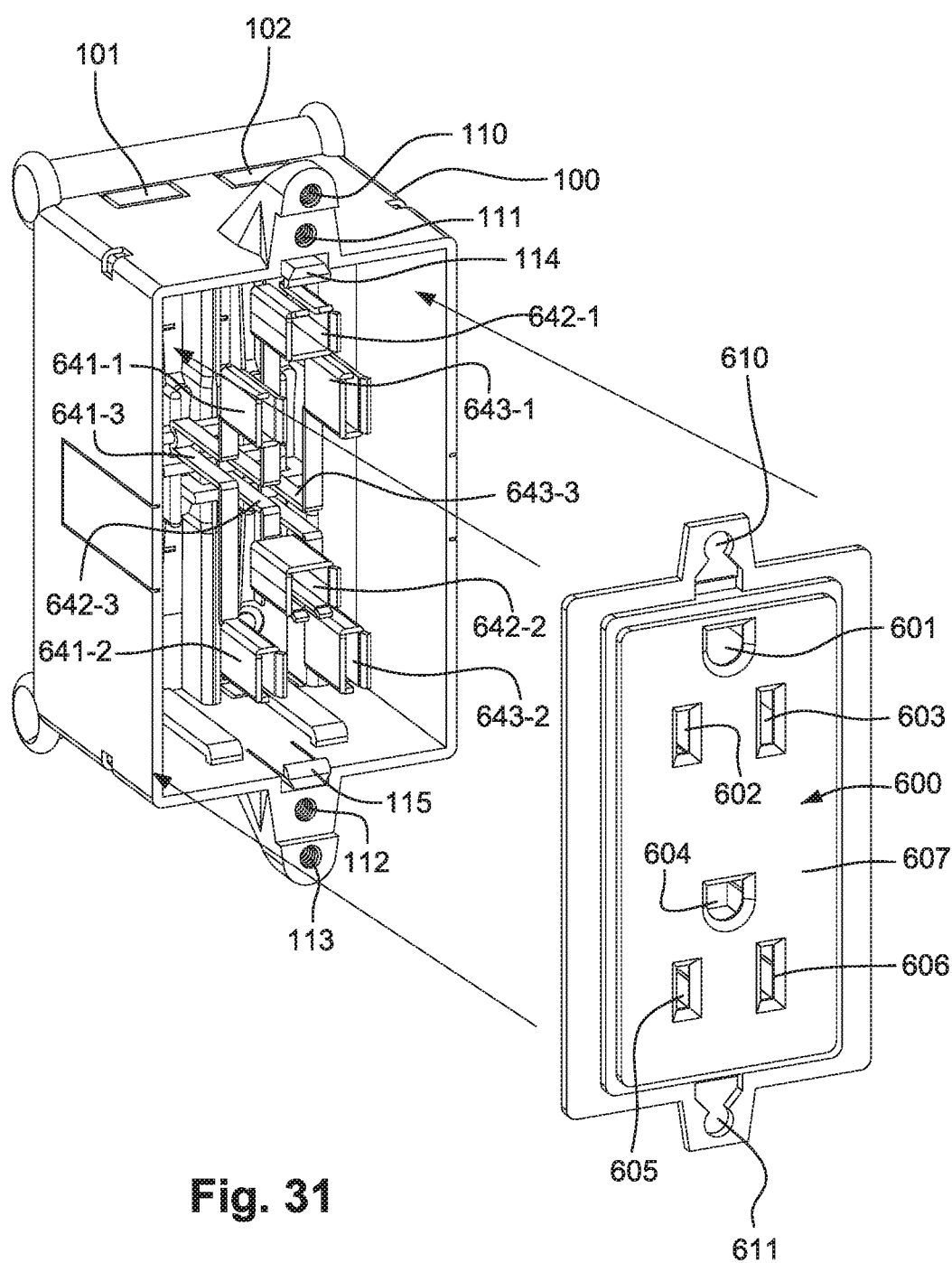
FIG. 31 illustrates an exploded, top-left view of a receptacle and a container.

In the example embodiments, shown in FIGS. 31 and 35, when the receptacle 600 is mounted on the container 100, the engaging portion 633 of the supporting column 630 will be engaged with the positive, ground and neutral links 200, 300, 400, e.g., via the grooves 634, 635 and 636, to retain these links each in a position that is electrically connectable with corresponding wires of one or more cables, and a curved tip of the connecting portion 641-3 of the positive conductor 641, a curved tip of the connecting portion 642-3 of the ground conductor 642 and curved tip of the connecting portion 643-3 of the neutral conductor 643 are engaged with the central piece of the positive, ground and neutral links 200, 300, 400 respectively (as shown in FIG. 33).

Figure 30:
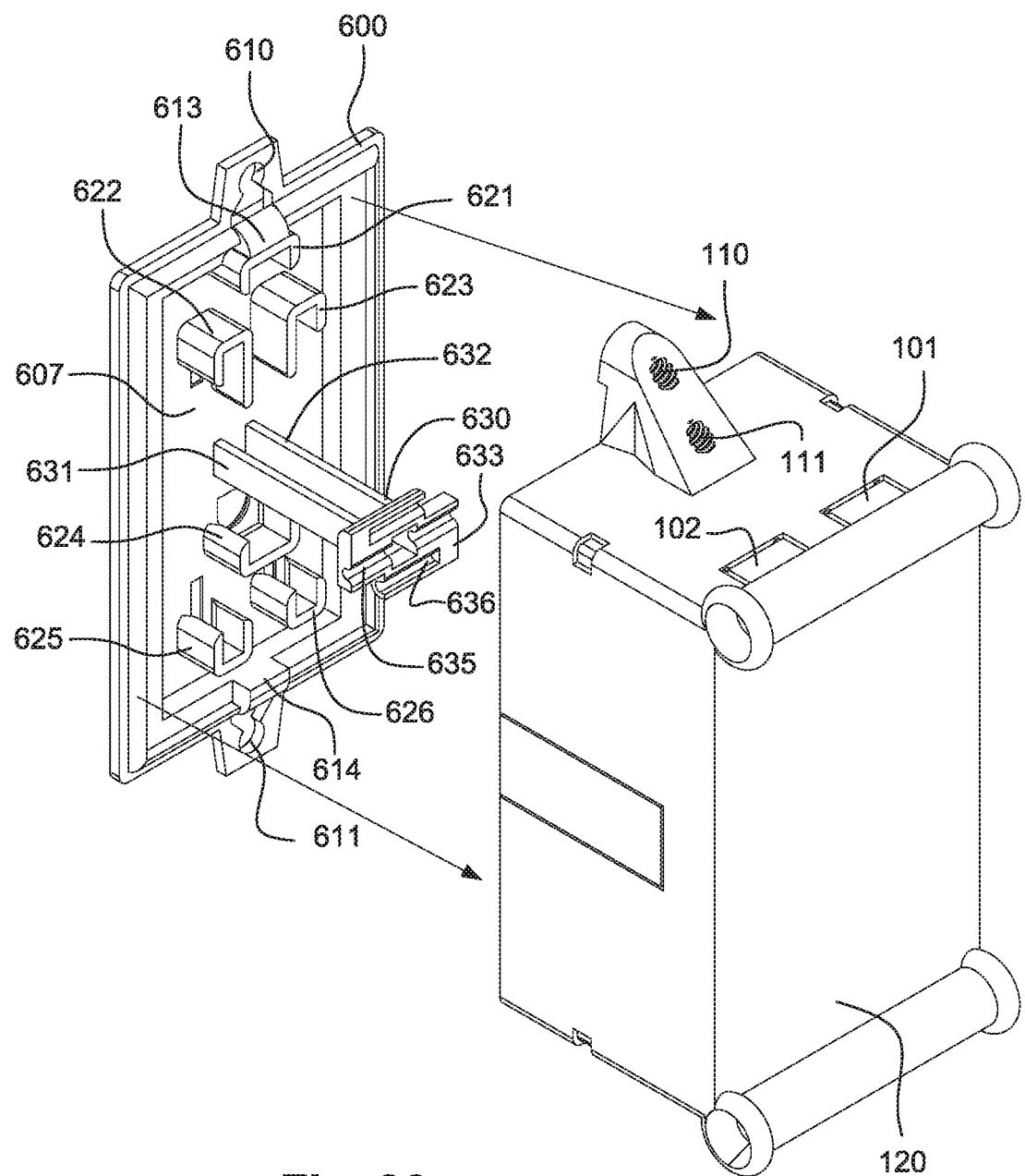
FIG. 30 illustrates an exploded, top-right-back view of a receptacle and a container.
Figure 32:
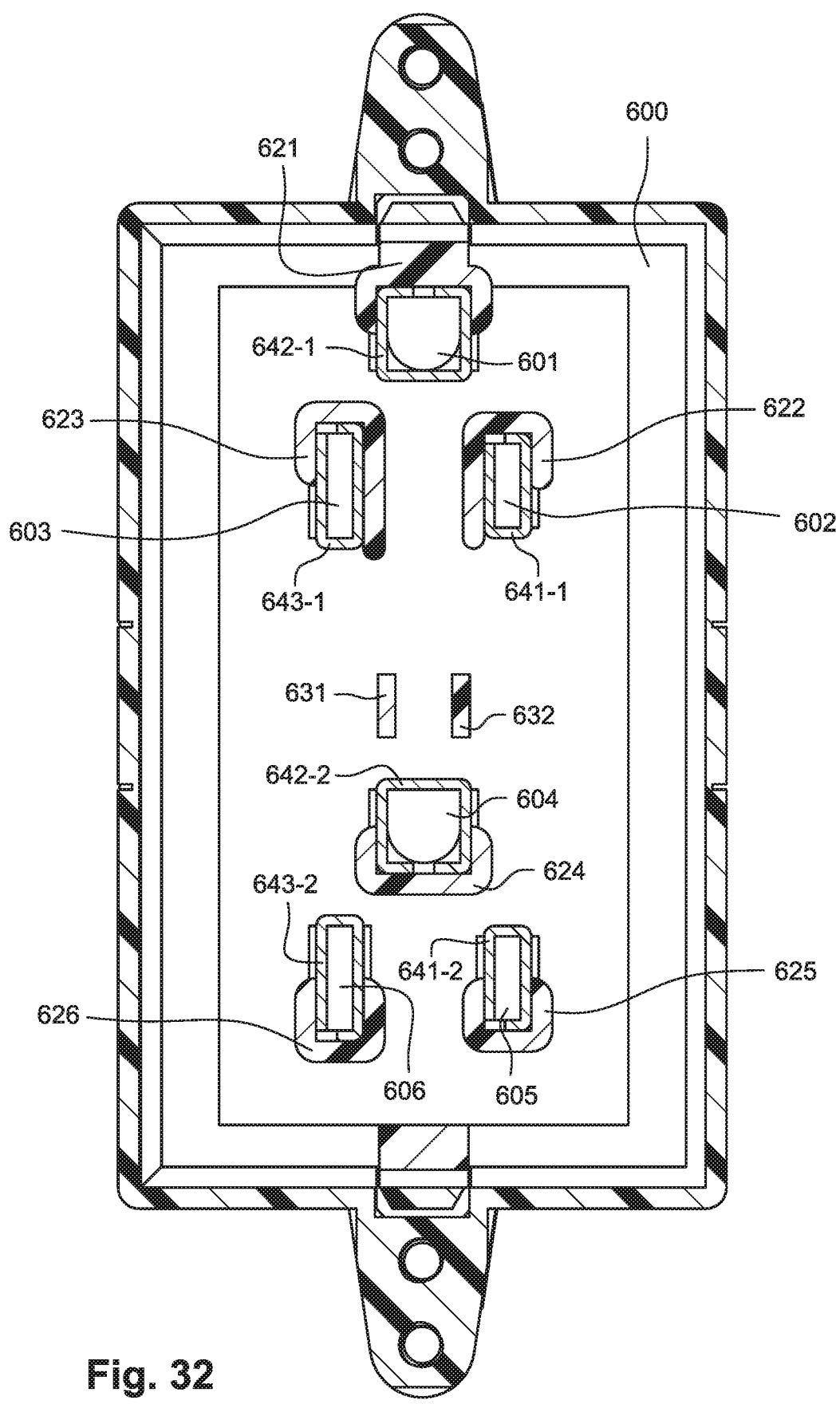
FIG. 32 illustrates a back-of-face section view of a receptacle.

FIG. 32 illustrates a section view of the back of the front plate of a receptacle. In certain example embodiments, on the inner surface of the front plate 607, there is a collar holding each of the pocket sections of the conductors 641, 642 and 643, for example, to secure these pocket sections in position. FIGS. 30 and 32 both illustrate that a collar 621 is constructed to hold the pocket section 642-1 of the ground conductor 642, a collar 622 is constructed to hold the pocket section 641-1 of the positive conductor 641, a collar 623 is constructed to hold the pocket section 643-1 of the neutral conductor 643, a collar 624 is constructed to hold the pocket section 642-2 of the ground conductor 642, a collar 625 is constructed to hold the pocket section 641-2 of the positive conductor 641, and a collar 626 is constructed to hold the pocket section 643-2 of the neutral conductor 643. In an example embodiment, these collars may comprise plastic materials) and/or any other material(s).

Figure 36:
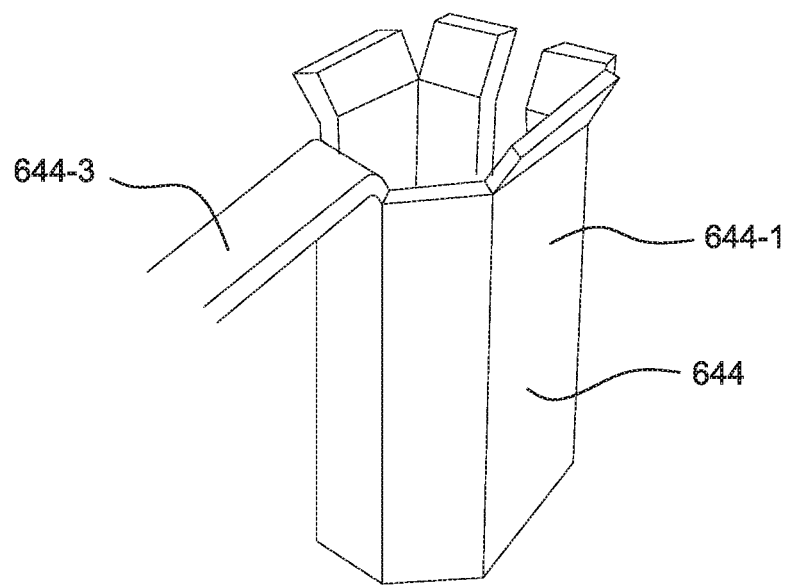
FIG. 36 illustrates a conductor pocket for the insertion of a plug blade.

FIG. 36 illustrates an alternative exemplary conductor pocket for a receptacle. In this example embodiment, a conductor comprises a pocket section 644-1 and a connecting section 644-3 constructed to connect with one of the positive, ground and neutral links. Different from the conductors 641, 642 and 643 described above, the connecting section 644-3 is extended from an end of the pocket section 644-1 that is in proximity to the front plate 607 of the receptacle 600, while the connecting portions 641-3, 642-3 and 643-3 in the above-disclosed. example embodiments are extended from ends of their corresponding pocket-sections that are distal from the front plate 607.

The example containers discussed above with respect to the circuiting device 500 may also be attached to an electrical switch, as illustrated in FIGS. 38-54.

Figure 43:
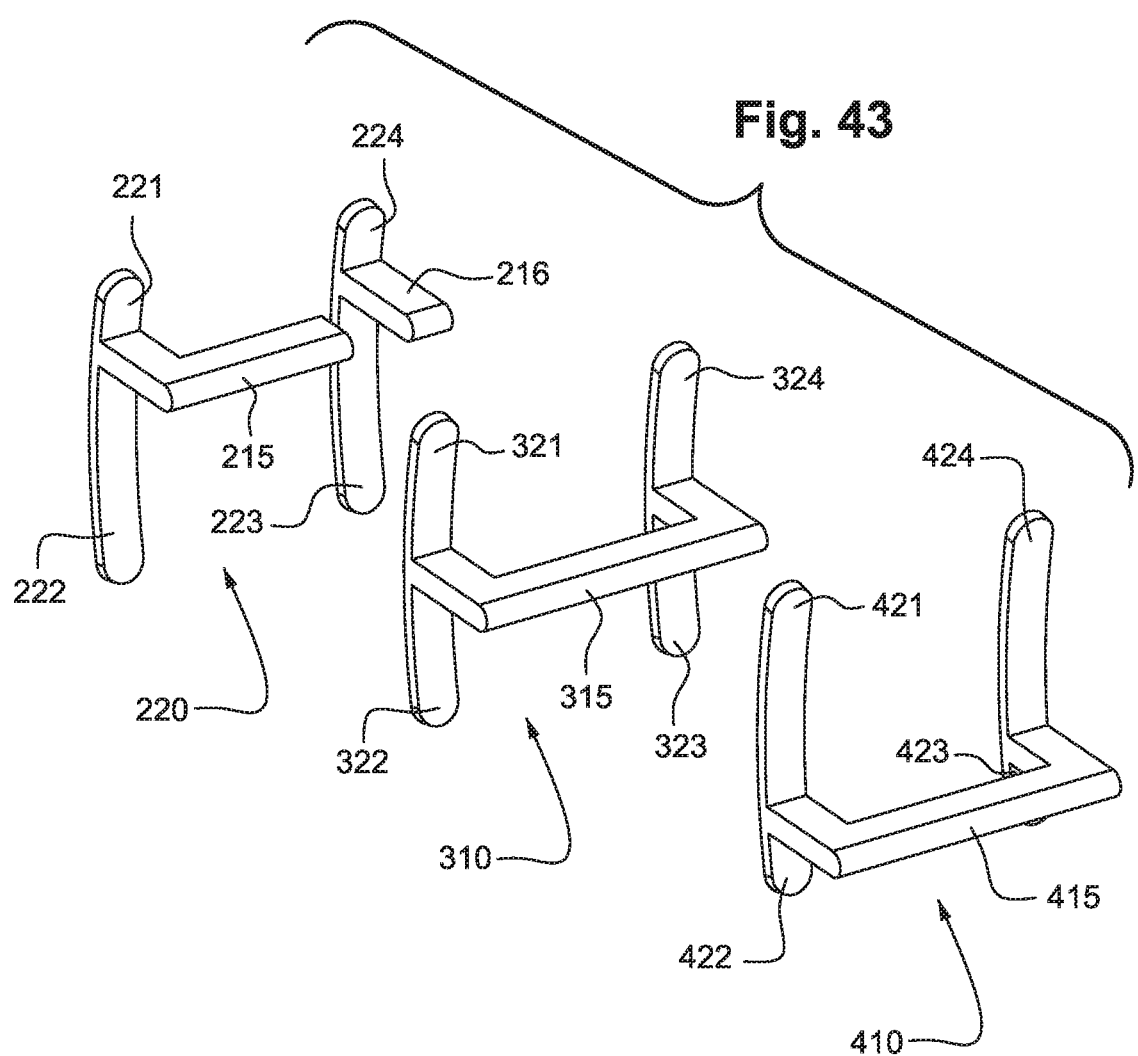
FIG. 43 illustrates an exploded, top-left view of a positive, ground and neutral switch links.
Figure 44:
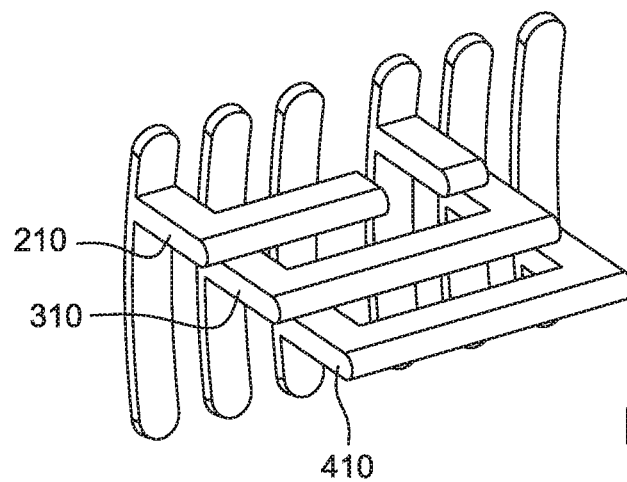
FIG. 44 illustrates a top-left view of a positive, ground and neutral switch links.

As discussed above in connection with FIG. 1, a different set of links—the positive, ground and neutral links 210, 310 and 410—are provided within the container 100 for the electrical switch 700. FIG. 43 illustrates an exploded, top-left view of the positive, ground and neutral links 210, 310 and 410, and FIG. 44 illustrates a top-left view of the links 210, 310 and 410. As shown in these Figures, the differences between the link 210 and the link 200 disclosed above include that a central piece of the positive link 210 is open, creating two separate portions 215 and 216 to provide the ON/OFF control of the switch.

In an example embodiment, as shown in FIG. 43, the switch device's positive link 210 further comprises positive legs 221, 222, 223 and 224 extending from one of the two separate portions 215 and 216. In this embodiment, by default, the positive legs 221 and 222 are electrically disconnected with the positive legs 223 and 224, so that, by default, cables connected with the positive legs 221 and 222 are electrically disconnected with cables connected with the positive legs 223 and 224. In contrast, similar to the ground and neutral links 300 and 400, the ground link 310 comprises a central piece 315 and ground legs 321, 322, 323 and 324 extending from the central piece 315, and the neutral link 410 comprises a central piece 415 and neutral legs 421, 422, 423 and 424 extending from the central piece 415.

In an example embodiment, similar to the shape of the switch device's ground link 300 and the neutral link 400, each of neutral link 410, and ground link 310 has a U-shaped profile when viewed in a first direction, has a T-shaped profile viewed from a second direction, and has an H-shaped profile viewed from a third direction. Differently, in the embodiment, the positive link 210 has a U-shaped profile when viewed from the first direction and a T-shaped profile viewed from the second direction, but has a broken H-shaped profile viewed from the third direction. Moreover, in the embodiment, the first, second and third directions are orthogonal to each other.

Similar to the links 200, 300 and 400, the central pieces of the positive, ground and neutral links 210, 310 and 410 each comprises at least a portion spaced apart from any of the cables and wires retained in the container 100, such that the link is constructed to only connect the corresponding wire(s) it connects with via its legs, but spaced part from the other wires of any cables to avoid causing a short circuit.

Figure 46:
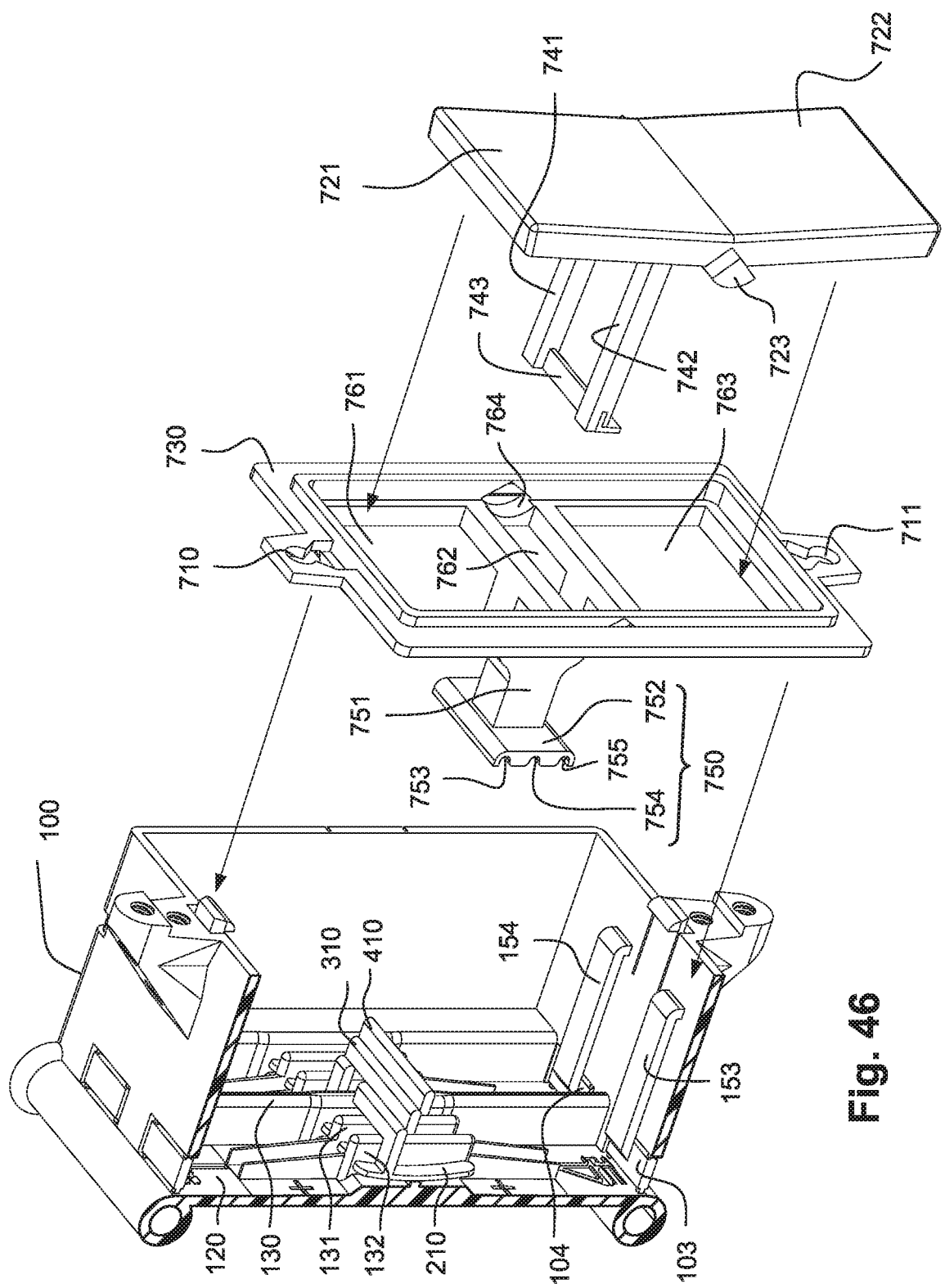
FIG. 46 illustrates an exploded, cut-away, top-left view of a switch and a container.

In certain example embodiments, the switch device's positive link 210, the ground link 310 and the neutral link 410 are disposed in the container 100 similar to how the positive link 200, the ground link 300 and the neutral link 400 of the circuiting device and the switch device are disposed therein. The central pieces of the positive link 210, the ground link 310 and the neutral link 410 are positioned such that these central pieces are spaced apart along a direction, e.g., along a longitudinal axis. Moreover, FIGS. 46 shows that legs of the positive link 210, the ground link 310 and the neutral link 410 may also be spaced apart from each other along another direction, e.g., along a horizontal axis. In this way, these links may be sufficiently separated to prevent a short circuit.

Figure 38:
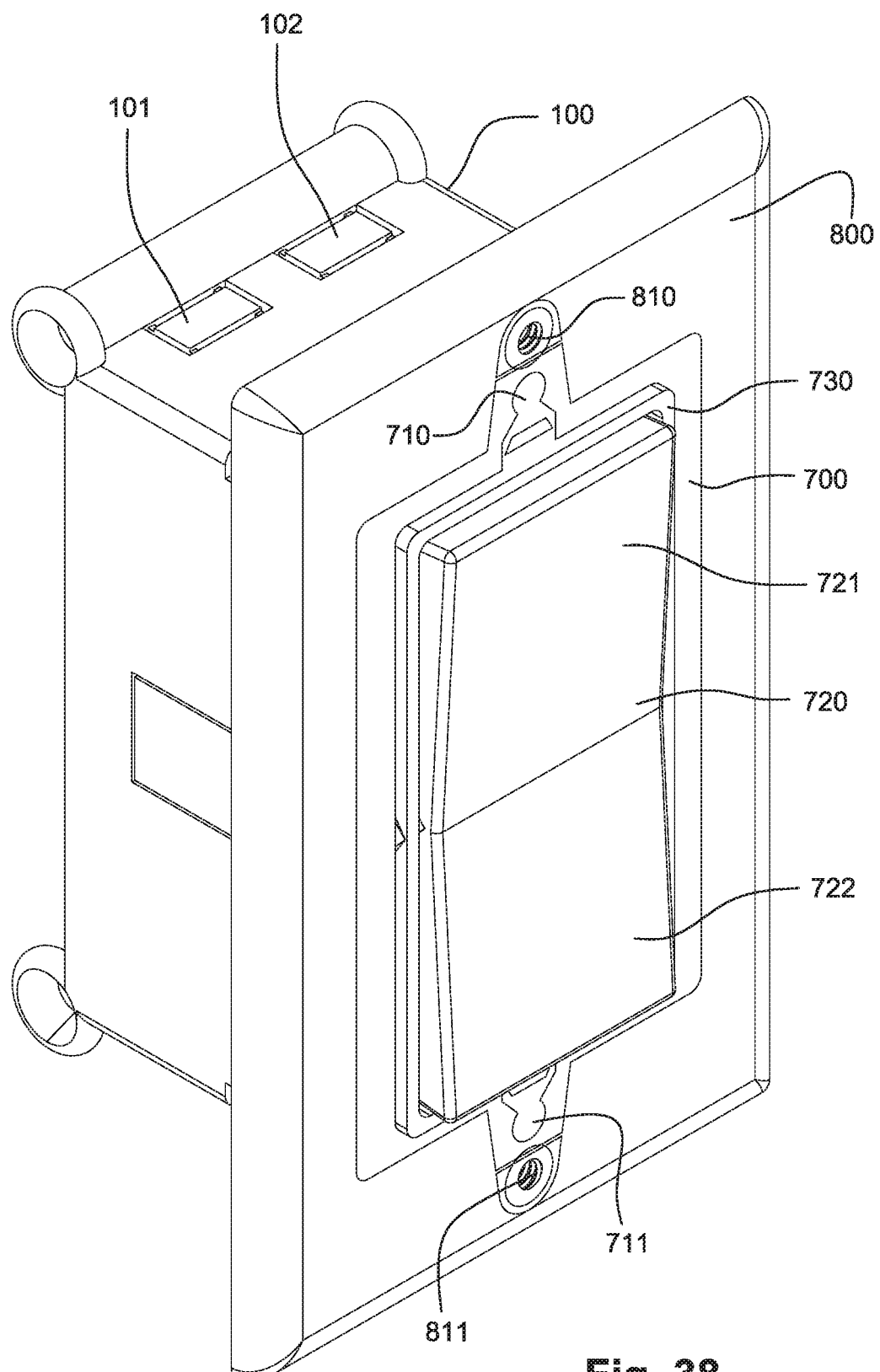
FIG. 38 illustrates a top-left view of a switch in a container and with a cover plate.
Figure 39:
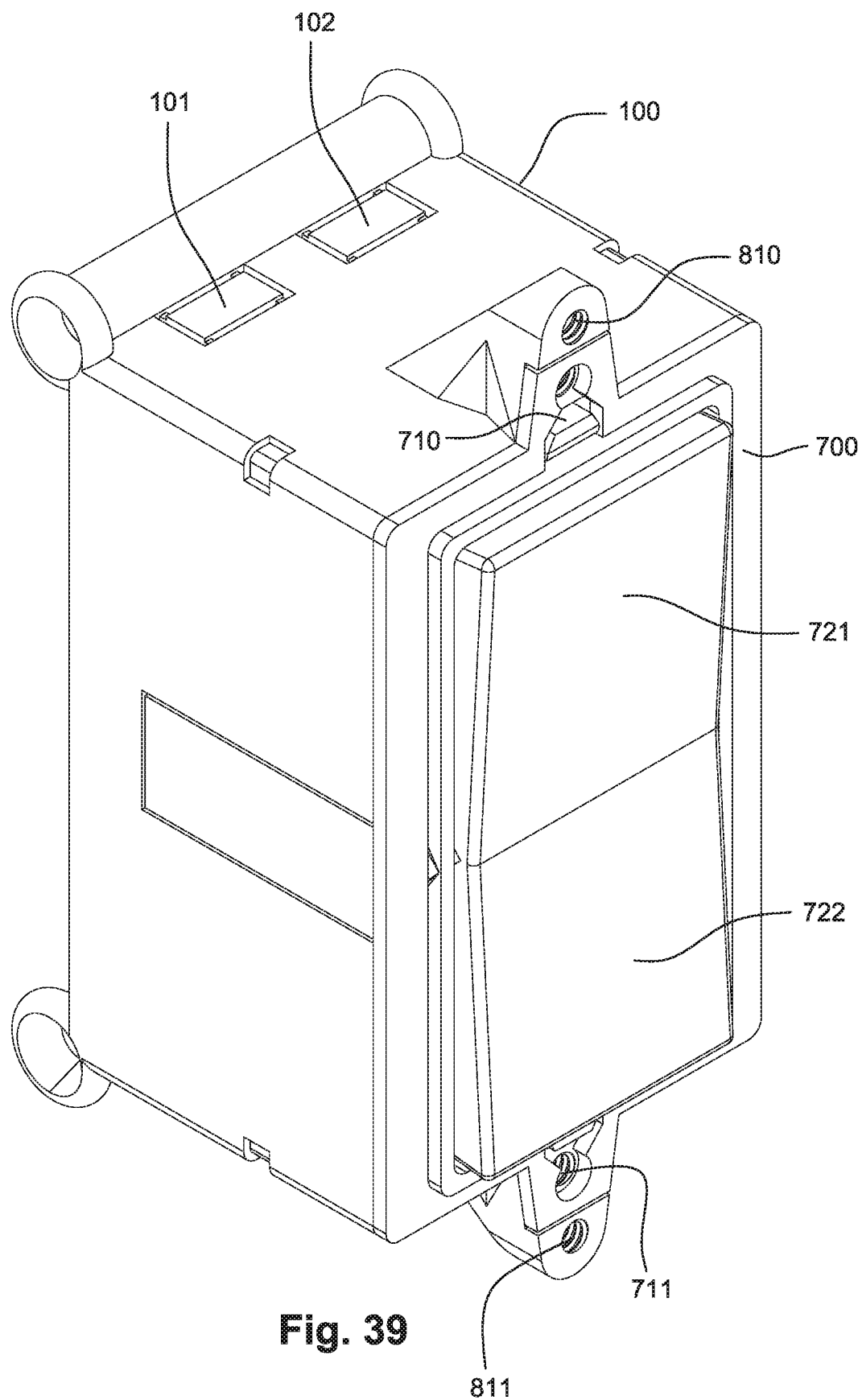
FIG. 39 illustrates a top-left view of a switch in a container.
Figure 40:
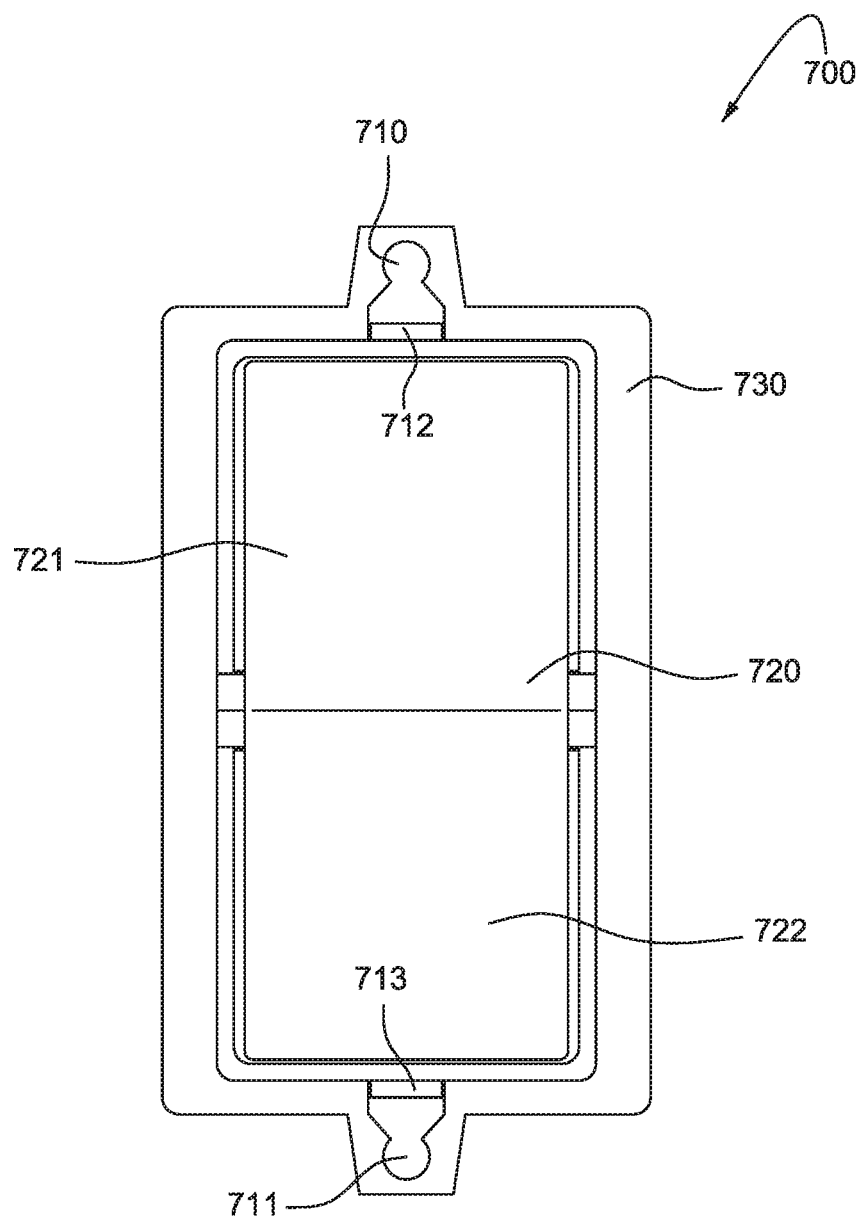
FIG. 40 illustrates an elevation view of a switch.
Figure 41:
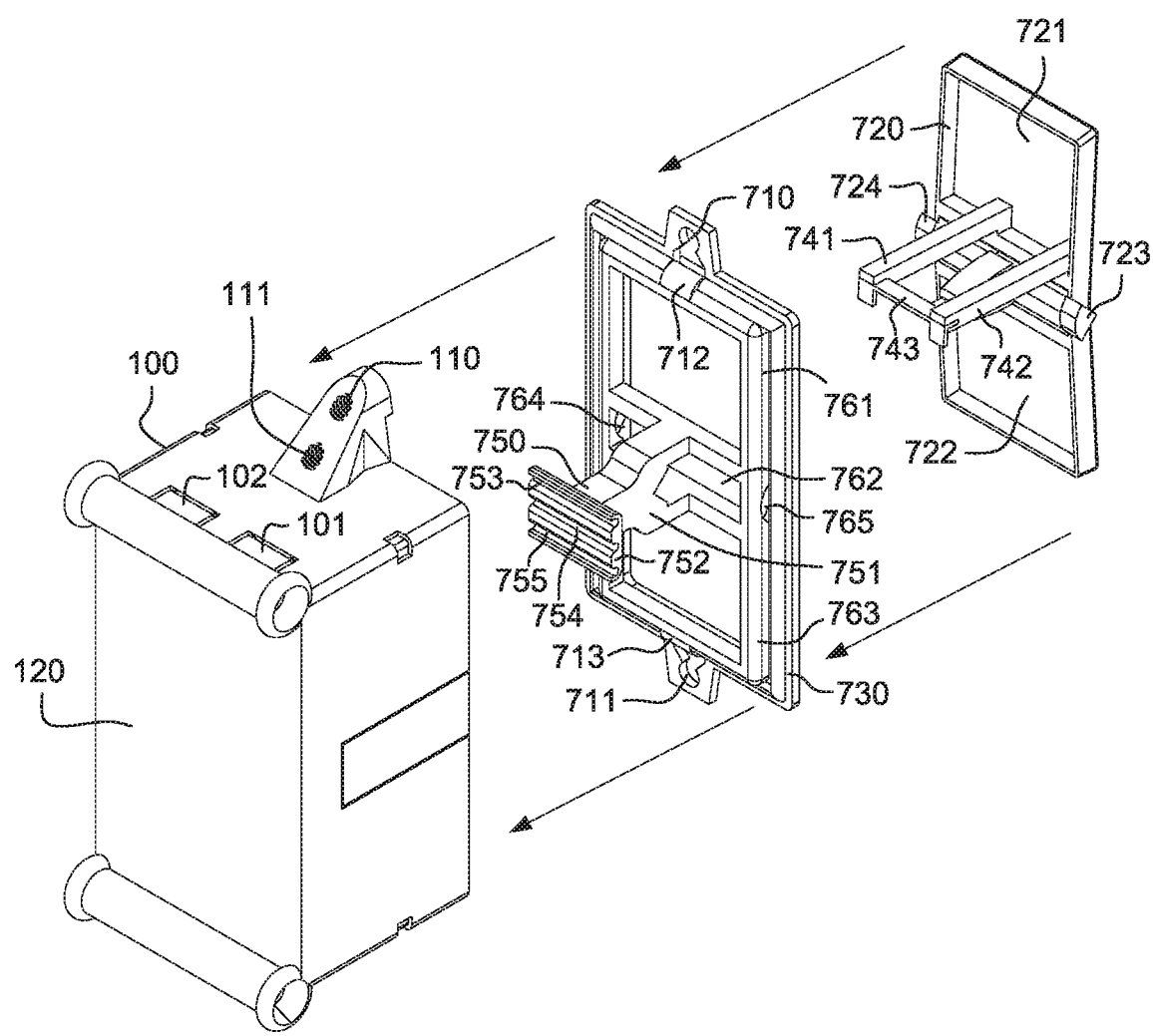
FIG. 41 illustrates an exploded, bottom-left view of a switch and a container.
Figure 42:
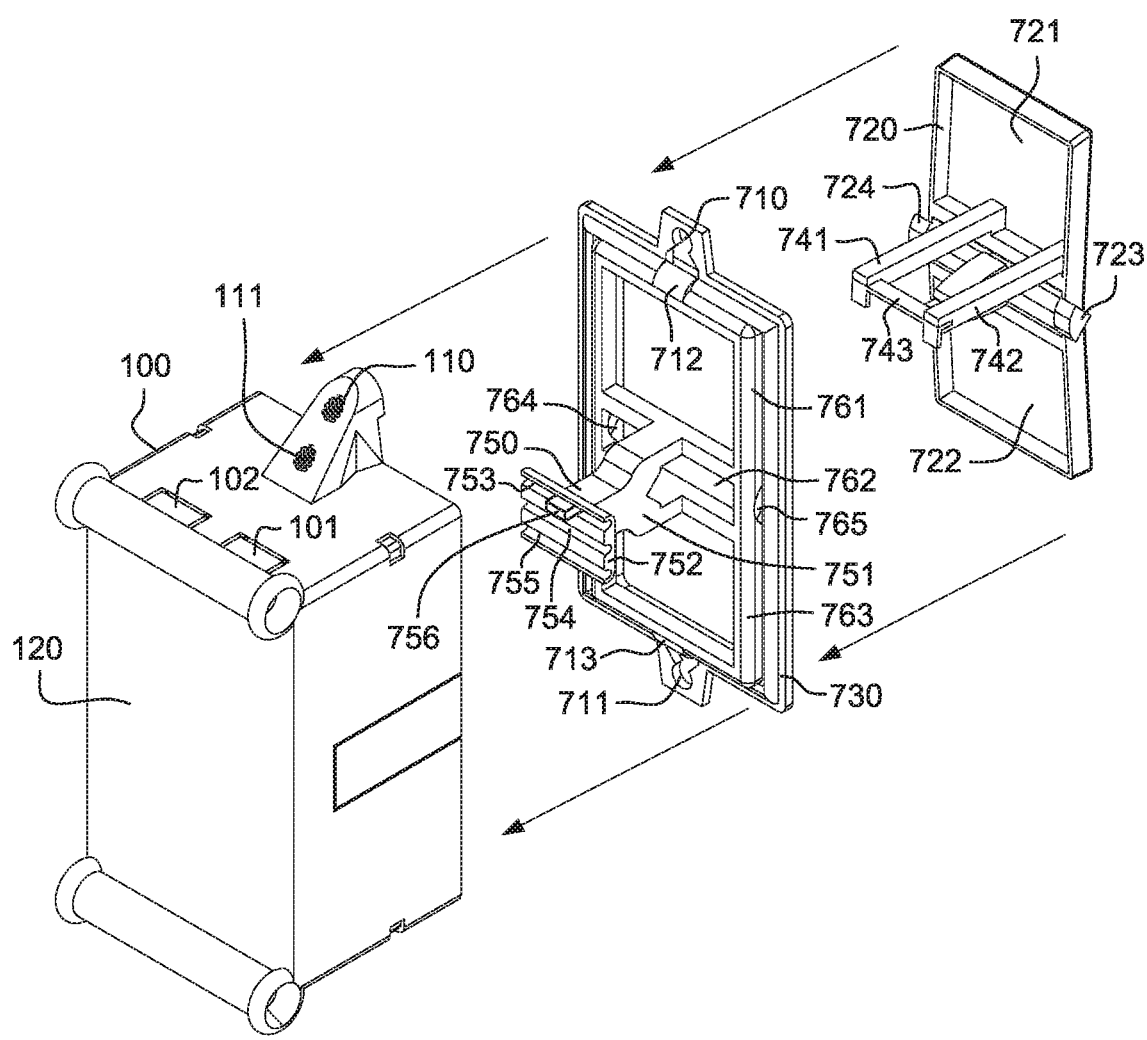
FIG. 42 illustrates an exploded, bottom-left view of a switch to be mounted on a container.

FIG. 38 illustrates a top-left view of the example switch 700 mounted on the container 100 and the outer cover plate 800, and FIG. 39 illustrates a top-left view of the switch 700 mounted on the container 100. In an example embodiment, the switch 700 is mounted on the container 100 by having screws pass through the cavities 710 and 711 of the switch 700 and enter the holes or nuts 111 and 112 of the container 100, Moreover, the clips 114 and 115 on the front side 161 and the back side 163 of the container 100 may pass through the cavities 710 and 711 of the switch 700 respectively and engage with clips 712 and 713 of the switch 700 as shown in FIGS. 40, 41 and 42 respectively to clip onto the switch 700. The clips 713 and 713 of the switch 700 may comprise plastic material(s) or other material(s).

FIG. 40 illustrates an elevation view of the front of a switch device. In the embodiment, the switch 700 comprises a cover plate 800 and an intermediate frame 730.

As illustrated in FIGS. 41-42, the switch device's intermediate frame 730 comprises three separate frames—an upper frame 761, a middle frame 762 and a lower frame 763. In certain example embodiments, the intermediate frame 730 further comprises a supporting column 750 constructed to be engaged with the positive link 210, the neutral link 410 and the ground link 310 to retain these links in a position that is electrically connectable with the positive, neutral and ground wires of the cables retained in the container 100 respectively. In an example embodiment, the supporting column 750 of the intermediate frame 730 includes a supporting leg 751 and an engaging portion 752. The engaging portion 752 comprises three grooves 753, 754 and 755 constructed to engage with the positive link 210, the ground link 310 and the neutral link 410 respectively.

As disclosed above, the central piece of the switch device's positive link 210 comprises two separate portions 215 and 216. As a result, in an alternative example embodiment, as shown in FIG. 42, a small notch 756 is provided within the groove 753 of the engaging portion 752 to separate the two separate portions 215 and 216 of the positive link 210 so that the installer can visually verify the separation.

In alternative switch example embodiments, the engaging portion 752 is not required, and one or more supporting legs may comprise three grooves on their bottoms to directly engage with the positive, ground and neutral links 210, 310 and 410 respectively.

FIG. 41 illustrates an exploded, top-left view of the switch device 700 to be mounted on a container. In an example embodiment, the rocker 720 includes an upper rocker 721 and a lower rocker 722 with their top surfaces at a fixed obtuse angle to each other. In response to a touch by a user, the upper and lower rockers 721 and 722 may rock through an angular distance, for example, about 5 degrees. The switch 700 therefore may be able to switch between an "ON" state and an "OFF" state by virtue of the rocking movement of the upper and lower rockers 721 and 722 in response to users' touch operations on one of the rockers 721 and 722.

In certain switch example embodiments, in between the upper and lower rockers 721 and 722, the rocker 720 further comprises an ON/OFF spring 725, an operating tooth 727 and a bias bar 726, constructed to hold the switch 700 at its "ON" state when the upper rocker 721 is pressed and rocks through an angular distance larger than a predetermined angle, and to hold the switch 700 at its "OFF" state when the lower rocker 722 is pressed and rocks through an angular distance larger than a predetermined angle. As shown in FIGS. 41, 42 and 46, the combination of the operating tooth 727, the ON/OFF spring 725 and the bias bar 726 may pass through the middle frame 762 of the intermediate frame 730 and is positioned within an end of the supporting leg 751 of the intermediate frame 730.

Figure 51:
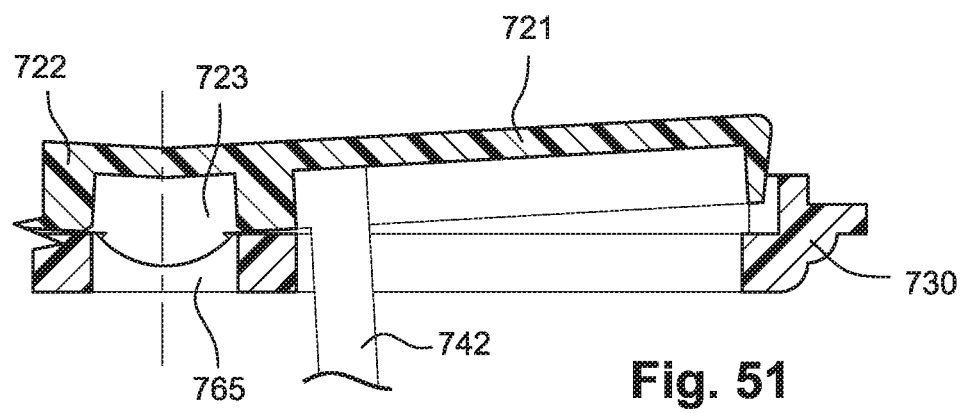
FIG. 51 illustrates a section view of a rocker of a switch.
Figure 52:
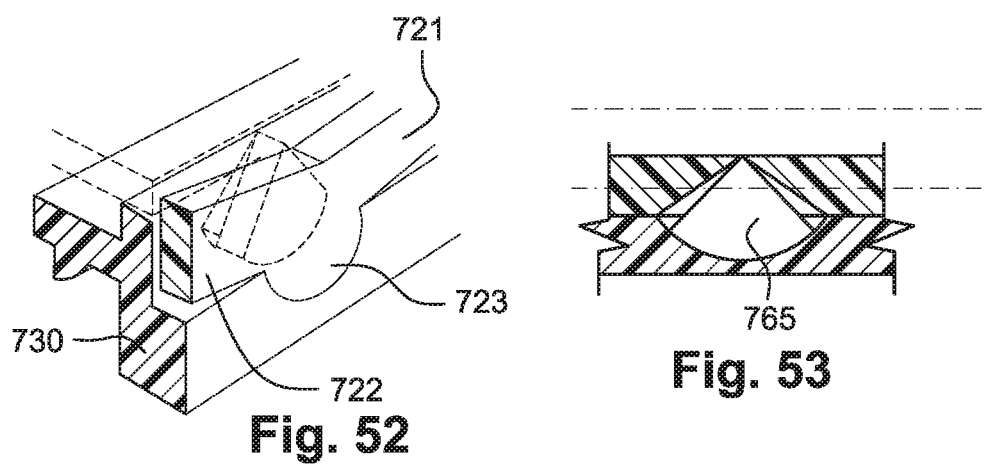
FIG. 52 illustrates a section view of a pinless hinge in a rocker of a switch.
Figure 53:
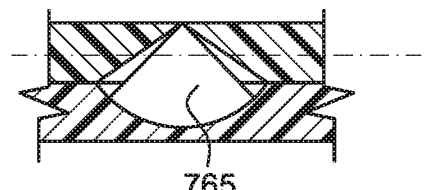
FIG. 53 illustrates a section view of a face of a pinless hinge of a switch.
Figure 54:
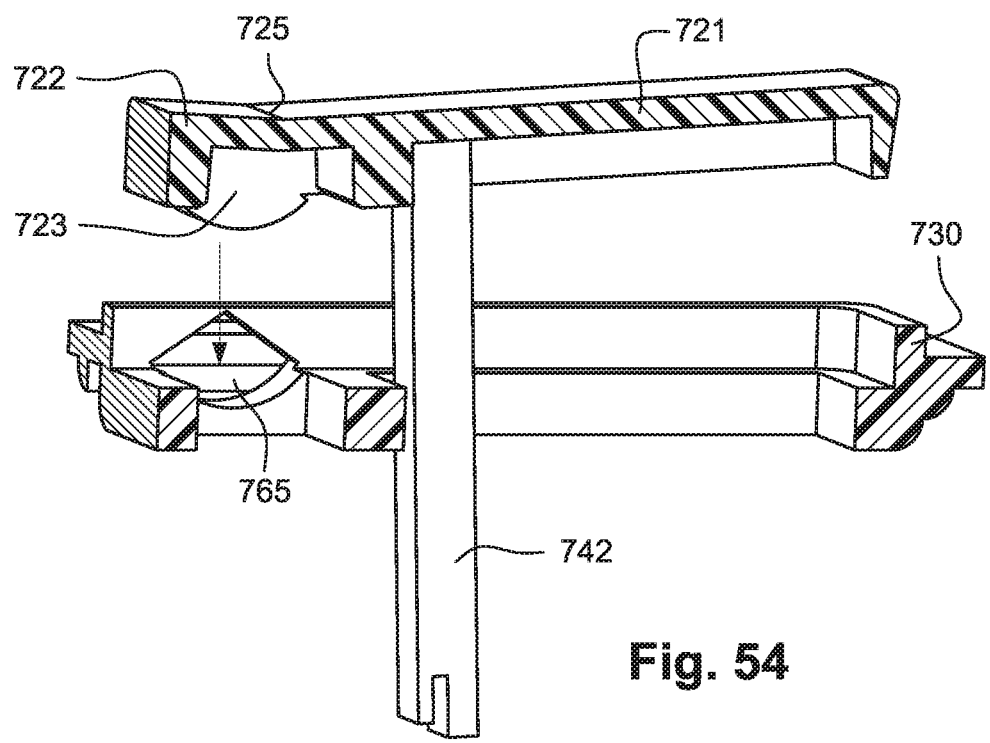
FIG. 54 illustrates a bottom-right section view of a switch rocker and face plate.

Moreover, in the embodiment, the cover rocker 720 further comprises two pinless hinges 723 (only one of which is illustrated) formed on left and right sides of the rocker 720. Correspondingly, the middle frame 762 of the intermediate frame 730, on its left and right ends respectively, has two cavities 765 and 764, constructed to support the rocker pinless hinges 723 when the cover plate 800 is attached with the intermediate frame 730. The relationships between the rocker pinless hinge 723 of the cover plate 800 and the cavity 765 of the intermediate frame 730 are detailed in FIGS. 51-54, which are section views of a portion of the switch 700 in accordance with one example embodiment. FIGS. 51, 52 and 54 show that the rocker pinless hinge 723 at the left side of the rocker 720 will be disposed within the cavity 765 formed on the left end of the middle frame 762 of the intermediate frame 730. FIG. 53 shows a section view of the cavity 765. The cavity 765 is constructed to support the rocker pinless hinge 723 while the upper rocker 721 and the lower rocker 722 are rocking around the pinless hinge 723 to switch between its "ON" and "OFF" positions.

In a switch example embodiment, a left contact leg 742 and a right contact leg 741 are extended from the upper rocker 721, and are constructed to hold a conductive contact bar 743. The conductive contact bar 743 is constructed to electrically connect with two separate parts of a positive link as detailed below when the switch is "ON."

In certain switch example embodiments, the upper rocker 721, the lower rocker 722, the rocker pinless hinges 723 and 724 and the left and right contact legs 742 and 741 may comprise non-conductive material(s), such as plastic materials, while the contact bar 743 comprises conductive material(s), like brass.

Figure 45:
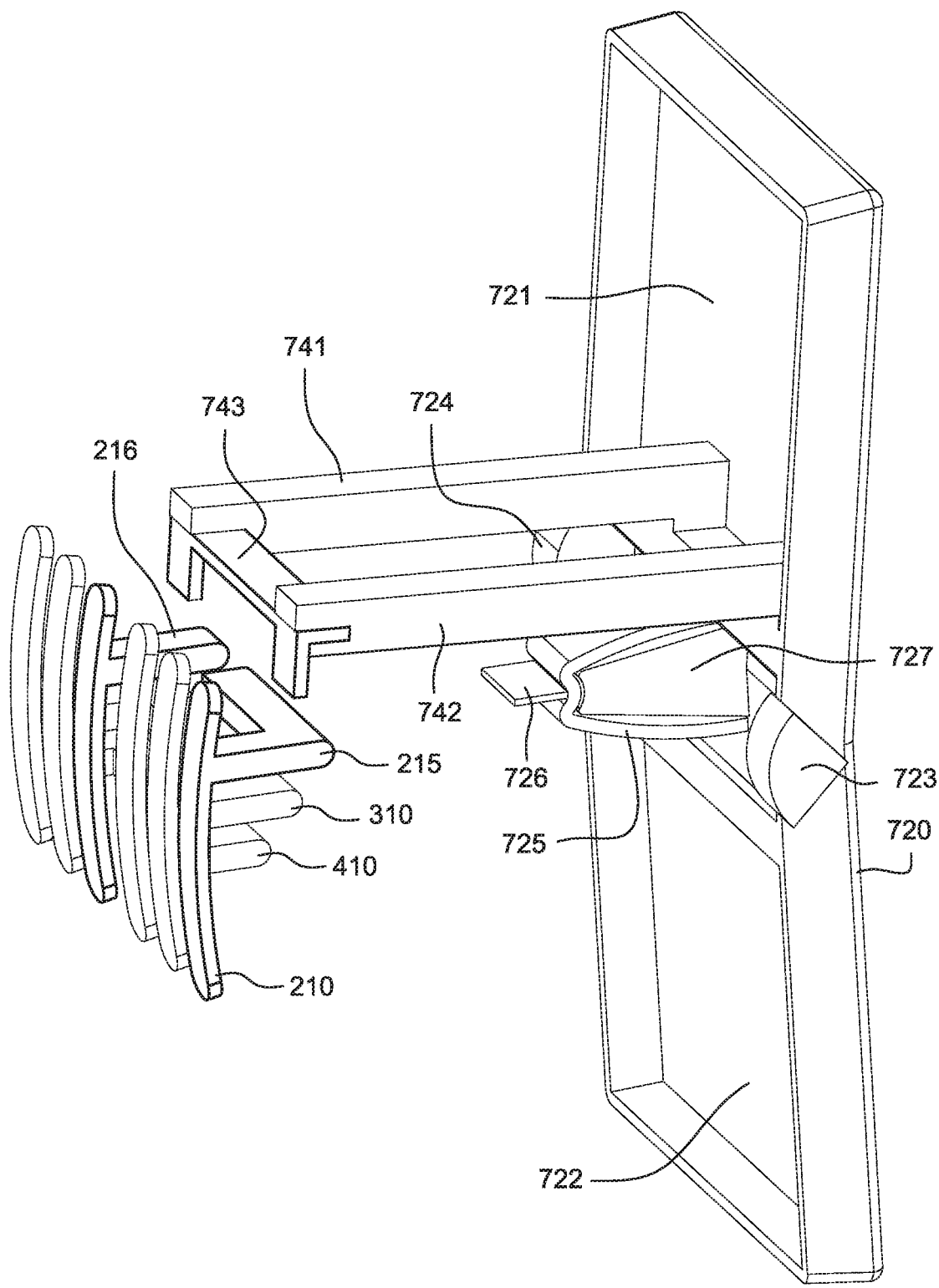
FIG. 45 illustrates a prospective bottom-left view of a portion of a rocker of a switch constructed to be electrically connectable two separate portions of an example positive link.

As illustrated in FIGS. 41 and 42, the left and right switch contact legs 742 and 741 extend from the rocker 720 and pass through the upper frame 761 of the intermediate frame 730, such that the contact bar 743 held by the left and right contact legs 742 and 741 may be electrically connectable with the two separate portions 215 and 216 of the positive link 210, as shown in FIG. 45. In particular, FIGS. 48 and 49 show that, by virtue of the rocking movement of the upper and lower cover plates 721 and 722, the contact bar 743 may switch between an "ON" position, in which it electrically connects the two separate portions 215 and 216 of the positive link 210, and an "OFF" position, in which it electrically disconnects with the positive link 210.

FIG. 46 illustrates an exploded, cut-away, top-left view of the switch 700 and the container 100. As shown in FIG. 46, the intermediate frame 730 may be attached to the container 100, and the grooves 753, 754 and 755 of the supporting column 750 are engaged with the positive link 210, the ground link 310 and the neutral link 410 respectively to make legs of these links electrically connectable with corresponding wires. In addition, the rocker 720 of the switch 700 is attached to the intermediate frame 730 in a way that the contact bar 743 is placed at a position at which it is electrically connectable with the two separate portions 215 and 216 of the positive link 210.

Figure 47:
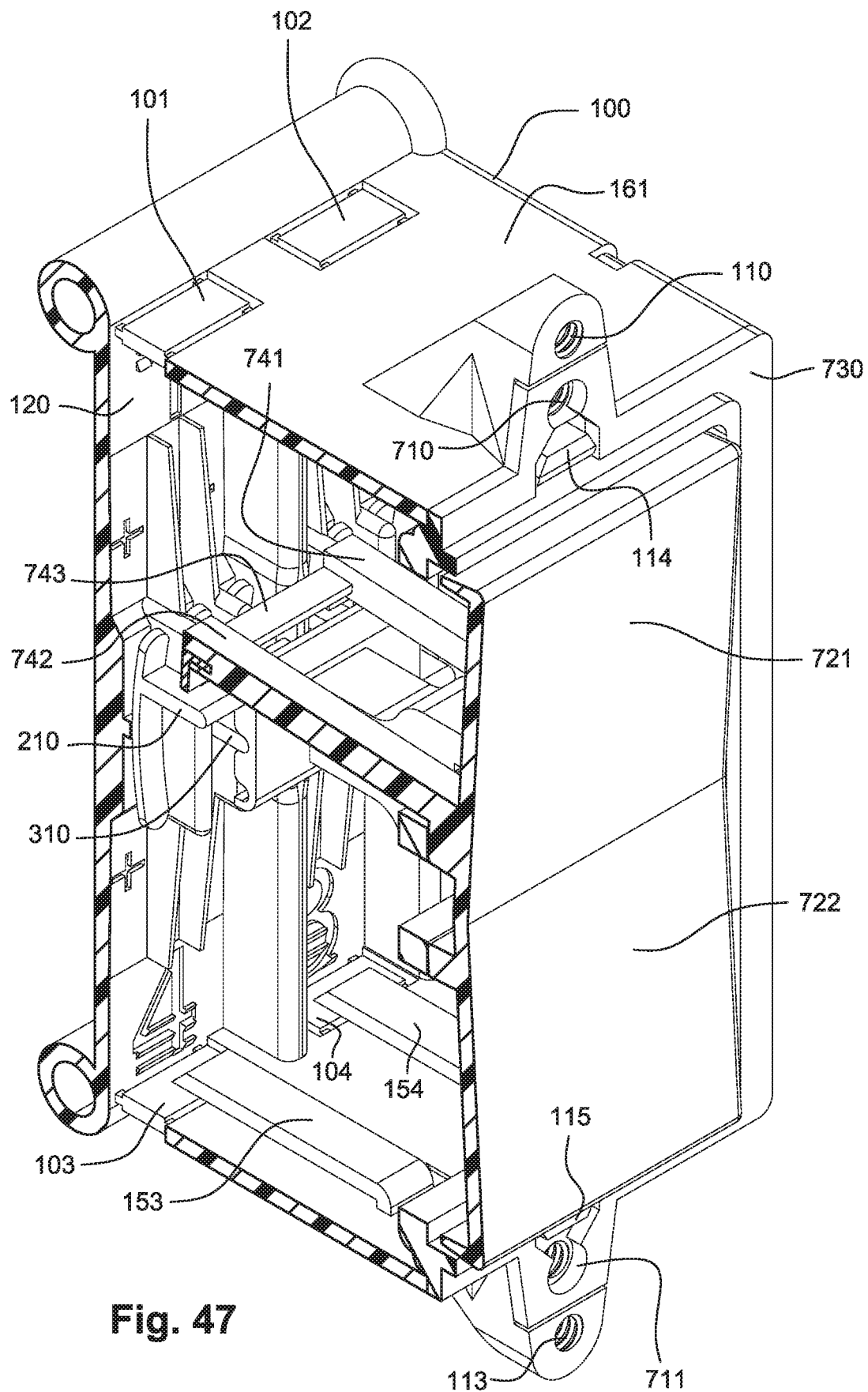
FIG. 47 illustrates a cut-away, top-left view of a switch mounted on a container.

FIG. 47 illustrates a cut-away, top-left view of the switch 700 (shown midway between "ON" and "OFF") mounted on the container 100. In an example embodiment, the switch 700 is configured to switch between an "ON" state, at which the contact bar 743 electrically connects two separate portions 215 and 216 of the positive link 210, and an "OFF" state, at which the contact bar 743 is electrically disconnected with the positive link 210. The contact bar 743 is held by the left and right contact legs 742 and 741 extending from the upper cover plate 721 and is constructed to be located at positions on or above the central piece of the positive link 210 depending on the rocking movement of the upper and lower rocker 721 and 722.

Figure 48:
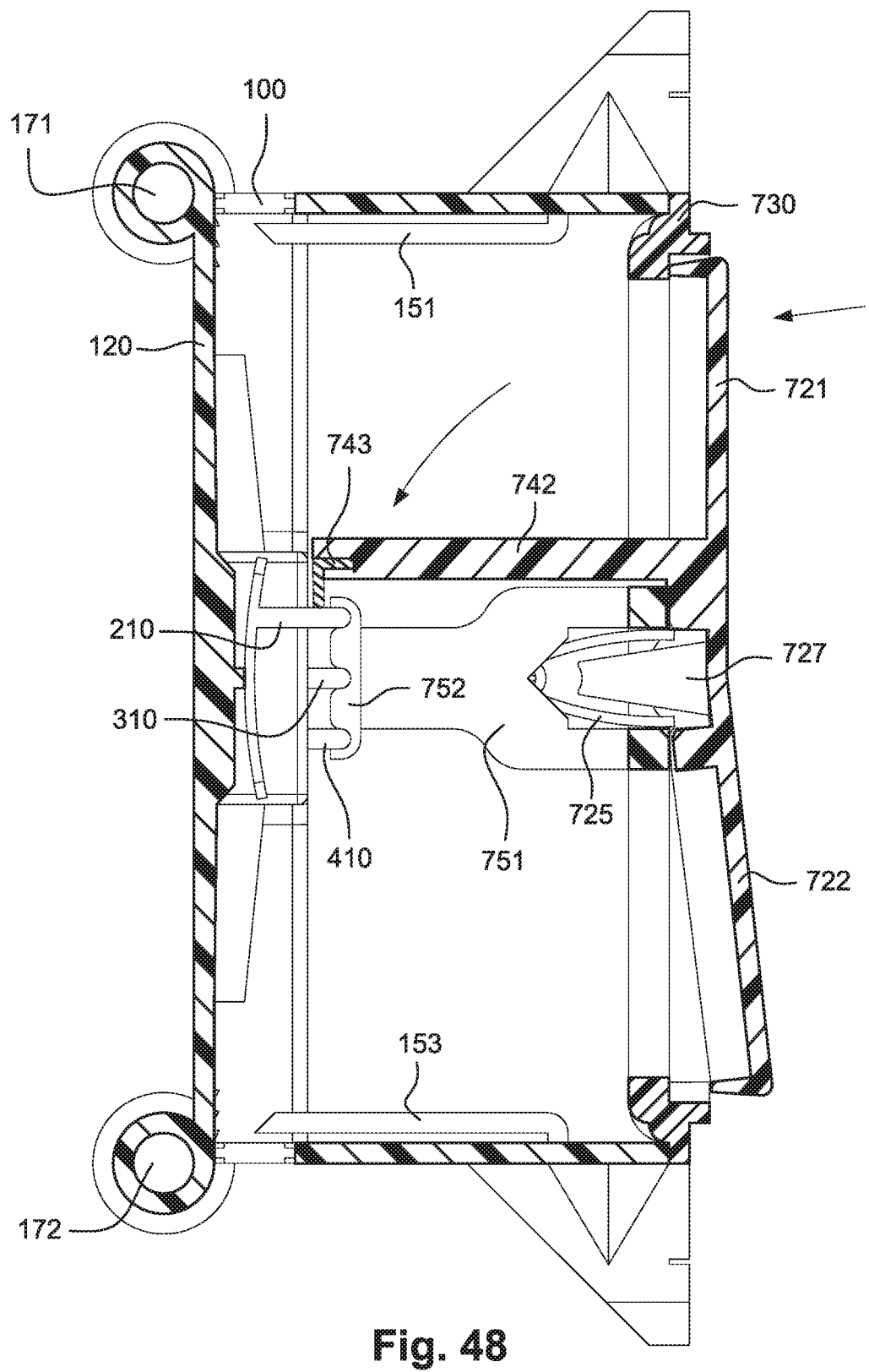
FIG. 48 illustrates a section view of a switch in its "ON" state.
Figure 49:
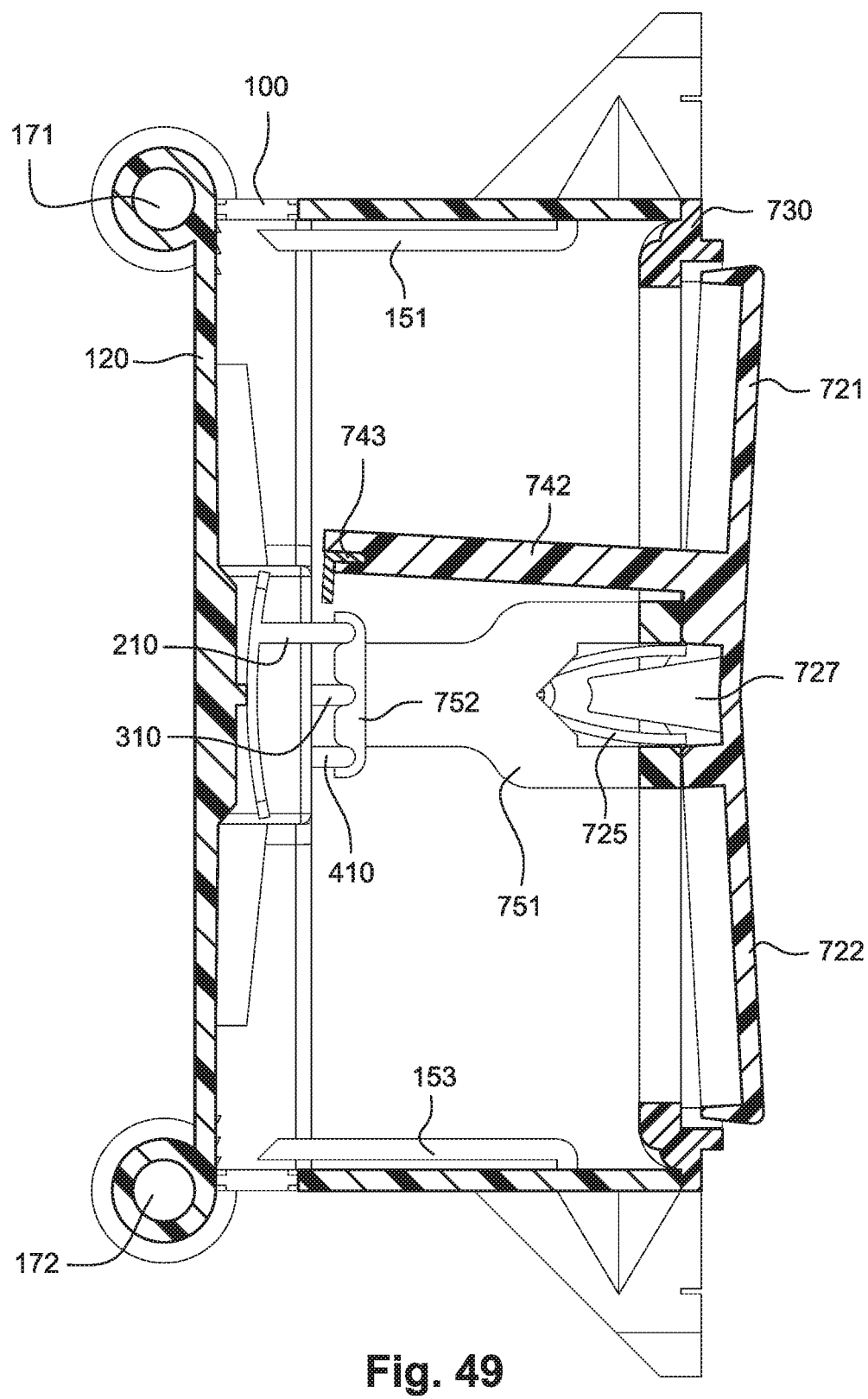
FIG. 49 illustrates a section view of a switch in its "OFF" state.

FIGS. 48 and 49 illustrate example section views of the switch 700 mounted on the container 100. FIG. 48 shows the switch 700 in its "ON" state, while FIG. 49 shows the switch 700 in its "OFF" state. In this example embodiment, when the upper rocker 721 is pushed down, the switch 700 is in its "ON" state and the contact bar 743 electrically connects the separate portions 215 and 216 of the positive link 210, while, on the other hand, when the lower rocker 722 is pushed down, the switch 700 is in its "OFF" state and the contact bar 743 is electrically disconnected with the positive link 210.

Figure 50:
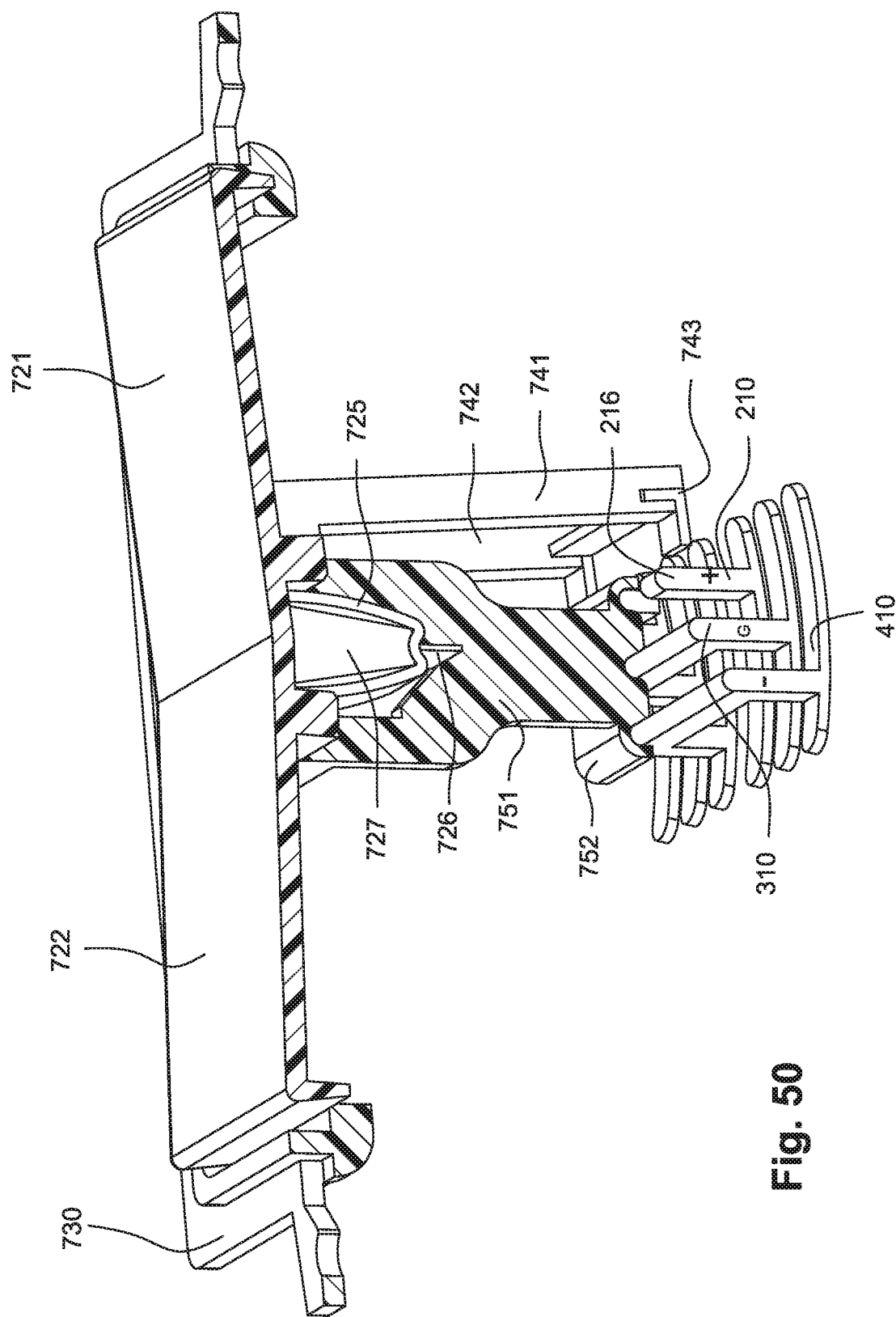
FIG. 50 illustrates a cut-away, bottom-left view of a switch.

FIG. 50 illustrates a cut-away, top-right view of the switch 700. When a user presses down the upper rocker 721 of the switch 700, the left and right contact legs 742 and 741 extending from the upper rocker 721 will be pushed down such that the left and right ends of the contact bar 743 will contact with the separate portions 215 and 216 of the positive link 210 respectively and such that the positive legs 221 and 222 will be electrically connected with the positive legs 223 and 224.

In certain example embodiments, a positive link, a ground link and a neutral link may be combined together into one single component. For example, positive, ground and neutral links may be combined by a link collar made of non-conductive material(s) to connect or hold the central pieces of these links together, and legs of these links are still exposed outside of the link collar and may be electrically connected to corresponding wires of cables.

Figure 55:
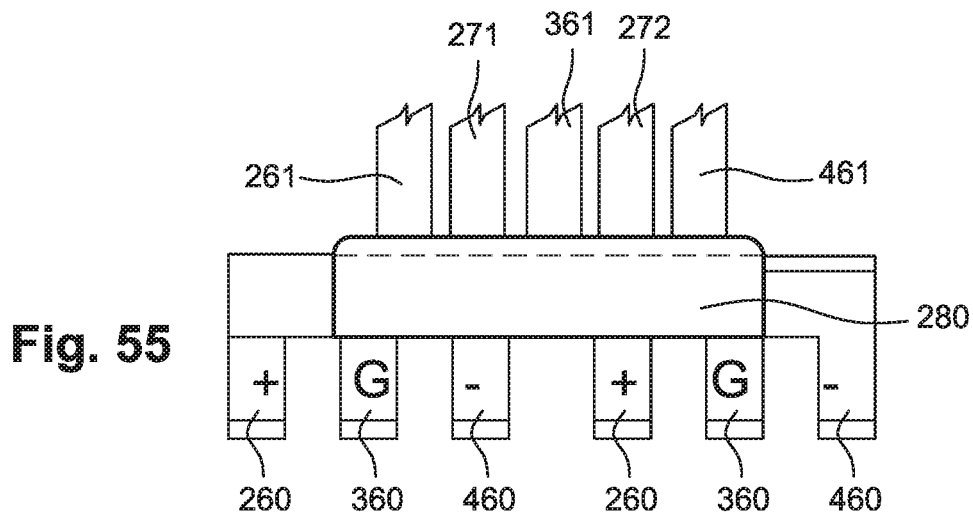
FIG. 55 illustrates a back elevation view of a set of combined positive, ground and neutral links.
Figure 56:
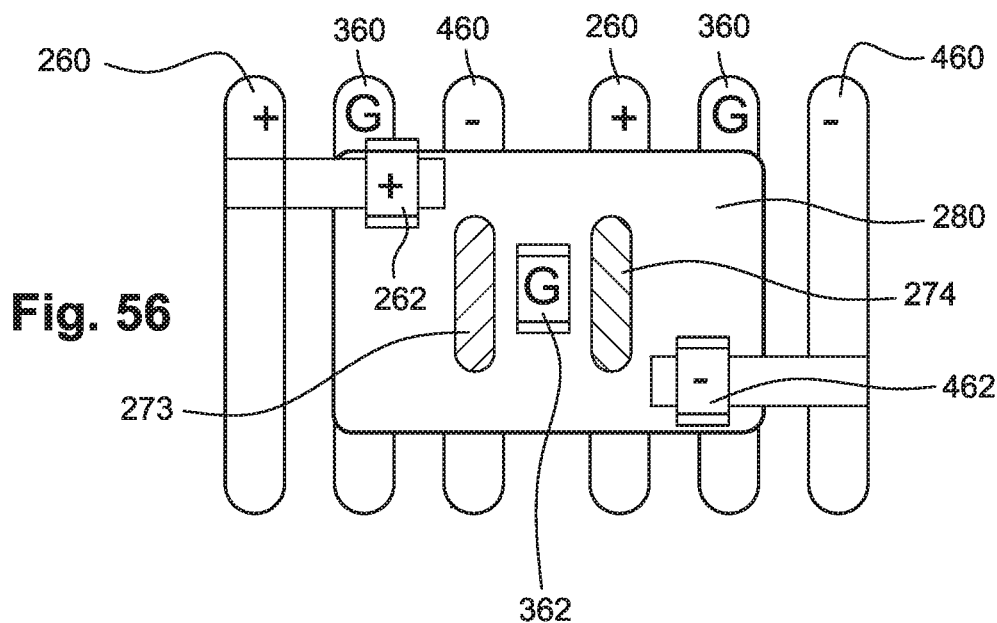
FIG. 56 illustrates a top view of a combined positive, ground and neutral links.

FIG. 55 illustrates an elevation view of a set of combined positive, ground and neutral links. In this embodiment, a positive link 260, a ground link 360 and a neutral link 460 are combined together by a link collar 280. The link collar 280 comprises non-conductive material(s), like plastic material. The link collar 280 may have a rectangular shape, for example, when viewed from its top or sides, as shown in FIGS. 55 and 56. In other example embodiments, the link collar may have a half-round shaped or any other shape.

Figure 57:
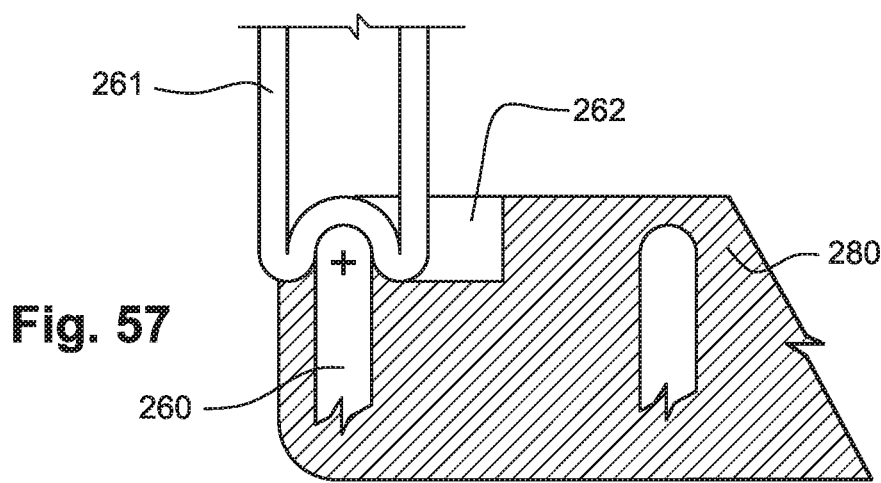
FIG. 57 illustrates a side view of a connection between an example conductor and an example link.

In certain example embodiments, the non-conductive link collar 280 may need to expose at least a section of each of the links to allow a conductor or wire from an electrical device mounted on the container to connect with the link. As shown in FIG. 56, the link collar 280 comprises three openings 262, 362 and 462 on its top to expose a section of the positive link 260, a section of the ground link 360 and a section of the neutral link 460 respectively. In the embodiment shown in FIG. 55, a positive conductor 261 from an external electrical device may connect to an exposed section of the positive link 260 via the opening 262, and a ground conductor 361 from the device may connect to an exposed section of the ground link 360 via the opening 362, and a neutral conductor 461 from the device may connect to an exposed section of the neutral link 460 via the opening 462 FIG. 57 shows that the positive conductor 261 is inserted into the opening 262 and electrically connected with the exposed section of the positive link 260.

Further, in some example embodiments, one or more supporting legs, or an engaging portion of a supporting column, extended from a cover plate or an electrical device may engage with the link collar 280 in order to retain link collar and links in a position that is electrically connectable with the corresponding wires of cables retained in a container. As shown in FIGS. 55 and 56, in an example embodiment, a left supporting leg 271 and a right supporting leg 272 extending from an electrical device may engage with the link collar 280 via slots 273 and 274 on top of the link collar 280 to retain the links 260, 360 and 460 in a position that is electrically connectable with corresponding wires of one or more cables.

Advantages are provided by the above-disclosed combined model of the links. Combining three links into one integral piece may ease the processes of assembling, as there are fewer components and fewer small pieces for an installer to assemble.

Figure 58A:
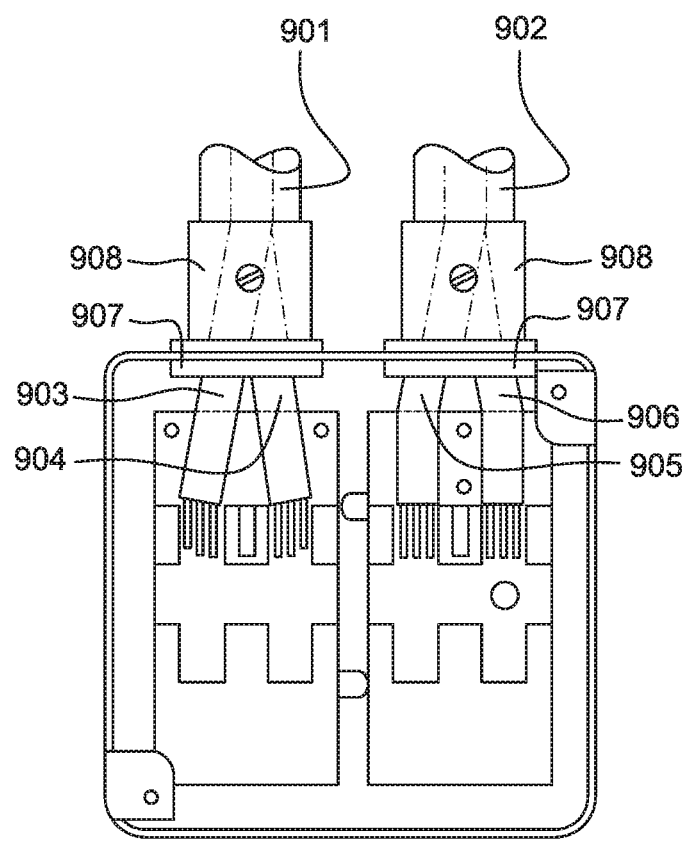
FIG. 58A illustrates a top view of a combination of two containers for connecting cables from conduits.
Figure 58B:
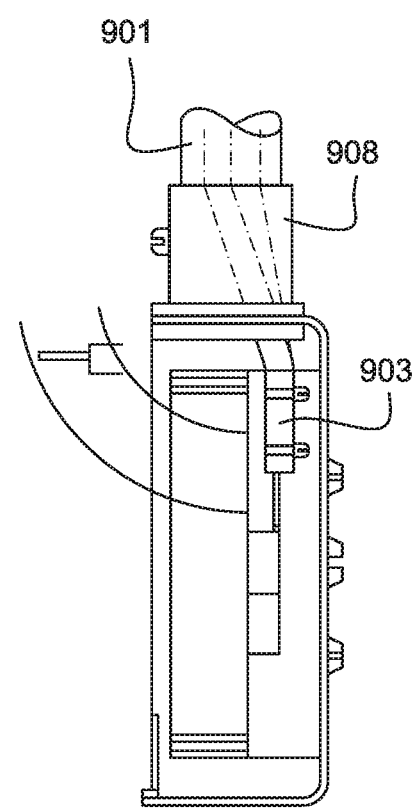
FIG. 58B illustrates a side view of a container for a conduit.

In some example embodiments, a container may need to be customized based on cables to be retained in it, or an electrical device to be mounted on it. In one example embodiment, two cables within one conduit may need to connect with another two cables within another conduit via the links. The metal conduit and metal junction box make the cables difficult to slide into the container, and removing the front and rear walls of the container(s) eliminates that problem. The cables can be bent up, stripped, and laid back down into the container(s) without a sliding action. Two containers might need to be combined side-by-side with or without connecting links after the tear-out pieces between these containers are removed. FIG. 58A illustrates a top view of an exemplary combination of two containers for connecting cables from two conduits. In this embodiment, two conduits 901 and 902 are retained in each of the containers by a conduit lock 908 and a lock nut 907 provided on top of the container, or any other sufficient means. Cables 903 and 904 included in the conduit 908 are divided and retained in the left container, and cables 905 and 906 included in the conduit 902 are divided and retained in the tight container. Within each of the containers, the positive, ground and neutral wires of each of the cables are further separated and disposed within different recesses as disclosed above in connection with the container 100. FIG. 58B shows that the cable 903 included in the conduit 901 is folded up in a way that its wires can be disposed within corresponding recesses formed on the base of the container.

FIG. 59 illustrates alternative exemplary positive link 240, ground link 440 and neutral link 340 as flat links, and with a below-wire mounted ground link. In an example embodiment, the positive link 240, neutral link 340 and ground link 440 comprise a central piece and four legs extended from the central piece. In particular, the positive link 240 comprises a central piece 245, four positive legs 241, 242, 243 and 244; the neutral link 340 comprises a central piece 345 and four neutral legs 341, 342, 343 and 344; and the ground link 440 comprises a central piece 445 and four ground legs 441, 442, 443 and 444. On at least one of the legs of a link, a stippled rectangle indicates where a device conductor from above can contact the leg. In the example embodiment shown in FIG. 59, a positive conductor may contact with the positive leg 243 of the positive link 240 at rectangle 246 on the leg 243, a neutral conductor may contact with the neutral leg 343 of the neutral link 340 at rectangle 346 on the leg 343, and a ground conductor may contact with the ground leg 443 of the ground link 440 at rectangle 446 on the leg 443.

Different from the links 200, 300, 400, 210, 310, and 410, the links 240, 340 and 440 comprise a central piece that is a substantially flat plate. In an example embodiment, to avoid short-circuit among the links 240, 340 and 440, each of the central pieces of these links is covered by insulating material(s) on at least one of its top and bottom sides.

The links 240, 340 and 440 are mounted on a container mounting post secured to the base of the container and extending toward the outer opening of the container. In an example embodiment, the ground link 440 is mounted on the mounting post via its opening 447 on the central piece 445 recessed into the container bottom to create sufficient separation so that the ground link 440 does not short circuit any of the positive legs, neutral legs or wires. The neutral link 340 is mounted on the mounting post via its opening 347 on the central piece 345 at a second position, and the positive link 240 is mounted on the mounting post its opening 247 on the central piece 245 at the top position. The first, second and third positions may be offset from each other.

In an example embodiment, as shown in FIGS. 59 and 60, the ground link 440 is recessed below the ground wires of the container to create distance from the positive and neutral wires and links, while the positive link 240 and the neutral link 340 are located on top of the cable(s) retained in the container. In some example embodiments, the ground link may be built into the base of the container at the factory.

In another example embodiment, as illustrated in FIG. 60, three insulating pads 250, 350 and 450 are provided on top of the positive link 240, between the positive link 240 and the neutral link 340, and between the neutral link 340 and the ground link 440 respectively, to further make sure these links would not be electrically connected with each other to cause short-circuit. This differs from the configuration illustrated in FIG. 59 in that the insulating pads 250, 350 and 450 in FIG. 60 are separate components whereas FIG. 59 illustrates a configuration where the links may include a layer of insulation.

Figure 61:
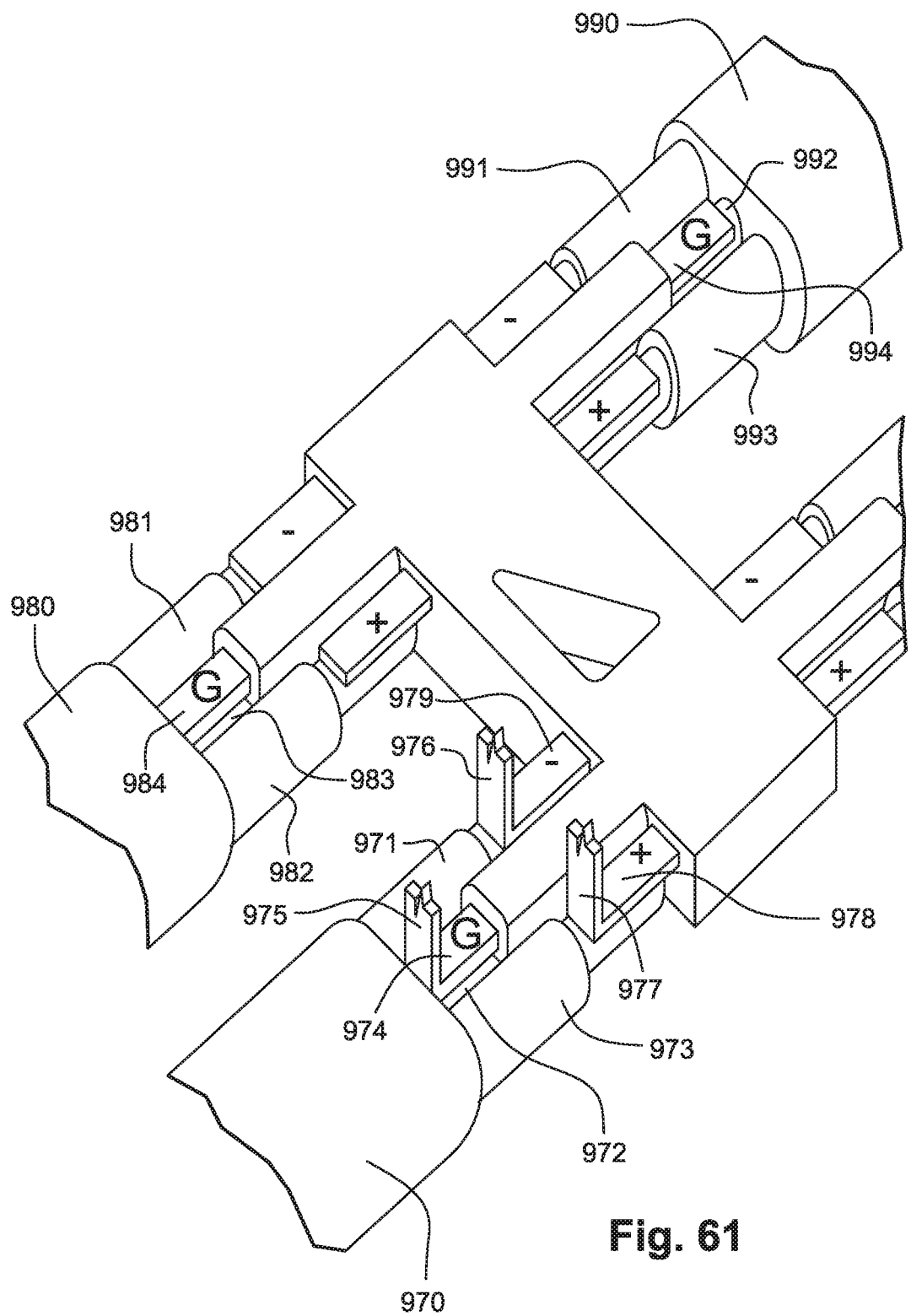
FIG. 61 illustrates a positive link, ground link and neutral link.
Figure 62:
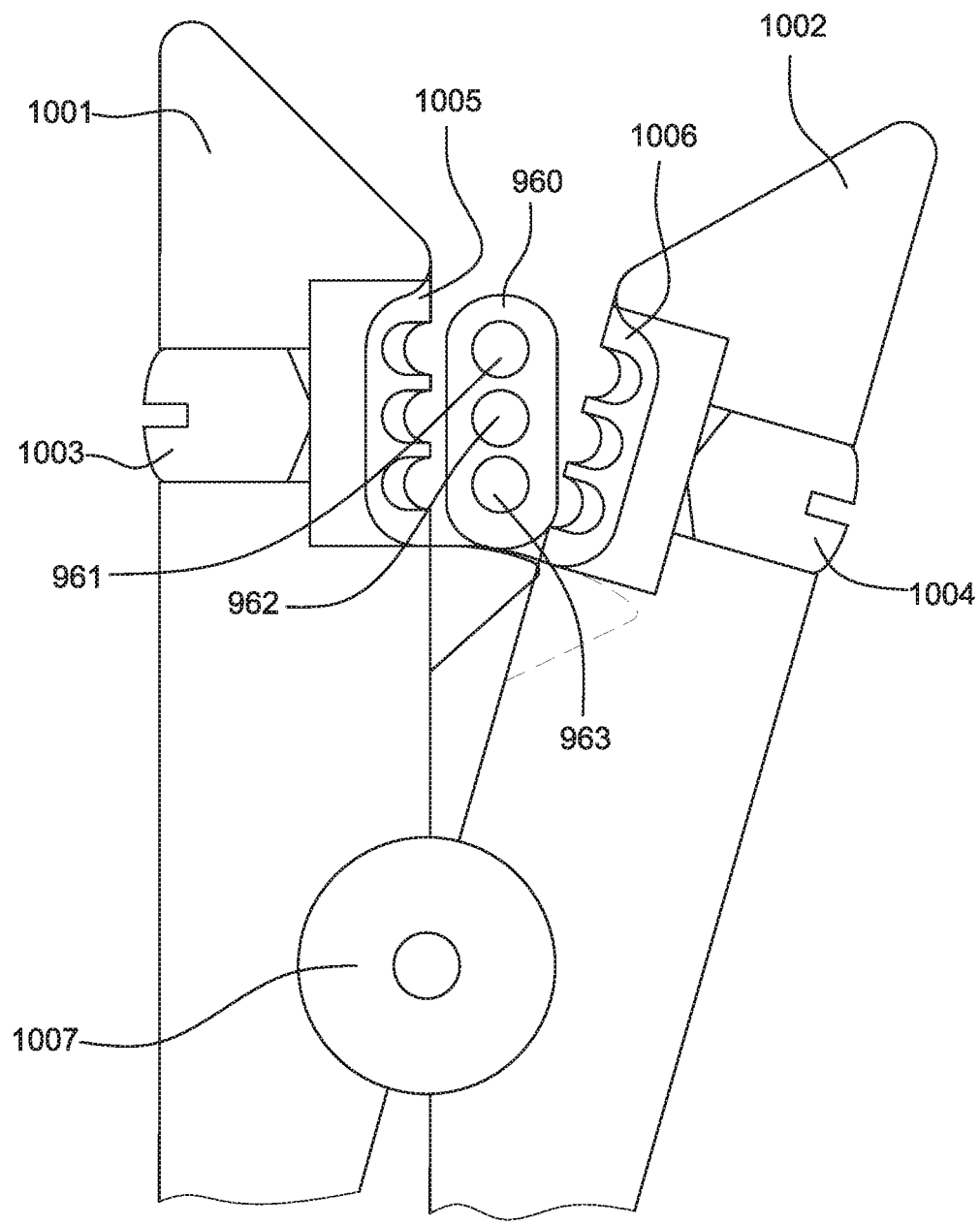
FIG. 62 illustrates a portion of a cable cutter and wire stripper for stripping and cutting a cable.
Figure 63:
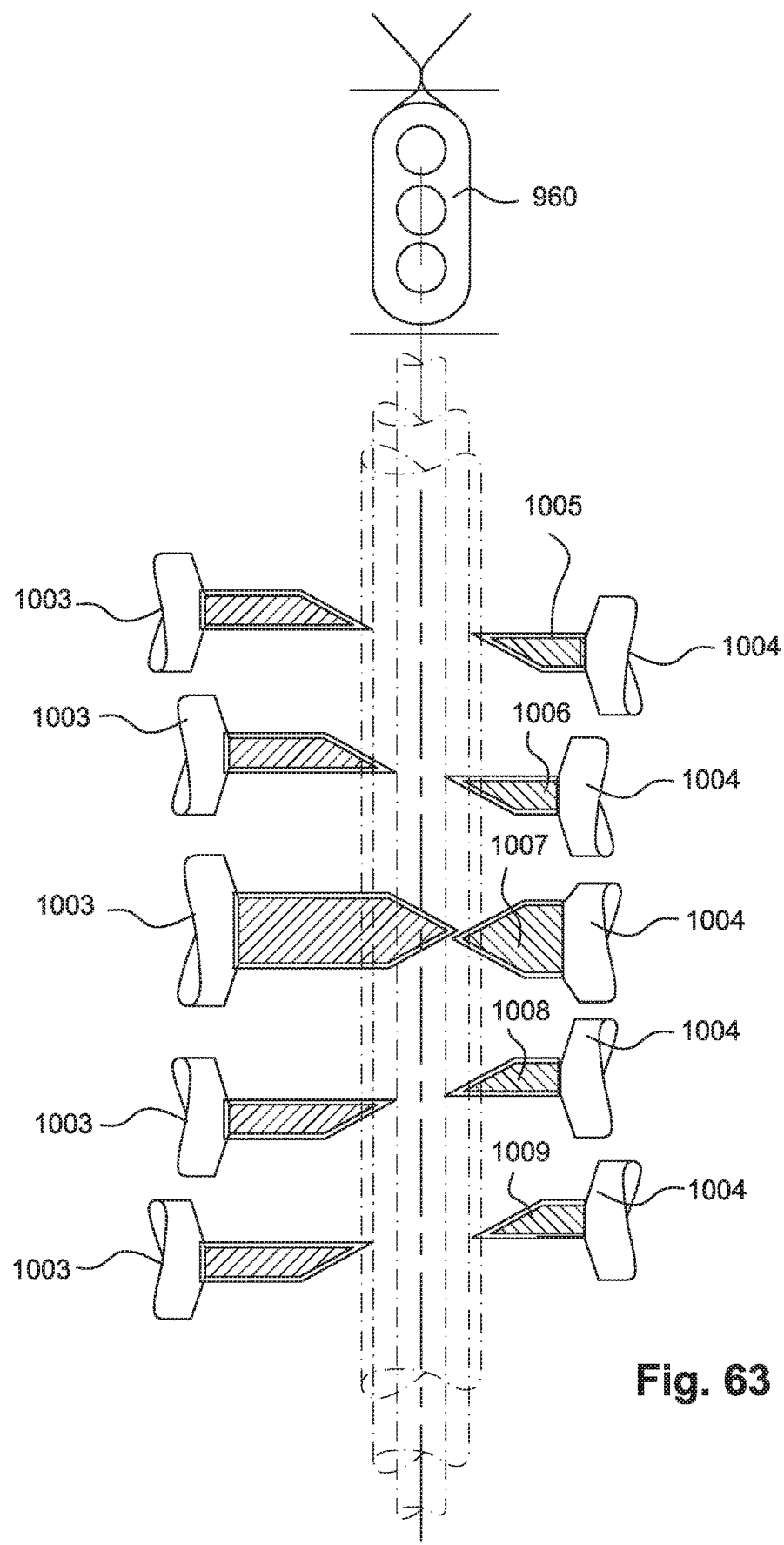
FIG. 63 illustrates blades.

FIG. 61 illustrates another alternative exemplary positive link, ground link and neutral link. In this embodiment, an extended and insulated ground link, a positive link and a neutral link are combined into one piece insulated by non-conductive material(s), with the exposed ground wires far enough from the exposed positive and neutral wires to avoid a short circuit. The combined piece is disposed on top of the wires of cables 970, 980 and 990, etc. As shown in FIG. 61, the ground legs 974, 984 and 994 are longer than the positive legs of the positive link and the neutral legs of the neutral link. Moreover, a portion of each ground leg is covered by non-conductive materials, so that the exposed portions of the ground wires 972, 982 and 992 are offset from the exposed portions of the positive wires 971, 981 and 991 and the neutral wires 973, 983 and 993.

Further, in this embodiment, a positive pad 977 extended from an electrical device above sits on the positive link at one positive leg 978, a ground pad 975 extended from the device connects to the ground link at one ground leg 974, and a neutral pad 976 extended from the device connects to the neutral link at one neutral leg 979. In this way the electrical device is electrically connected to the wires.

In an example embodiment of a cable cutter and stripper shown in FIG. 62-66, a hand powered, leveraged cutting and stripping tool 1100 for stripping cables comprises a set of dual metal levers 1009, 1010, 1016 1020 to multiply the operator's hand force, hanging from his belt. Pads 1015 abut the user's hip and thigh. The five pairs of blades 1005, 1006, 1007, 1008, 1009 are tool steel, adjustable or replaceable with set screws 1003, 1004 sized and shaped to cut gauge 10, 12, or 14 2-wire (3 wires counting the ground) cable 960, with lengthwise blade separations matching the length of the electrical links discussed above. With the application of hand force on handle 1014 (e.g., 8 pounds) the cable cutting blade pair 1007, positioned on the cable at the desired cut location, cut most of the way through the cable (e.g., 95%) and through all wires 961, 962, 963, leaving a small portion of cable insulation to be torn loose by hand (and preventing the cable from falling to the floor). The two adjacent pairs of wire insulation blades 1006, 1008 simultaneously cut through the cable and wire insulations, leaving exposed wire to the cut ends, and the two outermost pairs of cable insulation blades 1005, 1009 simultaneously cut through the cable insulation, leaving the three insulated wires exposed to the bare wire point. The result is two accurately dimensioned, double-stripped, cable and wire ends. Although a hand powered cable cutter is described, the cable cutter may also be powered (e.g.., electrically). With a powered cable cutter, different types of blades (e.g., rotary blades) may be employed so long as the same depth of the cuts are achieved. FIG. 66 illustrates three rotary blades 1017, 1018, 1019 that makes cuts corresponding to 1007, 1008, 1009 as described above, but only from one side to simplify the illustration.

While the disclosure has been described in connection with what is presently considered to be the most practical and preferred embodiments, it is to be understood that the disclosure is not to be limited to the disclosed embodiments, but on the contrary, is intended to cover various modifications and equivalent arrangements included within the spirit and scope of the appended claims.

What is claimed is:

1. An electrical wiring apparatus, comprising:
 a container having a base and an opening, the container having a first cable entry and a second cable entry on at least one side of the container constructed to removably retain a first cable and a second cable therein, each of the first and second cables having a positive wire, a neutral wire and a ground wire, an inner surface of the base constructed to allow the positive wire, neutral wire and ground wire of each of the first and second cables to be exposed when the cable is positioned in the respective cable entry;
 a positive link of electrically conductive material having at least two positive legs constructed to electrically connect with the exposed positive wires of the first and second cables respectively;
 a neutral link of electronically conductive material having at least two neutral legs constructed to electrically connect with the exposed neutral wires of the first and second cables respectively;
 a ground link having at least two ground legs constructed to electrically connect with the ground wires of the first and second cables respectively, wherein the positive link, the neutral link and the ground link are disposed within the container and above the inner surface of the base; and
 an electrical device engaged with the positive link, the neutral link and the ground link to retain the positive link, the neutral link, and ground link in a position that is electrically connectable with the positive, neutral and ground wires of the first and second cables.

2. The electrical wiring apparatus of claim 1, wherein the ground link comprises a central piece and four ground legs extending from the central piece.

3. The electrical wiring apparatus of claim 2, wherein the ground link is configured to be spaced apart from the positive wires and the neutral wires of the first and second cables when the first and second cables are retained in the container, and the central piece of the ground link is configured to be spaced apart from the positive wire, the neutral wire and the ground wire of the first and second cables when the first and second cables are retained in the container.

4. The electrical wiring apparatus of claim 1, wherein the positive link comprises a central piece and four positive legs extending from the central piece.

5. The electrical wiring apparatus of claim 4, wherein the positive link is configured to be spaced apart from the neutral wires and the ground wires of the first and second cables when the first and second cables are retained in the container, and the central piece of the positive link is configured to be spaced apart from the positive wire, the neutral wire and the ground wire of the first and second cables when the first and second cables are retained in the container.

6. The electrical wiring apparatus of claim 1, wherein the neutral link comprises a central piece and four neutral legs extending from the central piece.

7. The electrical wiring apparatus of claim 6, wherein the neutral link is configured to be spaced apart from the positive wires and the ground wires of the first and second cables when the first and second cables are retained in the container, and the central piece of the neutral link is configured to be spaced apart from the positive wire, the neutral wire and the ground wire of the first and second cables when the first and second cables are retained in the container.

8. The electrical wiring apparatus of claim 1, wherein the positive legs of the positive link, the neutral legs of the neutral link, and the ground legs of the ground link are spaced apart along one direction, and a central piece of the positive link, a central piece of the neutral link and a central piece of the ground link are spaced apart along another direction.

9. The electrical wiring apparatus of claim 1, further comprising a plurality of spaced recesses formed on the inner surface of the base.

10. The electrical wiring apparatus of claim 9, wherein one of the spaced recesses is constructed to dispose a positive wire of the first cable, and receive a positive leg of the positive link such that the positive leg is electrically connected with the positive wire of the first cable.

11. The electrical wiring apparatus of claim 9, wherein one of the spaced recesses is constructed to dispose a neutral wire of the first cable and receive a neutral leg of the neutral link such that the neutral leg is electrically connected with the neutral wire of the first cable.

12. The electrical wiring apparatus of claim 9, wherein one of the spaced recessed is constructed to dispose a ground wire of the first cable, and receive a ground leg of the ground link such that the ground leg is electrically connected with the ground wire of the first cable.

13. The electrical wiring apparatus of claim 9, wherein the plurality of spaced recesses are elongated and in parallel relation, and each of the plurality of spaced recesses is configured to dispose one wire of the first cable, and to receive one leg of a respective link.

14. The electrical wiring apparatus of claim 1, further comprising a separator formed on the inner surface of the base to separate the first cable from the second cable, wherein each of the positive link, the neutral link, and the ground link connects respective wires of the first and second cables across the separator.

15. The electrical wiring apparatus of claim 1, wherein the electrical device is movably mounted on the container over the opening thereof.

16. The electrical wiring apparatus of claim 1, wherein the electrical device comprises electrical conductors in engagement with the positive link, the neutral link, and the ground link.

17. The electrical wiring apparatus of claim 1, wherein the electrical wiring apparatus comprises the electrical device, and the electrical device is an electrical receptacle.

18. The electrical wiring apparatus of claim 1, wherein the electrical wiring apparatus comprises the electrical device, and the electrical device is an electrical switch.

19. The electrical wiring apparatus of claim 18, wherein the positive link comprises two separate central pieces constructed to electrically connect or disconnect the positive wires of the first and second cables based on a position of an operating element of the electrical switch.

20. The electrical wiring apparatus of claim 1, wherein the ground link is located below the ground wires of the first and second cables and disposed on the inner surface of the base.

21. The electrical wiring apparatus of claim 1, further comprising a mounting post secured to the base and extending outwardly toward the outer opening, wherein the positive link is mounted on the mounting post in a first position, and the neutral link is mounted on the mounting post in a second position offset from the first position.

22. The electrical wiring apparatus of claim 1, wherein the positive link has an H-shaped profile when viewed in a first direction.

23. The electrical wiring apparatus of claim 22, wherein the positive link has a U-shaped profile viewed in a second direction.

24. The electrical wiring apparatus of claim 23, wherein the positive link has a T-shaped profile viewed in a third direction.

25. The electrical wiring apparatus of claim 24, wherein the first, second and third directions are orthogonal.

26. The electrical wiring apparatus of claim 1, wherein the neutral link has an H-shaped profile when viewed in a first direction.

27. The electrical wiring apparatus of claim 26, wherein the neutral link has a U-shaped profile viewed in a second direction.

28. The electrical wiring apparatus of claim 27, wherein the neutral link has a T-shaped profile viewed in a third direction.

29. The electrical wiring apparatus of claim 28, wherein the first, second and third directions are orthogonal.

30. The electrical wiring apparatus of claim 1, wherein the positive link, the ground link and the neutral link are fastened together in one piece by a non-conductive material.

* * * * *